(12) United States Patent
Kanematsu et al.

(10) Patent No.: US 10,705,724 B2
(45) Date of Patent: Jul. 7, 2020

(54) INFORMATION PROCESSING APPARATUS, COMMUNICATION SYSTEM, AND METHOD FOR PROCESSING INFORMATION

(71) Applicants: Shoichiro Kanematsu, Kanagawa (JP); Kiyoshi Kasatani, Kanagawa (JP); Yoshinaga Kato, Kanagawa (JP); Takeshi Koyama, Saitama (JP)

(72) Inventors: Shoichiro Kanematsu, Kanagawa (JP); Kiyoshi Kasatani, Kanagawa (JP); Yoshinaga Kato, Kanagawa (JP); Takeshi Koyama, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 15/955,841

(22) Filed: Apr. 18, 2018

(65) Prior Publication Data

US 2018/0232138 A1 Aug. 16, 2018

Related U.S. Application Data

(63) Continuation of application No. PCT/JP2016/081627, filed on Oct. 25, 2016.

(30) Foreign Application Priority Data

Nov. 2, 2015 (JP) .................................. 2015-216038

(51) Int. Cl.
*H04L 29/06* (2006.01)
*H04L 29/08* (2006.01)
(Continued)

(52) U.S. Cl.
CPC ...... *G06F 3/04883* (2013.01); *G06F 3/03547* (2013.01); *G06F 3/0421* (2013.01);
(Continued)

(58) Field of Classification Search
CPC ........ G06F 8/65; G06F 16/10; G06F 3/03547; G06F 3/0421; G06F 3/0425;
(Continued)

(56) References Cited

U.S. PATENT DOCUMENTS 7,880,719 B2 * 2/2011 Kritt ........................ G06K 9/22
345/156
7,961,761 B2 6/2011 Kasatani
(Continued)

FOREIGN PATENT DOCUMENTS

JP S61-007942 1/1986
JP H11-024934 1/1999
(Continued)

OTHER PUBLICATIONS

Otero et al., MiniOS: An Instructional Platform for Teaching Operating Systems Projects, 6 pages (Year: 2015).*
(Continued)

*Primary Examiner* — Thuy Dao
(74) *Attorney, Agent, or Firm* — IPUSA, PLLC

(57) ABSTRACT

An information processing apparatus is provided in in a hierarchical structure of at least three hierarchies, and communicates with another information processing apparatus that is present in the immediately above hierarchy in the hierarchical structure to determine whether a version of the software installed on the information processing apparatus matches a version of the software installed on the immediately above information processing apparatus. The information processing apparatus also acquires setup information from the immediately above information processing apparatus upon determining that the software version installed on the information processing apparatus matches that of the software installed in the immediately above information processing apparatus.

13 Claims, 27 Drawing Sheets

(51) Int. Cl.
 *G06F 3/048*  (2013.01)
 *G06F 3/0484*  (2013.01)
 *H04L 12/58*  (2006.01)
 *G06F 3/0488*  (2013.01)
 *G06F 8/65*  (2018.01)
 *G06F 9/445*  (2018.01)
 *G06F 3/0354*  (2013.01)
 *G06F 3/042*  (2006.01)
 *G06F 3/0483*  (2013.01)
 *G06F 8/71*  (2018.01)
 *G06F 3/147*  (2006.01)

(52) U.S. Cl.
 CPC .......... *G06F 3/0425* (2013.01); *G06F 3/0483* (2013.01); *G06F 8/65* (2013.01); *G06F 8/71* (2013.01); *G06F 9/44505* (2013.01); *G06F 3/147* (2013.01)

(58) Field of Classification Search
 CPC ...... G06F 3/0483; G06F 9/44505; G06F 8/71; G06F 8/61; G06F 3/04883; G06F 11/1451; G06F 11/2094; H04L 67/104; H04L 67/1095; H04L 65/403; H04L 12/1827; H04W 8/245; G06Q 10/10
 See application file for complete search history.

(56) References Cited

U.S. PATENT DOCUMENTS

| | | | | |
|---|---|---|---|---|
| 9,489,114 | B2* | 11/2016 | Coplen | G06F 3/1454 |
| 10,126,927 | B1* | 11/2018 | Fieldman | G06Q 10/107 |
| 2003/0084439 | A1* | 5/2003 | Perkins | G06F 8/61 |
| | | | | 717/177 |
| 2005/0132091 | A1* | 6/2005 | Shibata | G06F 8/65 |
| | | | | 710/4 |
| 2006/0156129 | A1 | 7/2006 | Midgley et al. | |
| 2007/0245333 | A1* | 10/2007 | Ferlitsch | G06F 8/65 |
| | | | | 717/168 |
| 2009/0237715 | A1 | 9/2009 | Kasatani | |
| 2011/0321028 | A1 | 12/2011 | Evans et al. | |
| 2013/0318133 | A1* | 11/2013 | Rajabi | G06F 16/164 |
| | | | | 707/821 |
| 2014/0245262 | A1* | 8/2014 | Hill | G06F 8/70 |
| | | | | 717/120 |
| 2015/0234649 | A1 | 8/2015 | Sugiura et al. | |
| 2017/0034163 | A1* | 2/2017 | Priyadarshini | H04L 63/0876 |
| 2017/0331883 | A1* | 11/2017 | McKelvie | H04L 67/10 |

FOREIGN PATENT DOCUMENTS

| | | |
|---|---|---|
| JP | 2003-092602 | 3/2003 |
| JP | 2005-182163 | 7/2005 |
| JP | 2009-064177 | 3/2009 |
| JP | 4942686 | 5/2012 |
| JP | 2014-056403 | 3/2014 |

OTHER PUBLICATIONS

Office Action dated May 21, 2019 issued with respect to the corresponding Japanese Patent Application No. 2017-548717.
Extended European search report for 16861969.0 dated Apr. 25, 2019.
International Search Report dated Jan. 10, 2017 in PCT/JP2016/081627 filed on Oct. 25, 2016.
Partial European Search Report for 16861969.0 dated Dec. 21, 2018.

* cited by examiner

FIG.8
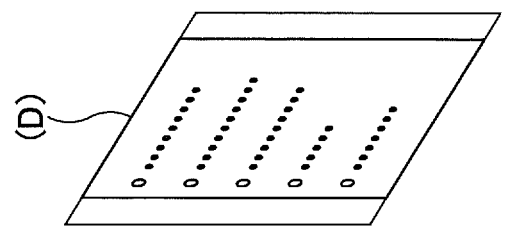
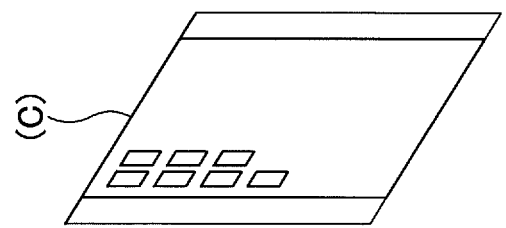
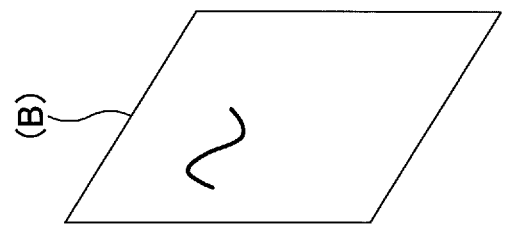
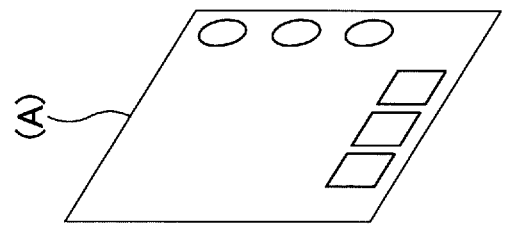
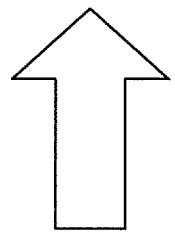
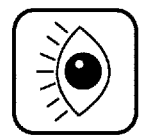

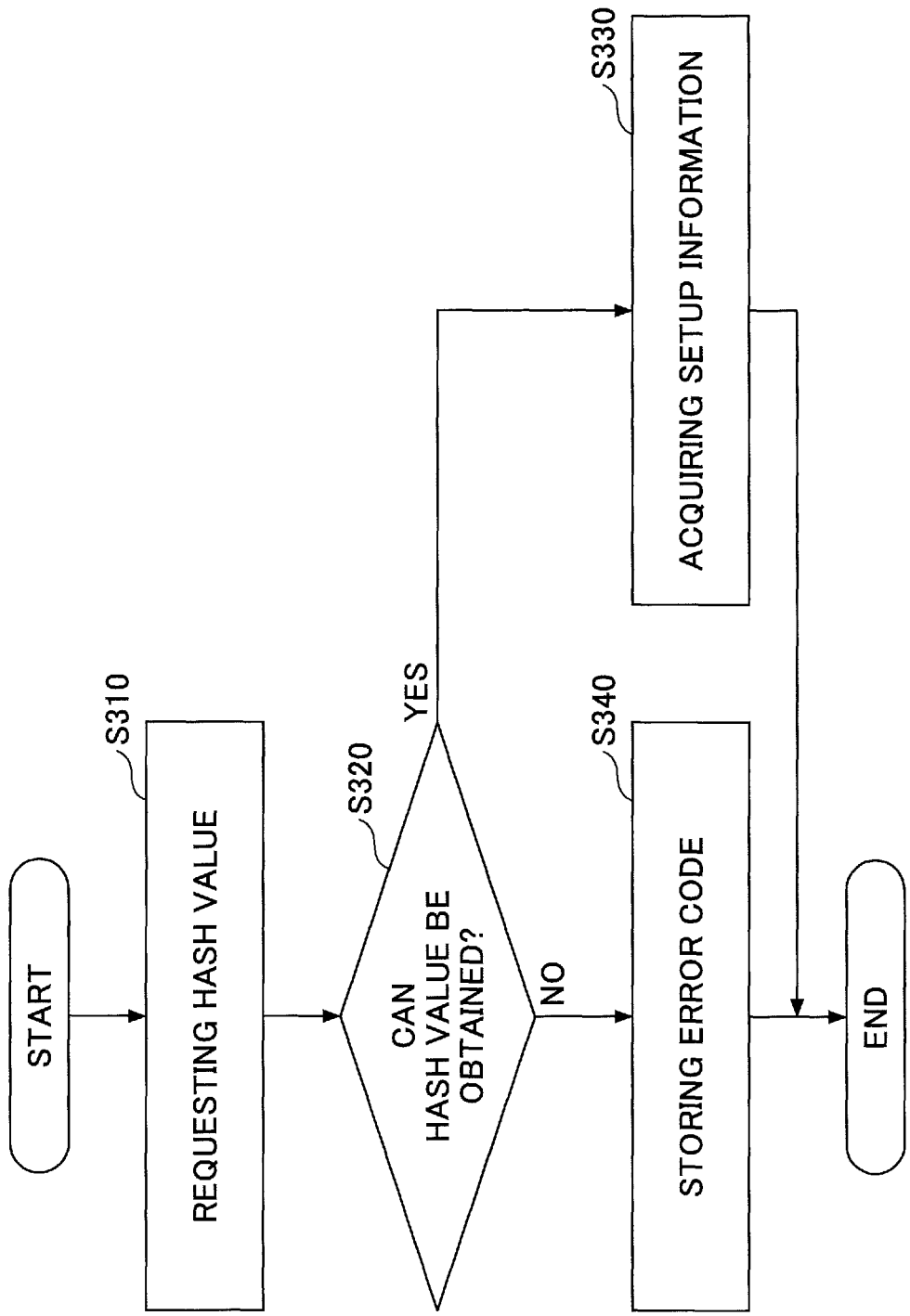

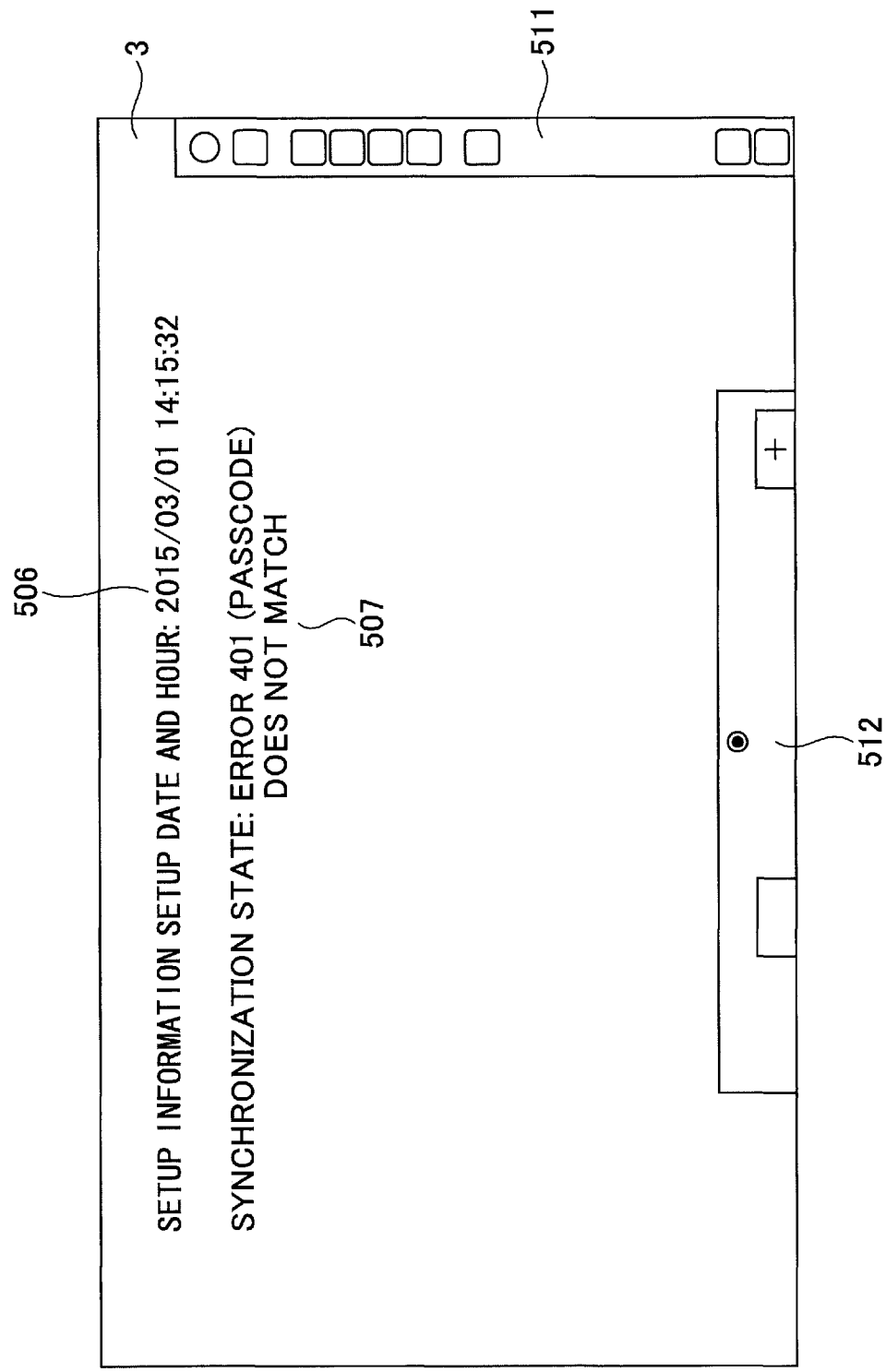

INFORMATION PROCESSING APPARATUS, COMMUNICATION SYSTEM, AND METHOD FOR PROCESSING INFORMATION

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2016/081627 filed on Oct. 25, 2016, which is based upon and claims the benefit of priority of the prior Japanese Patent Application No. 2015-216038 filed on Nov. 2, 2015, the entire contents of which are incorporated herein by reference.

BACKGROUND OF THE INVENTION

1. Field of the Invention

The present invention relates to an information processing apparatus, a communication system, and a method for processing information.

2. Description of the Related Art

A known electronic whiteboard is formed such that a touch panel is installed on a large-sized flat panel display. This electronic whiteboard displays a screen playing a role of a whiteboard, captures trajectory of an electronic pen, a finger, or the like through the touch panel, and draws the trajectory on a screen as handwritten contents. Therefore, a user can use the screen like a whiteboard. Further, in the electronic whiteboard, which can be coupled to a personal computer, it is possible to cause the electronic whiteboard to display a screen that is the same as the personal computer, draw handwritten contents on this screen, or operate the personal computer by the electronic whiteboard in accordance with information input from a touch panel.

There is a conventional technique of efficiently providing an identical setup to multiple apparatuses (for example, please refer to Patent Document 1). Patent Document 1 discloses a network synchronization system including a first apparatus and a second apparatus. The first apparatus includes a synchronization shared memory means. The second apparatus includes a setup information means storing personal setup information for each user and a synchronization control means updating the personal setup information stored by the setup information means for each user to be the newest personal setup information. The synchronization control means acquires common update information that is common to multiple information processing apparatuses and stored by the synchronization shared memory means.

Patent Document 1: Japanese Patent No. 4942686

SUMMARY OF THE INVENTION

Problem that the Invention is to Solve

In the electronic whiteboard, software implementing various functions operates. The software is subjected to be version upgrade in accordance with an addition, revision, or the like of a function by a maker. Then, an administrator or the like of the electronic whiteboard may obtain software subjected to version upgrade and install the obtained software onto the electronic whiteboard.

Here, there may occur different situations, in which setup contents related to the operation of the electronic whiteboard are different in accordance with different versions of the software. In a case where setup contents are different, it is not preferable to synchronize setups between multiple electronic whiteboards. In a case where the administrator conducts the version upgrade for all software in order to synchronize the setups, burden for the administrator becomes heavy as the number of the electronic whiteboards increases. In the above conventional technique, there is a problem such that the version of the software is not considered when the second apparatus causes the first apparatus to synchronize the personal setup information.

Regarding the above problems, the object of the present invention is to provide the information processing apparatus, in which the version of the software is considered at a time of synchronizing the setup.

Means for Solving the Problems

In consideration of the above object, the present invention includes an information processing apparatus having an upper information processing apparatus present at an upper position in a hierarchical structure of at least three hierarchies formed by a plurality of information processing apparatuses, providing a function by software installed in the information processing apparatus, and behaving based on setup information related to an operation, including a communication information memory unit configured to store communication information for communicating with an immediately above information processing apparatus, a first determining unit configured to communicate with the immediately above information processing apparatus using the communication information and determine whether a version of the software installed on the information processing apparatus matches a version of the software installed on the immediately above information processing apparatus, and a setup information acquiring unit configured to communicate with the immediately above information processing apparatus using the communication information and acquire the setup information from the immediately above information processing apparatus in a case where the first determining unit determines that the version of the software installed on the information processing apparatus matches the version of the software immediately above on the another information processing apparatus.

BRIEF DESCRIPTION OF THE DRAWINGS

FIG. 8 illustrates an example of structures of image layers.

FIG. 23 is an example of a flowchart illustrating a procedure that the electronic whiteboard updates the setup information.

FIG. 24B illustrates an example of an error code displayed on the electronic whiteboard.

DESCRIPTION OF THE EMBODIMENTS

Hereinafter, an embodiment of the present invention is explained with reference to drawings.

<Network Structure of the Embodiment>

Figure 1A:
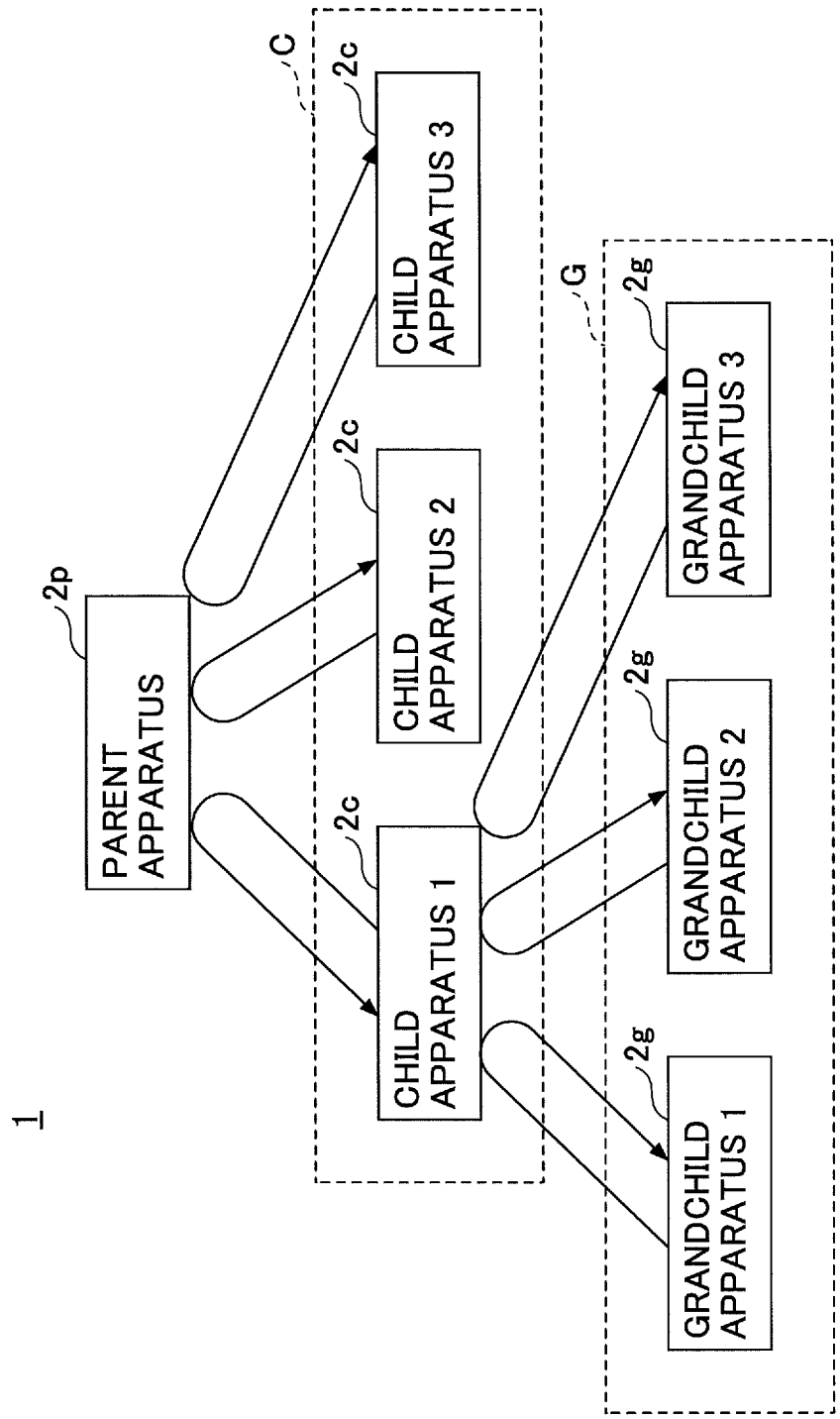
FIG. 1A illustrates an example of a network structure of an image processing system.
Figure 1B:
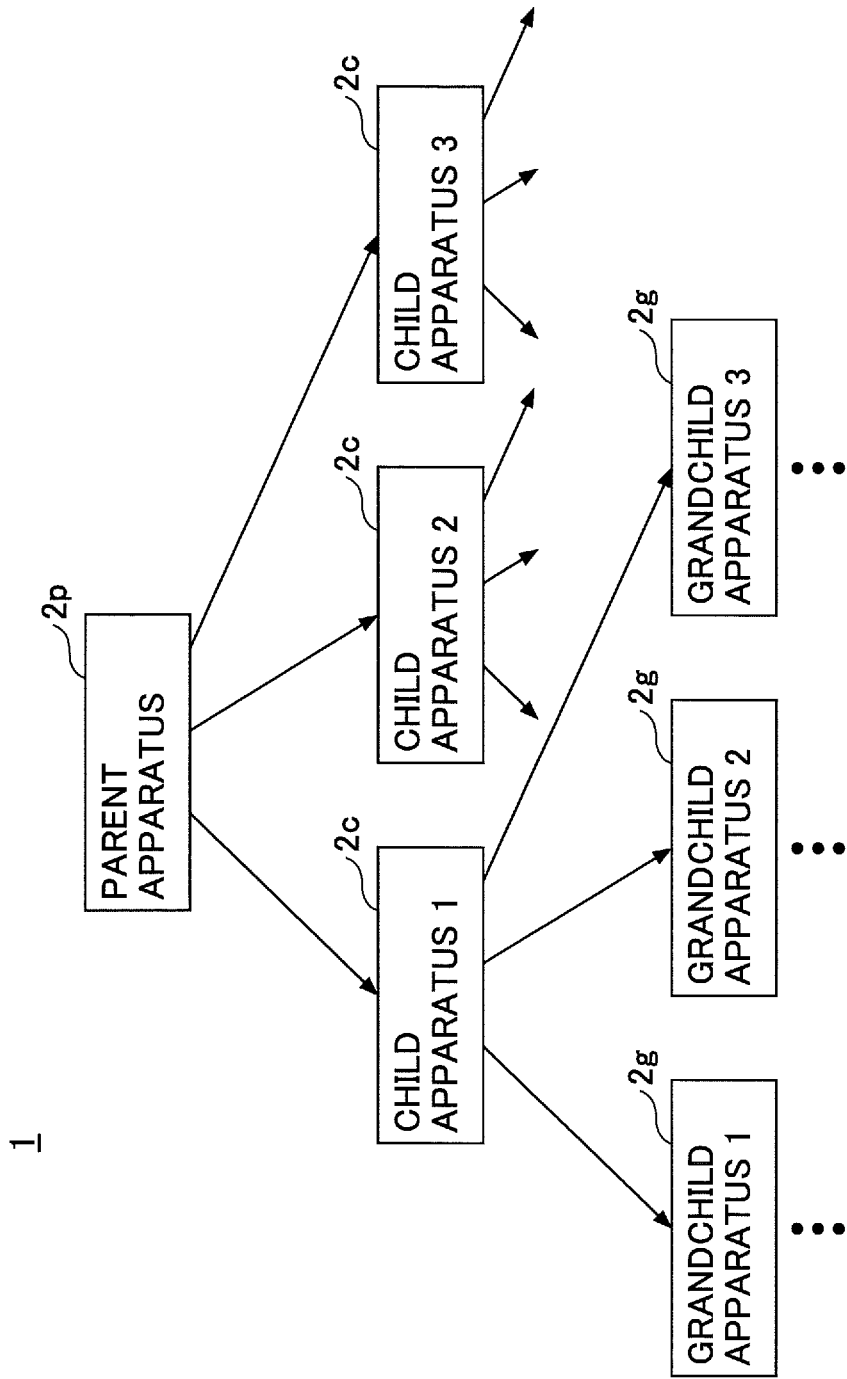
FIG. 1B illustrates a comparative example of a network structure of an image processing system.

FIG. 1A illustrates an example of a network structure of an image processing system of the embodiment. An image processing system 1 has a network structure of a tree structure. Said differently, multiple electronic whiteboards form a hierarchical structure, in which stepwise layers are formed by the electronic whiteboard 2p of a parent apparatus, the electronic whiteboard 2c of a child apparatus, and the electronic whiteboard 2g of a grandchild apparatus. Referring to FIGS. 1A and 1B, an electronic whiteboard 2 designates an arbitrary one from among the electronic whiteboards 2p, 2c, and 2g. The tree structure is one type of the hierarchical structure, and branching from a node (an electronic whiteboard 2) to another node (an electronic whiteboard 2) is repeated.

Within this embodiment, the child apparatus-1 to child apparatus-3 (reference symbols 2c) start to communicate with the parent apparatus 2p. Setup information held by the parent apparatus 2p is acquired by the child apparatus-1, and the acquired setup information is set to the child apparatus-1 itself. The setup information is set to the child apparatuse-2 and the child apparatuse-3 themselves in a manner similar to the above. Grandchild apparatus-1 to grandchild apparatus-3 (reference symbols 2g) start communications with the child apparatus-1, acquires the setup information held by the child apparatus-1, and sets the acquired setup information to the grandchild apparatus-1. The setup information is set to the grandchild apparatuse-2 and the grandchild apparatuse-3 themselves in a manner similar to the above.

FIG. 1B illustrates a comparative example compared with the network structure of this embodiment. Referring to FIG. 1B, the parent apparatus 2p sets the setup information to the child apparatus-1 to child apparatus-3, and the child apparatus-1 sets the setup information to the grandchild apparatus-1 to grandchild apparatus-3. With this structure, the parent apparatus 2p is required to set the setup information to the child apparatus-1-3, and the child apparatus-1 is required to set the setup information to the grandchild apparatus-1 to grandchild apparatus-3. Therefore, a load on one electronic whiteboard 2 is heavy.

Meanwhile, in the synchronization method of this embodiment illustrated in FIG. 1A, the one electronic whiteboard 2 communicates with only the electronic whiteboard 2 immediately above the own electronic whiteboard 2. Therefore, it is possible to suppress a load on each electronic whiteboard 2 required at a time of synchronizing the setup information. Further, each electronic whiteboard 2 is not required to hold information related to update of the setup information of the electronic whiteboard 2 located immediately below the own electronic whiteboard 2. The meaning of the "electronic whiteboard immediately above" and the "electronic whiteboard immediately above" will be described in detail later. The electronic whiteboard 2 providing the setup information conducts a process of sending the setup information in response to the request from the electronic whiteboard 2 immediately below the own electronic whiteboard 2. Thus, this process is relatively low on the load. Therefore, the electronic whiteboard 2 can have the multiple electronic whiteboards 2 (three in FIG. 2) immediately below the own electronic whiteboard 2. Said differently, it is not necessary to couple the electronic whiteboard 2 in series (daisy chain). With a relatively light load and within a relatively short time, the electronic whiteboard 2 can synchronize the setup information.

<Consideration of Version of Program>

Figure 2:
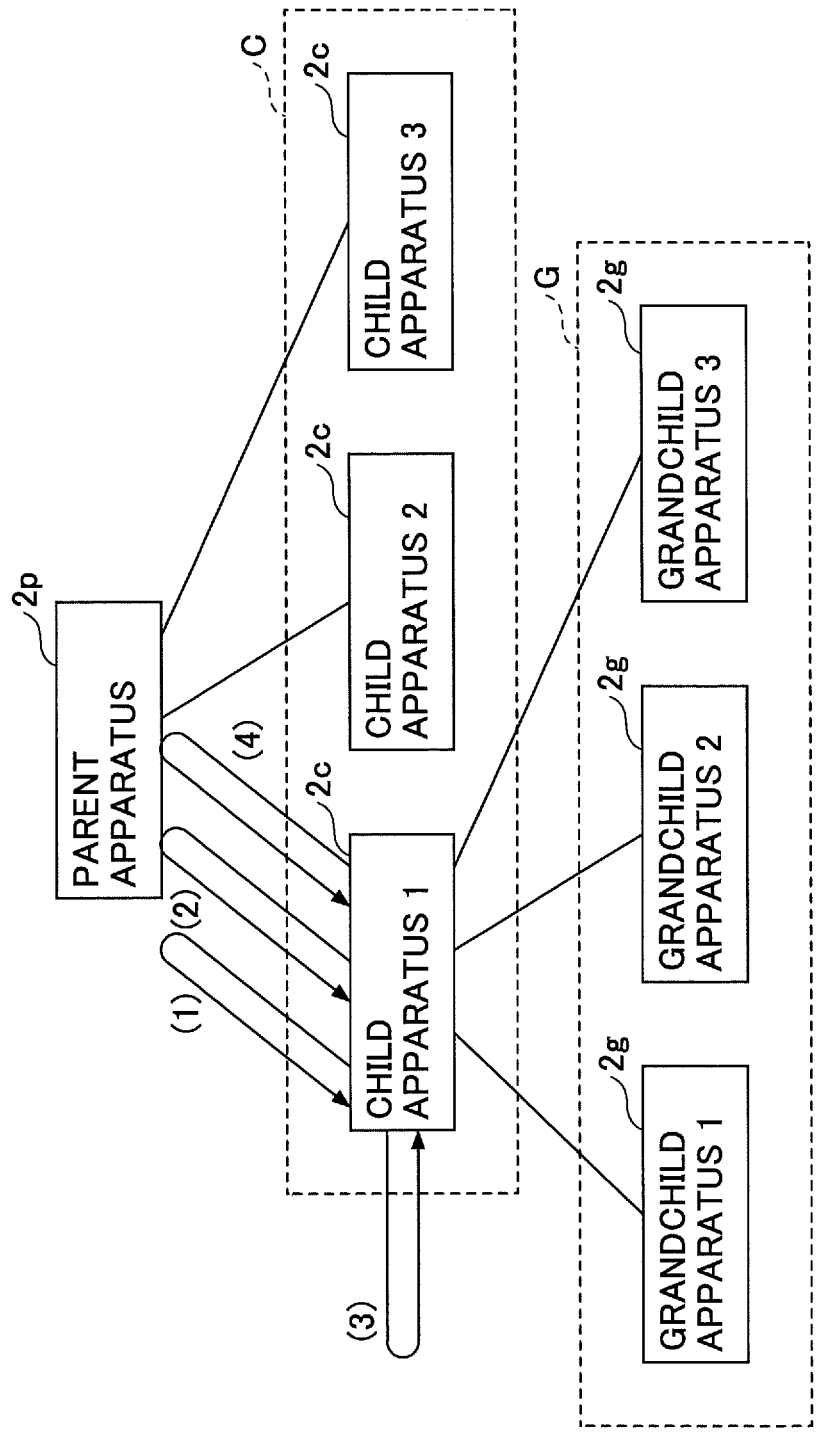
FIG. 2 illustrates an example schematically explaining a process of considering a version of a program at a time of synchronizing setup information.

FIG. 2 illustrates an example schematically explaining a process of considering a version of a program at a time of synchronizing setup information. Within this embodiment, the electronic whiteboard 2 checks whether the version of the program is the same as that of the other electronic whiteboard 2 located immediately above the electronic whiteboard 2. Hereinafter, a procedure until the synchronization is briefly explained.

(1) Within this embodiment, the electronic whiteboard 2 checks whether the version of the program is the same as that of the other electronic whiteboard 2 located immediately above the electronic whiteboard 2.

(2) In a case where the version is different, the electronic whiteboard 2 downloads the file of the program from the other electronic whiteboard 2 located immediately above the electronic whiteboard 2.

(3) The electronic whiteboard 2 installs the new program (or conducts version upgrade).

(4) If the versions are the same or the versions become the same after the install, the electronic whiteboard 2 causes the setup information to be synchronized.

Therefore, the electronic whiteboard 2 is enabled to synchronize the setup information with the different setup information held by the other electronic whiteboard 2 located immediately above the electronic whiteboard 2 even if the different setup information has items different from items of the setup information because the versions of the programs are different. Further, the electronic whiteboard 2 having a version of the program from the version of the program of the other electronic whiteboard 2 located immediately above the electronic whiteboard 2 is enabled to synchronize the setup information after conducting version upgrade for the program of the electronic whiteboard 2.

Further, within this embodiment, each electronic whiteboard 2 is enabled to synchronize not only the setup information but also the versions of the programs. Therefore, after the administrator conducts the version upgrade of the program of the parent apparatus, all electronic whiteboards 2 are enabled to conduct the version upgrade.

<Terminology>

Software is a procedure related to an operation of a computer and information processed by the computer. A program is one of what is called the software. The program is information designating a function to be implemented by the electronic whiteboard 2 using a language decodable by a computer. The program can be said to be function designation describing information. The program may be specifically called an application program, firmware, an operating system (OS), or the like. However, the program is not limited to these. The software and the program may not be exactly differentiated. In the explanation of the embodiment, the term "program" may be used so as to include the software and the program for convenience.

There may be a case where multiple programs such as the OS and the application program operate in one electronic whiteboard 2. Within this embodiment, all programs may be subjected to version upgrade without differentiating the multiple programs, or a part of the programs may be subjected to the version upgrade.

Further, the setup information is information designating the content of setups related to operation of the electronic whiteboard 2. The setup information includes, for example, information indicating the content of the setup for the electronic whiteboard 2 to properly behave, information indicating the content of the setup to permit or limit the operation of the electronic whiteboard 2, information indicating the content of the setup of on/off of various functions, and information indicating the content of the setup for communicating with the Internet and another apparatus. The contents of the setup information are specifically described later with reference to FIGS. 16A and 16B.

It is preferable that the network structure of the tree structure has at least three hierarchies. However, the network structure may have only two hierarchies. It is preferable that the network structure of the tree structure has at least three hierarchies. However, the network structure may include a branch of two or less hierarchy. Further, the number of the electronic whiteboards 2 included in one hierarchy is not limited to three, and properly determined in consideration of the total number of the electronic whiteboards 2 and the depth of the hierarchies.

Hereinbelow, for convenience of explanation, a layer of the child apparatus-1 to child apparatus-3 is referred to as a child apparatus layer C, and a layer of the grandchild apparatus-1 to grandchild apparatus-3 is referred to as a grandchild apparatus layer G. Further, the electronic whiteboard 2 directly at an upper position such as the parent apparatus 2p relative to the child apparatus-1 is referred to as an "immediately above electronic whiteboard 2", and the electronic whiteboard 2 directly at a lower position such as the child apparatus-1 relative to the parent apparatus 2p is referred to as an "immediately below electronic whiteboard 2".

Furthermore, for example, the child apparatus-1 to child apparatus-3 and the grandchild apparatus-1 to grandchild apparatus-3, and electronic whiteboards at further lower positions relative to the parent apparatus 2p are referred to as a "relatively lower electronic whiteboard 2". For example, the electronic whiteboards 2 of the child apparatus-1 and the parent apparatus 2p relative to the grandchild apparatus-1 are referred to as a "relatively upper electronic whiteboard 2".

<System Summary>

Figure 3:
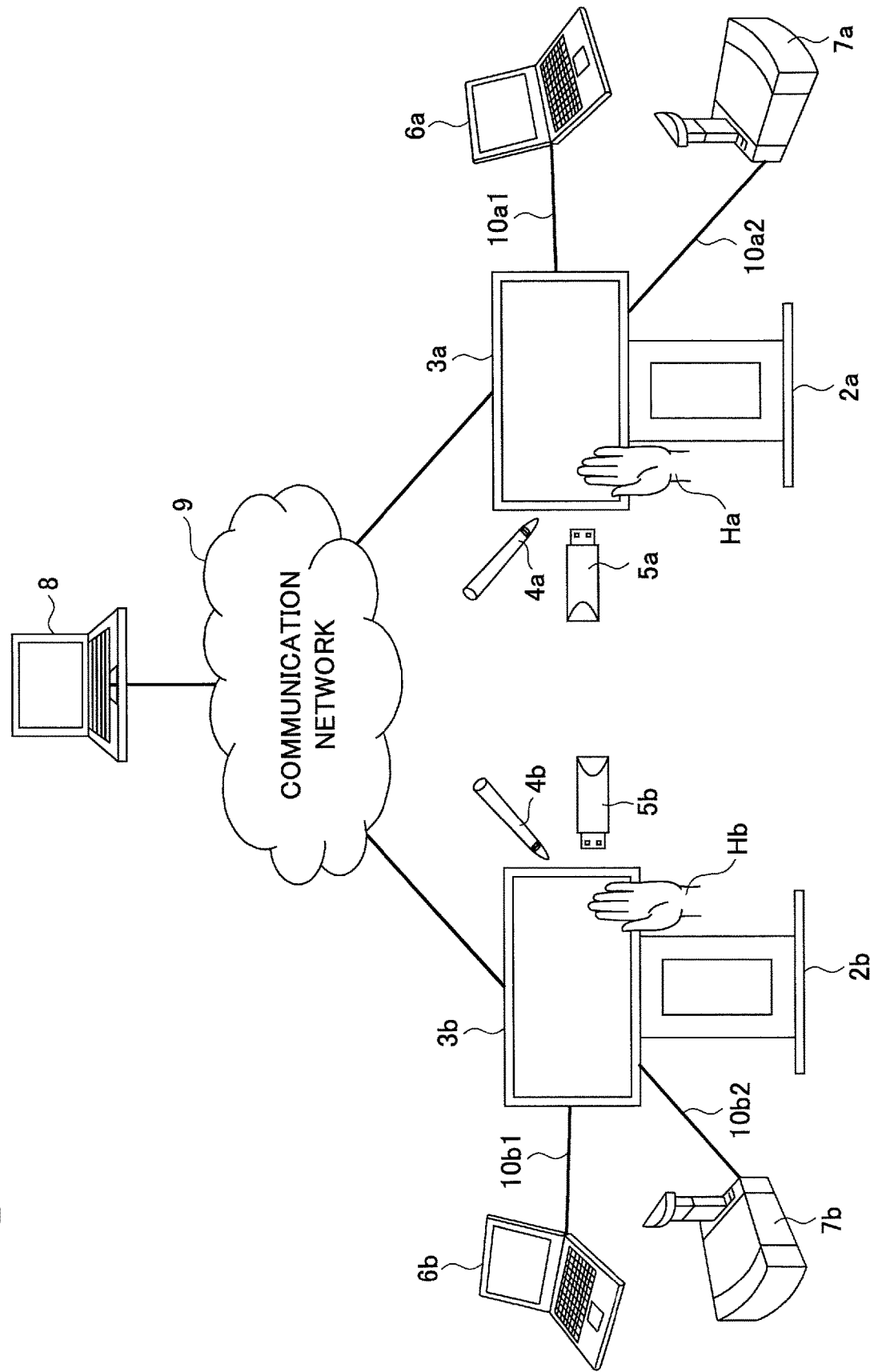
FIG. 3 illustrates an example of an overall structure of the image processing system.

FIG. 3 illustrates an overall structure of the image processing system 1 of this embodiment. Referring to FIG. 3, for simplified explanation, two electronic whiteboards 2a and 2b, electronic pens 4a and 4b attached thereto, and so on are illustrated. At least three electronic whiteboards, electronic pens attached thereto, and so on may be used in the image processing system 1 of this embodiment.

As illustrated in FIG. 3, the image processing system 1 includes multiple electronic whiteboards 2a and 2b, multiple electronic pens 4a and 4b, Universal Serial Bus (USB) memories 5a and 5b, notebook personal computer (PC) 6a and 6b, television (video) meeting terminals 7a and 7b, and a PC 8. Further, the electronic whiteboards 2a and 2b and the PC 8 are coupled through a communication network 9 so as to be communicable. Further, displays 3a and 3b are respectively provided with the multiple electronic whiteboards 2a and 2b.

Further, the electronic whiteboard 2a can cause an image drawn by an event (touching the display 3a with the pen nib or the pen tail of the electronic pen 4a) to be displayed on the display 3a. The electronic whiteboard 2a can change an image displayed on a display 3a based on the event (gesture of enlargement, reduction, page turning, or the like) caused by the electronic pen 4a, a user's hand Ha, or the like.

Further, the USB memory 5a can be coupled to the electronic whiteboard 2a. The electronic whiteboard 2a is enabled to read an electronic file of Portable Document Format (PDF) from the USB memory 5a or record an electronic file in the USB memory 5a. Further, the notebook PC 6a is coupled to the electronic whiteboard 2a through a cable 10a1 enabling communications using standards of DisplayPort ("DisplayPort" is a registered trademark), Digital Visual Interface (DVI), High-Definition Multimedia Interface (HDMI, "HDMI" is a registered trademark), and Video Graphics Array (VGA). Then, the electronic whiteboard 2a causes the event to occur by a touch on the display 3a, and sends event information indicative of the event to the notebook PC 6a in a manner similar to an event from an input apparatus such as a mouse and a keyboard. In a manner similar thereto, a teleconference (video conference) terminal 7a is coupled to the electronic whiteboard 2a through a cable 10a2 enabling the communications using the above standards. The notebook PC 6a and the teleconference terminal 7a may communicate with the electronic whiteboard 2a in conformity with various wireless communication protocols such as Bluetooth ("Bluetooth" is a registered trademark).

Meanwhile, at another location where the electronic whiteboard 2b is installed, the electronic whiteboard 2b having the display 3b, the electronic pen 4b, the USB memory 5b, the notebook PC 6b, the teleconference terminal 7b, a cable 10b1, and a cable 10b2 are used in a manner similar thereto. Further, the electronic whiteboard 2b can change the image displayed on the display 3b based on the event occurred by the user's hand Hb.

With this, an image drawn on the display 3a of the electronic whiteboard 2a at one location is displayed on the display 3b of the electronic whiteboard 2b at another location. On the contrary, an image drawn on the display 3b of the electronic whiteboard 2b at the other location is displayed on the display 3a of the electronic whiteboard 2a at the one location. As described above, because a remote sharing process of sharing the same image as that in a remote location in the image processing system 1, the image processing system 1 is very useful for a meeting with the remote location.

Hereinafter, an arbitrary electronic whiteboard from among multiple electronic whiteboards is referred to as the "electronic whiteboard 2". An arbitrary display from among multiple displays is referred to as a "display 3". An arbitrary electronic pen from among multiple electronic pens is referred to as an "electronic pen 4". An USB memory from among multiple USB memories is referred to as a "USB memory 5". An arbitrary notebook PC from among multiple notebook PCs is referred to as a "notebook PC 6". An arbitrary teleconference terminal from among multiple teleconference terminals is referred to as a "teleconference terminal 7". An arbitrary hand from among multiple users' hands is referred to as a "hand H". An arbitrary cable from among multiple cables is referred to as a "cable 10".

Further, within this embodiment, the electronic whiteboard is described as an example of the image processing apparatus. However, the image processing apparatus is not limited to the electronic whiteboard. Other examples of the image processing apparatus are a digital signage, a telestrators, a remote image (screen image) diagnosing apparatus, and so on. Described next is the notebook PC 6 as an example of the information processing terminal. However, the information processing terminal is not limited to the notebook PC. Other examples of the information processing terminal are a desktop PC, a tablet PC, a Personal Digital Assistant (PDA), a digital video camera, a digital camera, a game machine, or the like, which can supply image frames. Further, the communication network 9 may be any one of the Internet, a local area network (LAN), a mobile phone communication network, and so on or a combination of a part or all of these. Furthermore, within this embodiment, the USB memory is described as an example of a recording medium. However, the recording medium is not limited to the USB memory. Other examples of the recording medium are various recording mediums such as a secure digital (SD) card.

<Hardware Structure of Electronic Whiteboard>

Figure 4:
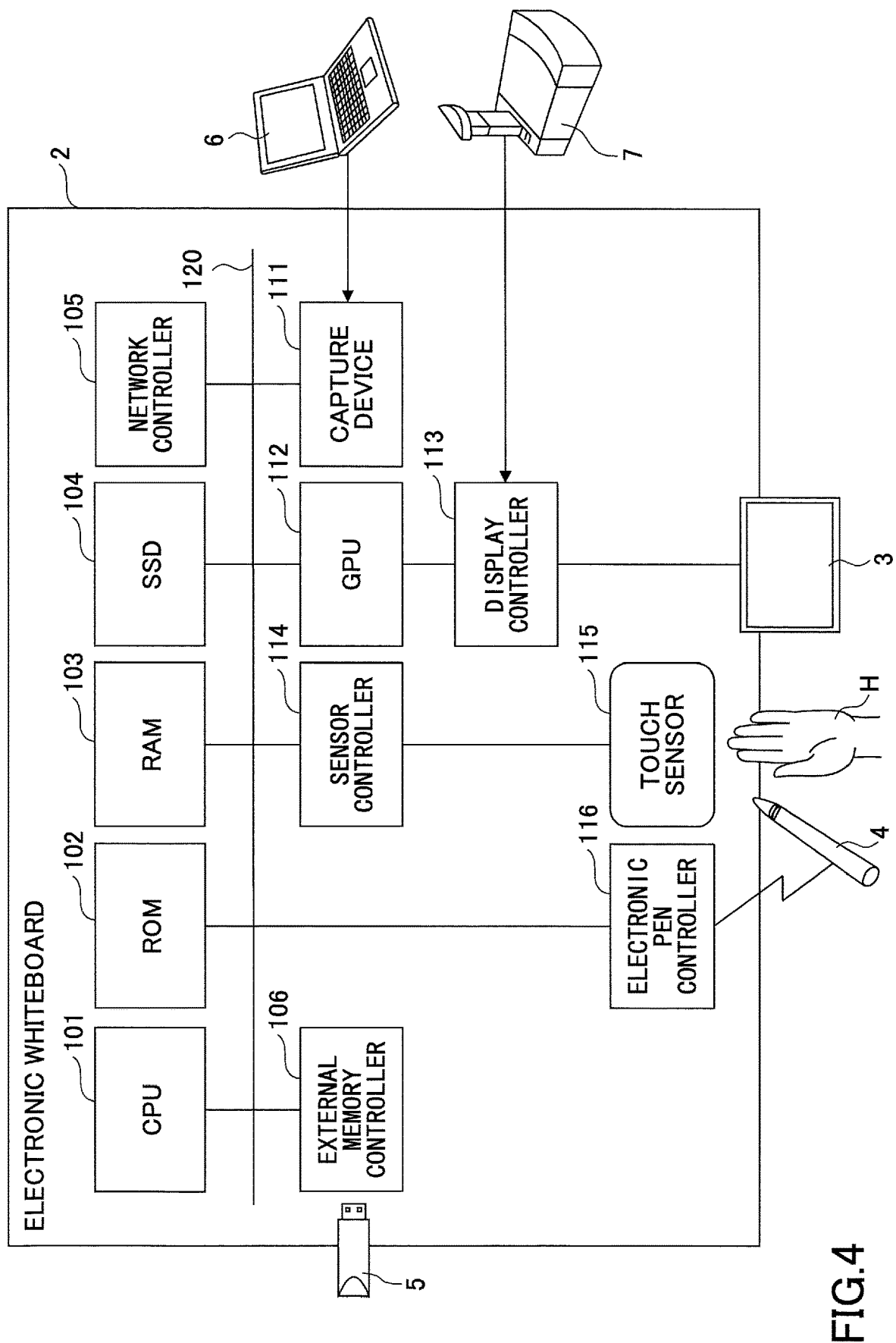
FIG. 4 illustrates an example of a hardware structure of an electronic whiteboard.

Subsequently, referring to FIG. 4, a hardware structure of the electronic whiteboard 2 of this embodiment is described. FIG. 4 illustrates an example of the hardware structure of the electronic whiteboard.

Referring to FIG. 4, the electronic whiteboard 2 includes a central processing unit (CPU) 101 controlling entire operation of the electronic whiteboard 2, a read-only memory (ROM) storing a program used to drive the CPU 101, a random access memory (RAM) 103 used as an work area of the CPU 101, a solid state drive (SSD) 104 storing various data such as a program for the electronic whiteboard 2, a network controller 105 controlling communications with the communication network 9, and an external memory controller 106 controlling communications with the USB memory 5.

Further, the electronic whiteboard 2 includes a capture device 111 for causing the display of the notebook PC 6 to display screen image information as a still image or a moving image, a Graphics Processing Unit (GPU) 112 exclusively handling graphics, and display controller 113 of controlling and managing a screen display so as to output on output image from the GPU 112 to the display 3 and the teleconference terminal 7.

Further, the electronic whiteboard 2 includes a sensor controller 114 for controlling a process of a touch sensor 115, and the touch sensor for detecting a touch of the electronic pen 4 or the user's hand to the display 3. This touch sensor 115 performs an input of a coordinate and a detection of the coordinate by an infrared ray interrupting method. This method of performing the input of the coordinate and the detection of the coordinate are implemented by two light receiving and detecting apparatuses installed at both ends of the upper sides of the display 3. The two light receiving and detecting apparatuses emit multiple infrared rays in parallel with the display 3, the multiple infrared rays are reflected by a reflecting part provided in the periphery of the display 3, and the light receiving element receives the light returning through the same light path as the light path of the emitted infrared ray. The touch sensor 115 outputs identification (ID) of the infrared rays that are emitted by the two light receiving and detecting apparatuses and interrupted by an object, and the sensor controller 114 specifies a coordinate position where the object touches the electronic whiteboard. All IDs described below are examples of the identification information.

The touch sensor 115 may not be limited to the sensor of the infrared ray cutting off touch panel. Other examples are various detecting means such as a touch panel of a capacitive sensing type that detect a change of electrostatic capacity to specify a touch position, a touch panel of a resistive film type that specifies the touch position using a voltage change in two facing resistive films, and a touch panel of an electromagnetic induction type that detects electromagnetic induction caused by a contact of a touching object and specifies the touch position.

Further, the electronic whiteboard 2 has an electronic pen controller 116. This electronic pen controller 116 communicates with the electronic pen 4 to determine whether there is a touch of a pen nib or a pen tail on the display 3. The electronic pen controller 116 may determine whether there is a touch of a part of the electronic pen 4 grasped by the user or another part of the electronic pen 4 in addition to the touch of the pen nib and the pen tail.

Further, the electronic whiteboard 2 has a bus line 120 such as an address bus and a data bus for electrically couple the CPU 101, the ROM 102, the RAM 103, the SSD 104, the network controller 105, the external memory controller 106, the capture device 111, the GPU 112, the sensor controller 114, and the electronic pen controller 116 as illustrated in FIG. 3.

The program for the electronic whiteboard 2 may be recorded in a recording medium such as a CD-ROM readable by a computer and distributed.

<Functional Structure of Electronic Whiteboard>

Figure 5:
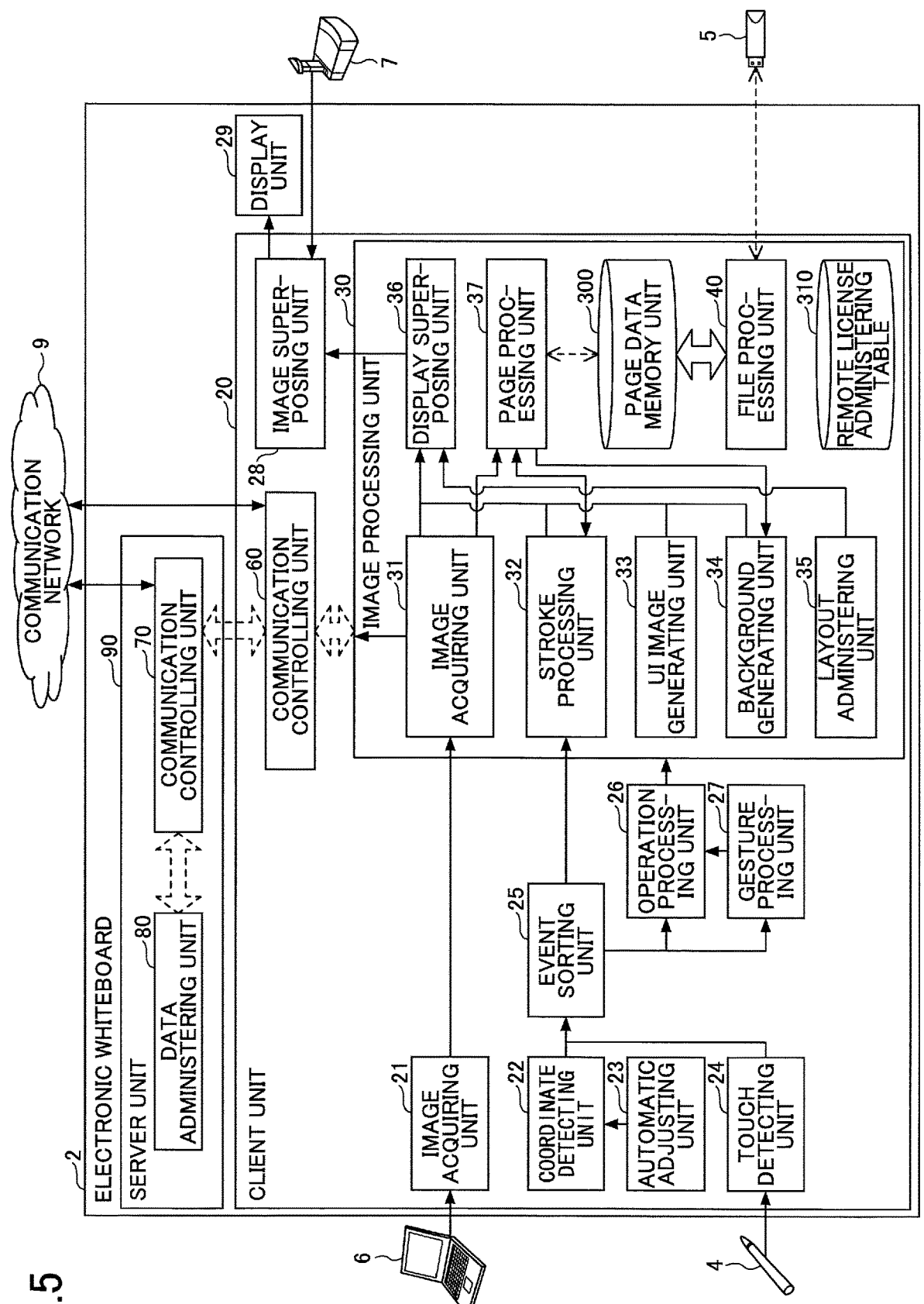
FIG. 5 is an example of a functional block diagram of the electronic whiteboard.

Referring to FIGS. 5-8, described next is a functional structure of the electronic whiteboard 2. At first, referring to FIG. 5, an overall functional structure of the electronic whiteboard 2 is described. FIG. 5 is an example of a functional block diagram of the electronic whiteboard 2.

The electronic whiteboard 2 implements various functional structures illustrated in FIG. 5 using the hardware structure illustrated in FIG. 4 and the program. The electronic whiteboard 2 may be a "hosting apparatus" firstly starting a remote sharing process and also a "participating apparatus" participating later in a remote sharing process, which has already been started. The electronic whiteboard 2 roughly has both of a client unit 20 and a server unit 90. The client unit 20 and the server unit 90 are functions implemented in the casing of the single electronic whiteboard 2. When the electronic whiteboard 2 is a hosting apparatus, the client unit 20 and the server unit 90 are implemented by this electronic whiteboard 2. When the electronic whiteboard 2 is the participating apparatus, the client unit 20 is implemented by this electronic whiteboard 2. However, the server unit 90 is not implemented by the electronic whiteboard 2. For example, referring to FIG. 3, in a case where the electronic whiteboard 2a is the hosting apparatus and the other electronic whiteboard 2b is the participating apparatus, the client unit 20 of the electronic whiteboard 2a communicates with the client unit 20 of the client unit 20 of the electronic whiteboard 2a communicates with the client unit 20 of the other electronic whiteboard 2b through the server unit 90 implemented inside the electronic whiteboard 2a. Electronic whiteboard 2b through the server unit 90 implemented inside the electronic whiteboard 2a. Meanwhile, the client unit 20 of the electronic whiteboard 2b communicates with the client unit 20 of the other electronic whiteboard 2a through the server unit 90 implemented inside the other electronic whiteboard 2a.

[Functional Structure of Client Unit 20]

Figure 6:
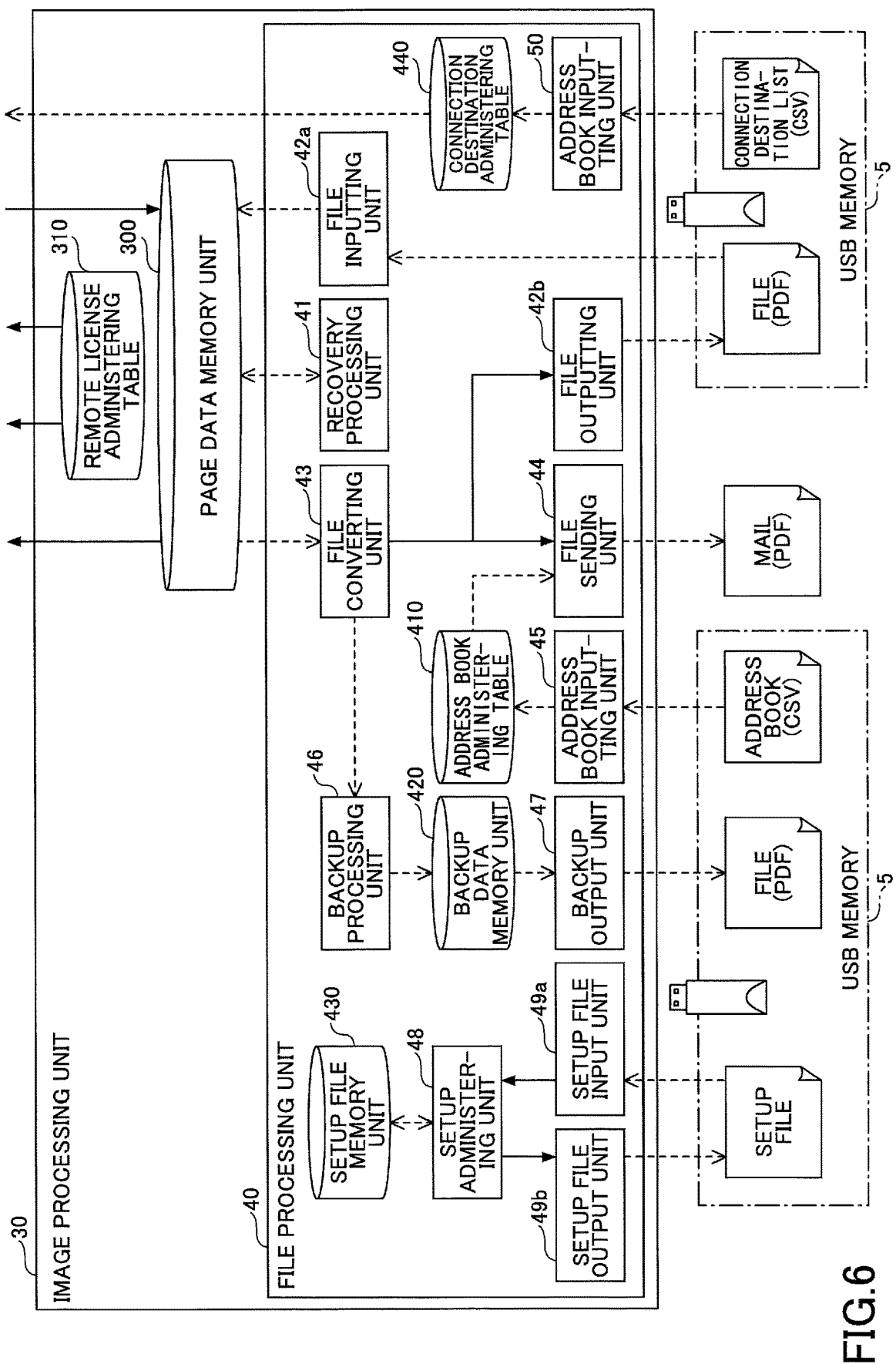
FIG. 6 is an example of a functional block diagram of a file processing unit.
Figure 7:
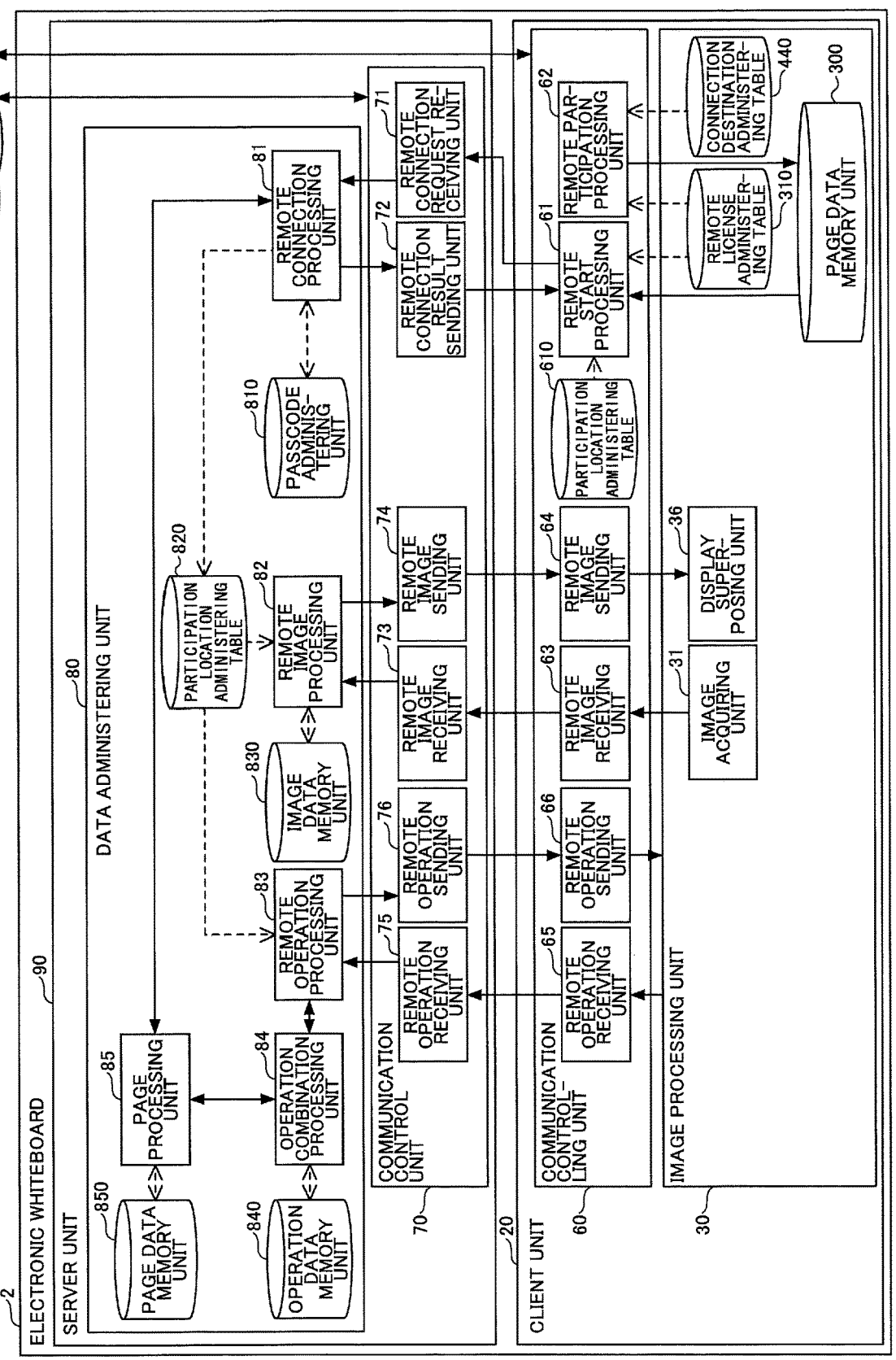
FIG. 7 is an example of a functional block diagram of a server unit and a client unit.

Referring to FIGS. 5-7, described next is the functional structure of the client unit 20. The client unit 20 includes a screen image acquiring unit 21, a coordinate detecting unit 22, an automatic adjusting unit 23, a touch detecting unit 24, an event sorting unit 25, an operation processing unit 26, a gesture processing unit 27, a screen image superposing unit 28, an image processing unit 30, and a communication controlling unit 60.

Among these, the screen image acquiring unit 21 acquires an output image from a screen image outputting apparatus coupled to the cable 10. When the screen image acquiring unit 21 receives an image signal from the screen image outputting apparatus, the screen image acquiring unit 21 analyzes this image signal, derives image information such as the resolution of an image frame being a display image of the screen image outputting apparatus generated by the image signal and the frequency of update of the image frame, and outputs the image information to the image acquiring unit 31.

The coordinate detecting unit 22 detects a coordinate position of an event (operation that the user's hand touches the display or the like) caused by the user on the display 3. The coordinate detecting unit 22 also detects an area that the user's hand touches the display 3.

The coordinate detecting unit 22 for detecting the coordinate by an optical sensor type adjusts a parameter at a time of processing the image of a sensor camera so that the automatic adjusting unit 23 is activated at a time of activating (or at a time of restarting) the electronic whiteboard 2 and the coordinate detecting unit 22 can output an appropriate value.

The touch detecting unit 24 detects an event (operation of pushing the pen nib or the pen tail of the electronic pen 4 against the display to cause the pen nib or the pen tail to touch the event.

The event sorting unit 25 sorts the coordinate position of the event detected by the coordinate detecting unit 22 and a detection result detected by the touch detecting unit 24 into various events such as a stroke draw, a user interface (UI) operation, and a gesture operation. Here, the "stroke draw" is an event in which the user causes the electronic pen 4 to touch the display 3, the electronic pen 4 is moved while the electronic pen 4 touches the display 3, and the electronic pen 4 is moved away from the display 3, in a case where a stroke image (B) (described below and illustrated in FIG. 8) is displayed on the display 3. For example, alphabetical letters "S", "T", or the like are drawn on the display using the stroke draw. This "stroke draw" includes not only the event of drawing the image but also an event of deleting the already drawn image and an event of editing the drawn image.

The "UI operation" is an event in which the user touches a predetermined position with the electronic pen 4 or the user's hand H in a case where an UI image (A) (described below and illustrated in FIG. 8) is displayed on the display 3. With this UI operation, for example, the color, the width, or the like of a line drawn by the electronic pen 4 is set.

The "gesture operation" is an event that the user's hand H touches or moves on the display 3 in a case where the stroke image (B) illustrated in FIG. 8 and described later is displayed on the display 3. With this gesture operation, for example, when the user moves the user's hand H while the user's hand H touches the display 3, the user can enlarge or reduce the image, change a display area, and change the opened page.

The operation processing unit 26 executes various operations in accordance with elements of the UI on which the event is performed based on the event determined to be the UI operation by the event sorting unit. The elements of this UI are, for example, a button, a list, a check box, a text box, and so on. The gesture processing unit 27 executes an operation corresponding to what determined by the event sorting unit to be the gesture operation.

The screen image superposing unit 28 causes an image superposed by the display superposing unit 36 described later to be displayed on the display unit 29. The display unit 29 performs a display function implemented by the display 3. The screen image superposing unit 28 displays a screen image received from a screen image outputting apparatus (a notebook PC 6 and so on) and additionally another screen image received from another screen image outputting apparatus (a teleconference terminal 7 and so on) using a so-called picture-in-picture function. Further, the screen image superposing unit 28 can perform a changeover where a screen image displayed in a part of the display unit 29 using the picture-in-picture function is caused to be displayed on the entire display unit 29.

The image processing unit 30 performs a superposing process of superposing various image layers illustrated in FIG. 8. This image processing unit 30 includes an image acquiring unit 31, a stroke processing unit 32, a UI image generating unit 33, a background generating unit 34, a layout administering unit 35, a display superposing unit 36, a page processing unit 37, a file processing unit 40, a page data memory unit 300, and a remote license administering table 310.

The image acquiring unit 31 acquires various frames as images from screen images acquired by the screen image acquiring unit 21. The image acquiring unit 31 outputs data of the images to the page processing unit 37. These images correspond to output images (C) from the screen image outputting apparatus (the notebook PC 6 or the like) illustrated in FIG. 8.

The stroke processing unit 32 draws images, deletes the drawn images, and edits the drawn images based on an event related to the stroke draw allocated by the event sorting unit 25. An image obtained by this stroke draw corresponds to the stroke image (B) illustrated in FIG. 8. Results of drawing, deleting, and editing the image based on this stroke draw are stored in an operation data memory unit 840.

The UI image generating unit 33 generates an UI image previously set in the electronic whiteboard 2. This UI image corresponds to an UI image (A) illustrated in FIG. 8. The background generating unit 34 receives media data from among page data read by the page processing unit 37 from the page data memory unit 300. The background generating unit 34 outputs the received media data to the display superposing unit 36. Further, the image obtained by the media data corresponds to a background image (D) illustrated in FIG. 8. The pattern of the background image (D) is a solid color, a grid display, or the like.

The layout administering unit 35 administers layout information indicative of layouts of the images output from the image acquiring unit 31, the stroke processing unit 32, the UI image generating unit 33 (or the background generating unit 34) to the display superposing unit 36. With this, the layout administering unit 35 can instruct the display superposing unit 36 to display the output image at which position inside the UI image (A) and the background image (D) or not to display.

The display superposing unit 36 performs layout of images output from the image acquiring unit 31, the stroke processing unit 32, and the UI image generating unit 33 (the background generating unit 34) based on the layout information output from the layout administering unit 35.

The page processing unit 37 combines data of the stroke image (B) with data of the output image (C) into one page data and stores the one page data in the page data memory unit 300. The data of the stroke image (B) forms a part of page data as stroke array data (each stroke data) indicated by a stroke array data ID in Table 1 described below. The data of the output image (C) is media data identified by a media data ID in Table 1 and forms a part of the page data. This media data is read out of the page data memory unit 300 and then handled as data of the background image (D).

The page processing unit 37 sends the media data of the once stored page data to the display superposing unit 36 through the background generating unit 34 to make the screen image superposing unit 28 display the background image (D) on the display 30 again. Further, the page processing unit 37 returns the stroke array data (each stroke data) of the page data to the stroke processing unit 32 to enable the stroke to be re-edited. Further, the page processing unit 37 can delete or copy the page data.

Said differently, at a time when the page processing unit 37 stores the page data in the page data memory unit 300, the data of the output image (C) displayed on the display 3 is once stored in the page data memory unit 300, and thereafter read from the page data memory unit 300 as the media data indicating the background image (D). Then, the page processing unit 37 outputs the stroke data indicating the stroke image (B) from among the page data read from the page data memory unit 300 to the stroke processing unit 32. The page processing unit 37 outputs the media data, which are included in the page data memory unit 300 and indicates the background image (D), to the background generating unit 34.

The display superposing unit 36 superposes the output image (C) from the image acquiring unit 31, the stroke image (B) from the stroke processing unit 32, the UI image (A) from the UI image generating unit 33, and the background image (D) from the background generating unit 34 in accordance with the layout designated by the layout administering unit 35. As a result, as illustrated in FIG. 8, it is possible to obtain a layer structure, in which the UI image (A), the stroke image (B), the output image (C), and the background image (D) superpose, in an order of enabling the user to see the images even though the images overlap.

Further, it is possible that the display superposing unit 36 switches between the images (C) and (D) illustrated in FIG. 8, and exclusively superposes the switched image on the images (A) and (B). For example, there may be a case where the cable between the electronic whiteboard 2 and the screen image outputting apparatus (the notebook PC 6 or the like) is discoupled while the images (A), (B), and (C) are displayed. In this case, the layout administering unit 35 instructs to remove the image (C) from the superposition target and display the image (D). In this case, the display superposing unit 36 performs a process of enlarging the display, a process of reducing the display, and a process of moving the display area.

The page data memory unit 300 stores page data illustrated in Table 1.

TABLE 1

| PAGE DATA ID | START TIME | END TIME | STROKE PLACEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| . | . | . | . | . |
| . | . | . | . | . |
| . | . | . | . | . |

Table 1 schematically presents page data. The page data include data (stroke array data (stroke data) and media data) for one page displayed on the display 3. Because types of, parameter included in the page data are great in number, the contents of the page data are separately described in Tables 1 to 4.

As presented in Table 1, the page data includes a page data ID for identifying an arbitrary one page, a starting time for indicating a time of starting display of this page, an ending time for indicating a time when overwrite of a page content is stopped to be overwritten by the stroke, the gesture, or the like, a stroke array data ID for identifying stroke array data generated by the electronic pen 4 or the user's hand H. These page data ID, the starting time, the ending time, the stroke array data ID, and the media data ID are mutually associated and stored. The stroke array data is data used to display the stroke image (B) illustrated in FIG. 8 on the display 3. The media data is data used to display the background image (D) illustrated in FIG. 8 on the display 3.

In this page data, for example, in a case where the user draws the alphabetical letter "S" using the electronic pen 4, the alphabetical letter "S" can be written with one writing brush (traversable). Therefore, the stroke data of the alphabetical letter "S" can be identified by one stroke data ID. On the other hand, in a case where the user draws the alphabetical letter "T" using the electronic pen 4, the alphabetical letter "T" can be written with two writing brushes. Therefore, the one alphabetical letter "T" is identified by two stroke data IDs.

TABLE 2

| STROKE DATA ID | START TIME | END TIME | COLOR | WIDTH | COORDINATE PLACEMENT DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| . | . | . | . | . | . |
| . | . | . | . | . | . |
| . | . | . | . | . | . |

The stroke array data has detailed information as presented in Table 2. Table 2 schematically presents one stroke data from among multiple stroke array data st001, st002, st003, or the like. As described above, the one stroke data includes multiple stroke data. The one stroke data a stroke data ID for identifying this stroke data, the starting time for indicating a time of starting drawing of one stroke, the ending time for indicating a time of ending the drawing of the one stroke, the color of the stroke, the width of the stroke, a coordinate placement data ID for identifying coordinate placement data that indicate placement of pass points of the stroke.

TABLE 3

| X-COORDINATE VALUE | Y-COORDINATE VALUE | DIFFERENCE TIME | WRITING PRESSURE |
|---|---|---|---|
| 10 | 10 | 100 | 255 |
| 12 | 10 | 200 | 255 |
| 14 | 12 | 300 | 255 |
| . | . | . | . |
| . | . | . | . |
| . | . | . | . |

This coordinate placement data has detailed information as presented in FIG. 3. Table 3 schematically present one coordinate placement data from among multiple coordinate placement data c001, c002, c003, or the like. As presented in Table 3, the one coordinate placement data includes data of the multiple pass points. Then, the data of the one pass point includes various information such as a one point (X-coordinate value and Y-coordinate value) on the display, a difference time (ms) from the starting time when the stroke passes over this one point, writing pressure in the electronic pen 4 at this one. Said differently, a group of multiple pass points indicated by the one coordinate placement data (for example, coordinate placement data of a coordinate placement data ID of c001) is presented as the coordinate placement data of the coordinate placement data ID of c001 presented in Table 2. For example, in a case where a user draws an alphabetical letter "S" using the electronic pen 4, the alphabetical letter "S" is written with one writing brush (traversable). However, because the multiple pass points are passed over until the alphabetical letter "S" is completely written, the coordinate placement data have information of multiple pass points.

Further, media data in the page data presented in Table 1 has detailed information as presented in Table 4.

TABLE 4

| MEDIA DATA ID | DATA TYPE | RECODED TIME | X-COORDINATE VALUE | Y-COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| . | . | . | . | . | . | . | . |
| . | . | . | . | . | . | . | . |
| . | . | . | . | . | . | . | . |

Table 4 schematically presents media data. As presented in Table 4, the media data includes the media data ID in the page data presented in Table 1, a data type of the media data, a recoded time when the page data from the page processing unit 37 are stored in the page data memory unit 300, the position (an X-coordinate value, a Y-coordinate value) of an image displayed on the display 3 by the page data, and the size (the width, the height) of the image, and data indicating the content of the media data. These media data ID, the data type, the recoded time, the X-coordinate value, the Y-coordinate value, the width, the height, and the data are mutually associated. Among these, the position (the X-coordinate value, the Y-coordinate value) of the image displayed on the display 3 by the page data indicates the position of the left upper end of the image displayed by the page data in a case where the coordinate of the left upper end of the display 3 is represented by (the X-coordinate value, the Y-coordinate value)=(0, 0).

Referring back to FIG. 5, the description is continued. The remote license administering table 310 administers license data necessary to perform the remote sharing process. In this remote license administering table 310, as presented in Table 5, a product ID of the electronic whiteboard 2, a license ID used for the authentication and an expiration data of the license are mutually associated and administered.

TABLE 5

| PRODUCT ID | LICENSE ID | EXPIRATION DATE |
|---|---|---|
| 1001 | 12345678abcdefgh | 2012 Dec. 31 |
| 1001 | 4321dcba8765hgfe | — |
| . | . | . |
| . | . | . |

(Functional Structure of File Processing Unit 40)

Subsequently, referring to FIG. 6, the functional structure of the file processing unit 40 illustrated in FIG. 5 is explained. FIG. 6 is an example of a functional block diagram of the file processing unit. The file processing unit 40 includes a recovery processing unit 41, a file inputting unit 42a, a file outputting unit 42b, a file converting unit 43, a file sending unit 44, an address book inputting unit 45, a backup processing unit 46, a backup output unit 47, a setup administering unit 48, a setup file input unit 49a, a setup file output unit 49b, and an address book inputting unit 50. Further, the file processing unit 40 includes an address book administering table 410, a backup data memory unit 420, a setup file memory unit 430, and a connection destination administering table 440.

After the electronic whiteboard 2 abnormally ends, the recovery processing unit 41 detects an abnormal end and recovers the page data which has not been stored. For example, in a case where the electronic whiteboard 2 normally ends, the page data are recorded in the USB 5 as a PDF file through the file processing unit 40. However, in the case where the electronic whiteboard 2 abnormally ends, the page data are recorded in the page data memory unit 300. Therefore, when the power source is turned on again, the recovery processing unit 41 recovers the page data by reading the page data from the page data memory unit 300 to recover the page data.

The file inputting unit 42a reads a PDF file from the USB memory 5, and stores the pages as page data in the page data memory unit 300. The file converting unit 43 converts the page data stored in the page data memory unit 300 to a file of a PDF format.

The file outputting unit 42b records the PDF file output by the file converting unit 43 in the USB memory 5.

The file sending unit 44 attaches a PDF file created by the file converting unit 43 to an electric mail and sends the electric mail. The sending destination of the file is determined as follows. The display superposing unit 36 displays the contents of the address book administering table 410 on the display 3. The user selects a destination by operating an input apparatus such as a touch panel. Then, the file sending unit 44 receives the selection of the destination. As described above, the sending destination of the file is determined. As presented in Table 6, the name of the destination and the mail address of the electronic mail of the destination are mutually associated and administered in the address book administering table 410.

TABLE 6

| NAME | MAIL ADDRESS |
|---|---|
| TARO | taro@alpha.co.jp |
| HANAKO | hanako@beta.co.jp |
| — | jiro@gamma.co.jp |
| . | . |
| . | . |
| . | . |

The sending destination of the file may be determined as follows. When the user inputs a mail address as an address by operating an input apparatus such as a touch panel, the file sending unit 44 receives the input of the mail address as the address. As described above, the sending destination of the file is determined.

The address book inputting unit 45 reads a view file of electronic mail addresses from the USB memory 5, and administers the view file of the electronic mail addresses in the address book administering table 410.

The backup processing unit 46 stores the file output by the file outputting unit 42b or the file sent by the file sending unit 44 in the backup data memory unit 420. In a case where the user does not conduct a backup setup, the backup is not processed. The backed up file is stored in the PDF format as presented in Table 7.

TABLE 7 iwb_20130610104423.pdf
iwb_20130625152245.pdf
iwb_20130628113418.pdf
.
.

The backup output unit 47 stores the backed up file in the USB memory 5. At the time of storing the backed up file, a passcode is input when the user operates an input device such as a touch panel.

The setup administering unit 48 administers by storing or reading various setup information of the electronic whiteboard 2 in or out the setup file memory unit 430. The various setup information is, for example, a network setup, a setup of date and hour, a setup of land area ad language, a setup of mail server, a setup of address book, a setup of connection destination list, and a setup of backup. The network setup is, for example, a setup of the IP address of the electronic whiteboard 2, a setup of net mask, a setup of default gateway, or a domain name system (DNS). Setup information is described further below.

The setup file output unit 49b causes various setup information of the electronic whiteboard 2 to be stored in the SB memory 5 as the setup file. The security function prevents the user to see the contents of the setup file.

The setup file input unit 49a reads the setup file stored in the USB memory 5 and reflects various setup information in various setups of the electronic whiteboard 2.

The address book inputting unit 50 reads a view file of the connection destination IP address for a remote sharing process from the USB memory 5 and administers the view file of the connection destination IP address of the read remote sharing process using the connection destination administering table 440. An example of the connection destination administering table 440 is presented in Table 8.

TABLE 8

| NAME | IP ADDRESS |
|---|---|
| MEETING ROOM 1 | 192.0.0.1 |
| MEETING ROOM 2 | 192.0.0.2 |
| — | 192.0.0.3 |
| . | . |
| . | . |
| . | . |

The connection destination administering table 440 is a table, in which the user of the electronic whiteboard 2 as a participating apparatus previously administers the IP address of the electronic whiteboard 2. By previously administering the IP address of the electronic whiteboard 2 as the hosting apparatus, it is possible for the user of the participating apparatus to reduce time and effort of inputting the IP address of the electronic whiteboard 2 as the hosting apparatus in a case where the electronic whiteboard 2 is a participating apparatus which is going to participate in the remote sharing process. In this connection destination administering table 440, the name of a location where the electronic whiteboard 2 usable as the hosting apparatus is installed and the IP address of the electronic whiteboard 2 as the hosting apparatus are mutually associated and administered.

The connection destination administering table 440 may not be present. However, in this case, it is necessary for the user of the participating apparatus to input the IP address of the hosting apparatus using the input device such as a touch panel in order to start a remote request start between the user and the hosting apparatus. Therefore, the user of the participating apparatus is to know the IP address of the hosting apparatus from the user of the hosting apparatus using telephone, electric mail, or the like.

(Functional Structure of Communication Control Unit 60)

Next, referring to FIG. 7, the functional structure of the communication controlling unit 60 is described. FIG. 7 is an example of a functional block diagram of the server unit 90 and the client unit 20. The communication controlling unit 60 controls communications with the other electronic whiteboard 2 through the communication network 9 and communications with the communication controlling unit 70 described later by the server unit 90. Therefore, the communication controlling unit 60 includes a remote start processing unit 61, a remote participation processing unit 62, a remote image receiving unit 63, a remote image sending unit 64, a remote operation receiving unit 65, a remote operation sending unit 66, and a participation location administering table 610.

Among these, the remote start processing unit 61 requests the server unit 90 of the electronic whiteboard 2 including the remote start processing unit 61 to newly start the remote sharing process and receives a result for this request from the server unit 90. In this case, the remote start processing unit 61 refers to the remote license administering table 310. As a result, in a case where the license information (a product ID, a license ID, and a product ID) is administered by the remote license administering table 310, the remote start processing unit 61 can request to start the remote sharing process. On the other hand, in a case where the license information is not administered in the license administering table 310, the remote start processing unit 61 cannot request to start the remote sharing process.

In a case where the electronic whiteboard 2 is the hosting apparatus, the participation location administering table 610 administers the electronic whiteboard 2 as a participating apparatus currently participating in the remote sharing process. An example of the participation location administering table 610 is presented in Table 9.

TABLE 9

| NAME | IP ADDRESS |
| --- | --- |
| MEETING ROOM 1 | 192.0.0.1 |
| MEETING ROOM 2 | 192.0.0.2 |
| — | 192.0.0.8 |
| . | . |
| . | . |
| . | . |

In this participation location administering table 610, the name of a location where the participating electronic whiteboard 2 is installed and the IP address of the electronic whiteboard 2 are mutually associated and administered.

The remote participation processing unit 62 sends a participation request for requesting to participate in the remote sharing process through the communication network 9 to the remote connection request receiving unit 71 in the server unit 90 of the electronic whiteboard 2 as the hosting apparatus, which has already started the remote sharing process. In this case, the remote participation processing unit 62 refers to the remote license administering table 310. Further, in a case where the user participates in the remote sharing process which has been already started, the remote participation processing unit 62 refers to the connection destination administering table 440 and acquires the IP address of the electronic whiteboard 2 performing the remote sharing process of a participation destination is conducted. The connection destination administering table may not be referred to by the remote participation processing unit 62. Then, the user may input by operating the input device such as a touch panel to input the IP address of the electronic whiteboard 2 performing the remote sharing process of the participation destination.

The remote image receiving unit 63 sends an output image (C) sent from the screen image acquiring unit 21 through the image acquiring unit 31 to the server unit 90.

The remote image sending unit 64 receives the image data of the screen image outputting apparatus connected to the other electronic whiteboard 2 from the server unit 90 and outputs the image data to the display superposing unit 36 to enable to perform the remote sharing process.

The remote operation receiving unit 65 sends various operation data necessary for the remote sharing process to the server unit 90. Various operation data are, for example, addition of stroke, deletion of stroke, edit (enlargement, reduction, and movement) of stroke, storage of page data, generation of page data, copy of page data, deletion pf page data, switch of displayed page data, and so on. The remote operation sending unit 66 performs a remote sharing process of receiving the operation data input in the other electronic whiteboard 2 from the server unit 90, and outputting the received operation data to the image processing unit 30.

[Functional Structure of Server Unit]

Next, referring to FIG. 7, the functional structure of the server unit 90 is described. The server unit 90 is provided in every electronic whiteboard 2, and any one of the electronic whiteboards can play a role as the server unit. Therefore, the server unit 90 has the communication controlling unit 70 and the data administering unit 80.

(Functional Structure of Communication Controlling Unit 70)

Next, referring to FIG. 7, the functional structure of the communication controlling unit 70 is described.

The communication controlling unit 70 controls communications with the communication controlling unit 60 in the client unit 20 inside the electronic whiteboard 2 including the communication controlling unit 70 and communications through the communication network 9 with the communication controlling unit 60 in the client unit 20 inside the other electronic whiteboard 2 including the communication controlling unit 70. The data administering unit 80 administers the operation data, the image data, and so on.

More specifically, the communication controlling unit 70 includes a remote connection request receiving unit 71, a remote connection result sending unit 72, a remote image sending unit 73, a remote image receiving unit 74, a remote operation sending unit 75, and a remote operation receiving unit 76.

Among these, the remote connection request receiving unit 71 receives a start request for requesting to start the remote sharing process from the remote start processing unit 61 and receives a participation request for participating in the remote sharing process from the remote participation processing unit 62. The remote connection request receiving unit 72 sends a result of the start request for requesting to start the remote sharing process to the remote start processing unit 61 and sends a result of the participation request for participating in the remote sharing process to the remote participation processing unit 62.

The remote image sending unit 73 receives the image data (data of an output image (C)) from the remote image receiving unit 63 and sends the image data to the remote image processing unit 82. The remote image receiving unit 74 receives the image data from the remote image processing unit 82 and sends the received image data to the remote image sending unit 64.

The remote operation sending unit 75 receives the operation data (data of stroke image (B)) from the remote operation receiving unit 65 and sends the received operation data to the remote operation processing unit 83 described later. The remote operation receiving unit 76 receives the operation data from the remote operation processing unit 83 and sends the received operation data to the remote operation sending unit 66.

(Functional Structure of Data Administering Unit)

Next, referring to FIG. 7, the functional structure of the data administering unit 80 is described. The data administering unit 80 includes a remote connection processing unit 81, a remote image processing unit 82, a remote operation processing unit 83, an operation combination processing unit 84, and a page processing unit 85. Further, the data administering unit 80 includes a passcode administering unit 810, a participation location administering table 820, an image data memory unit 830, an operation data memory unit 840, and a page data memory unit 850.

In this, the remote connection processing unit 81 starts the remote sharing process and ends the remote sharing process. Further, the remote connection processing unit 81 checks whether the license is present or whether the expiry date of the license does not elapse based on license information received by the remote connection request receiving unit 71 from the remote start processing unit 61 simultaneously with the start request of starting the remote sharing process or the license information received from the remote participation processing unit 62 simultaneously with the participation request of participating in the remote sharing process. Further, the remote connection processing unit 81 checks whether the participation requests from the other electronic whiteboards 2 as the clients units exceed a predetermined participation permissible number.

Further, the remote connection processing unit 81 determines whether the passcode sent when there is a participation request from the other remote sharing process to participate in the remote sharing process is the same as the passcode administered by the passcode administering unit 810. In a case where the passcode sent when there is the participation request from the other remote sharing process to participate in the remote sharing process is the same as the passcode administered by the passcode administering unit 810, the remote connection processing unit 81 permits to participate in the remote sharing process. This passcode is issued by the remote connection processing unit 81 at a time of newly start the remote sharing process and notified by a user of the electronic whiteboard 2 as a participating apparatus being about to participate in the remote sharing process using telephone, an electric mail, or the like. Then, the participation is permitted when the user of the participating apparatus about to participate in the remote sharing process inputs the passcode using the input device such as a touch panel and sends a participation request. In a case where priority is given to usability for the user rather than to security, only a license state may be checked without checking the passcode.

In a case where the electronic whiteboard 2 is the hosting apparatus, the remote connection processing unit 81 stores participation location information included in the participation request sent from the remote participation processing unit 62 of the participating apparatus in the participation location administering table 820. The remote connection processing unit 81 reads out remote location information stored in the participation location administering table 820 and sends the read remote location information to the remote connection result sending unit 72. The remote connection result sending unit 72 sends remote location information to the remote start processing unit 61 in the client unit 20. The remote start processing unit 61 stores the remote location information in the participation location administering table 610. With this, in the hosting apparatus, the remote location information is administered both in the client unit 20 and the server unit 90.

The remote image processing unit 82 receives the image data (the output image (C)) from the screen image outputting apparatus (the notebook PC 6 or the like) coupled to the client unit (including the client unit of the electronic whiteboard 2 as the hosting apparatus) of the electronic whiteboards 2 during the remote sharing process and stores the image data in the image data memory unit 830. The remote image processing unit 82 further determines a display order of displaying the image data subjected to the remote sharing process in accordance with a time order of arriving at the server unit 90 of the electronic whiteboard 2 of the hosting apparatus. Further, the remote image processing unit 82 refers to the participation location administering table 820 and sends the image data to the client units 20 (including the client unit of the electronic whiteboard 2 as the hosting apparatus) participating in the remote sharing process) of all the electronic whiteboards 2 participating in the remote sharing process through the communication controlling unit 70 (the remote image receiving unit 74) in the order determined above.

The remote operation processing unit 83 receives various operation data (the stroke image (B) or the like) such as the stroke image or the like drawn by the client unit (including the client unit of the electronic whiteboard 2 as the hosting apparatus) of the electronic whiteboards 2 during the remote sharing process and determines the display order of displaying the images subjected to the remote sharing process in accordance with the time order that the various operation data arrive at the server unit 90 of the electronic whiteboard 2 as the hosting apparatus. These various operation data are the same as the various operation data described above. Further, the remote operation processing unit 83 refers to the participation location administering table 820 and sends the operation data to the client units 20 (including the client unit of the electronic whiteboard 2 as the hosting apparatus) of all electronic whiteboards 2 during the remote sharing process.

The operation combination processing unit 84 combines operation data of each electronic whiteboard 2 output from the remote operation processing unit 83, stores operation data as a result of the combination in the operation data memory unit 840, and returns the operation data as the result of the combination to the remote operation processing unit 83. These operation data are sent from the remote operation receiving unit 76 to the client unit of the electronic whiteboard 2 as the hosting apparatus and the client unit of the electronic whiteboard 2 as the participating apparatus. As a result, each electronic whiteboard 2 displays an image related to the same operation data. An example of the operation data is presented in Table 10.

TABLE 10

| SEQ | OPERATION NAME | SENDING SOURCE IP ADDRESS: Port No. | SENDING DESTINATION IP ADDRESS: Port No. | OPERATION TYPE | OPERATION TARGET (PAGE DATA ID/STROKE DATA ID) | DATA |
|---|---|---|---|---|---|---|
| 1 | ADD | 192.0.0.1: 50001 | 192.0.0.1: 50000 | STROKE | p005 | (STROKE DATA) |
| 2 | ADD | 192.0.0.1: 50000 | 192.0.0.2: 50001 | STROKE | p005 | (STROKE DATA) |
| 3 | UPDATE | 192.0.0.2: 50001 | 192.0.0.1: 50000 | STROKE | s006 | (50,40) |
| 4 | UPDATE | 192.0.0.1: 50000 | 192.0.0.1: 50001 | STROKE | s006 | (50,40) |
| 5 | DELETE | 192.0.0.2: 50001 | 192.0.0.1: 50000 | STROKE | s007 | — |
| 6 | DELETE | 192.0.0.1: 50000 | 192.0.0.1: 50001 | STROKE | s007 | — |
| 7 | ADD | 192.0.0.1: 50001 | 192.0.0.1: 50000 | PAGE | — | — |
| 8 | ADD | 192.0.0.1: 50000 | 192.0.0.2: 50001 | PAGE | — | — |
| 9 | ADD | 192.0.0.2: 50001 | 192.0.0.1: 50000 | IMAGE | p006 | aaa.jpg |
| 10 | ADD | 192.0.0.1: 50000 | 192.0.0.1: 50001 | IMAGE | p006 | aaa.jpg |
| . | . | . | . | . | . | . |

As presented in Table 10, the operation data includes sequence (SEQ), an operation name of the operation data, the IP address of the electronic whiteboard 2 as the sending destination of the operation data, the port No. of the client unit (the server unit), an operation type of the operation data, an operation target of the operation data, and data indicative of the contents of the operation data, which are mutually associated. For example, regarding the operation data SEQ "1", as a result of drawing the stroke by the client unit (Port No.: 50001) of the electronic whiteboard 2 (IP address: 192.0.0.1) as the hosting apparatus, the operation data are sent to the server unit (Port No.: 50000) of the same electronic whiteboard 2 (IP address: 192.0.0.1). In this case, the operation type is "STROKE", the operation target is a page data ID "p005", and the data indicating the contents of the operation data are the data (the stroke data) indicating the stroke. Regarding the operation data SEQ "2", it is indicated that the operation data are sent from the server unit (Port No.: 50000) of the electronic whiteboard 2 (IP address: 192.0.0.1) as the hosting apparatus to the client unit (Port No.: 50001) of the electronic whiteboard 2 (IP address: 192.0.0.2) as the participating apparatus.

Because the operation combination processing unit 84 combines the operation data in the order of inputting the operation data into the operation combination processing unit 84, the stroke image (B) is displayed on the displays 3 of all electronic whiteboards 2 during the remote sharing process in the order of the stroke draw by the users of each electronic whiteboard 2 if the communication network 9 is not congested.

The page processing unit 85 has a function similar to that of the page processing unit 37 in the image processing unit 30 of the client unit 20. The server unit 90 stores the page data presented in Tables 1 to 3 in the page data memory unit 850 in a manner similar to the client unit 20. Here, the page data memory unit 850 has the same contents as the page data memory unit 300 of the image processing unit 30. Therefore, explanation of the page data memory unit 850 is omitted.

<Processing or Behavior in Embodiment>

Figure 9:
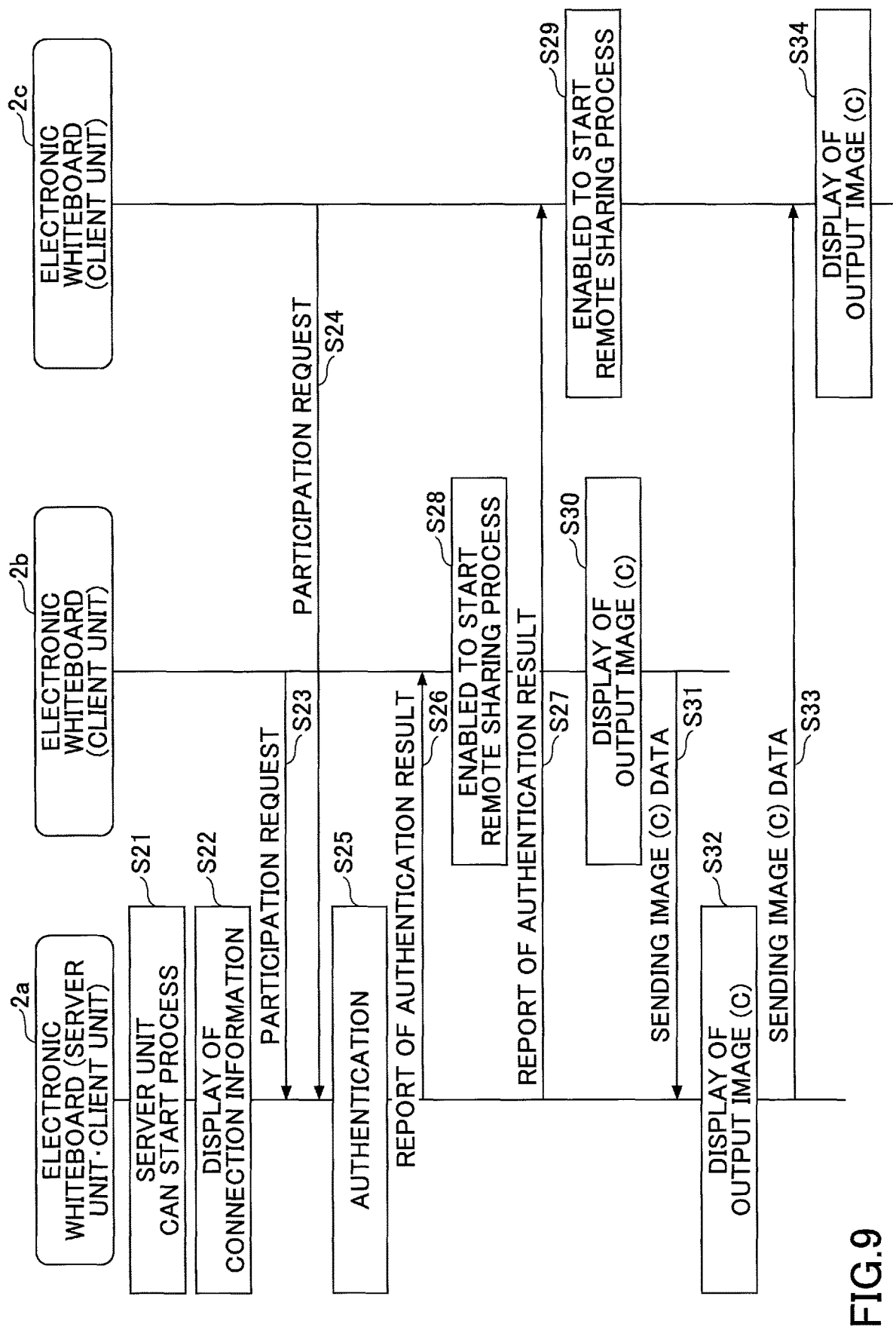
FIG. 9 is an example of a sequence diagram illustrating processes in the electronic whiteboards.
Figure 10:
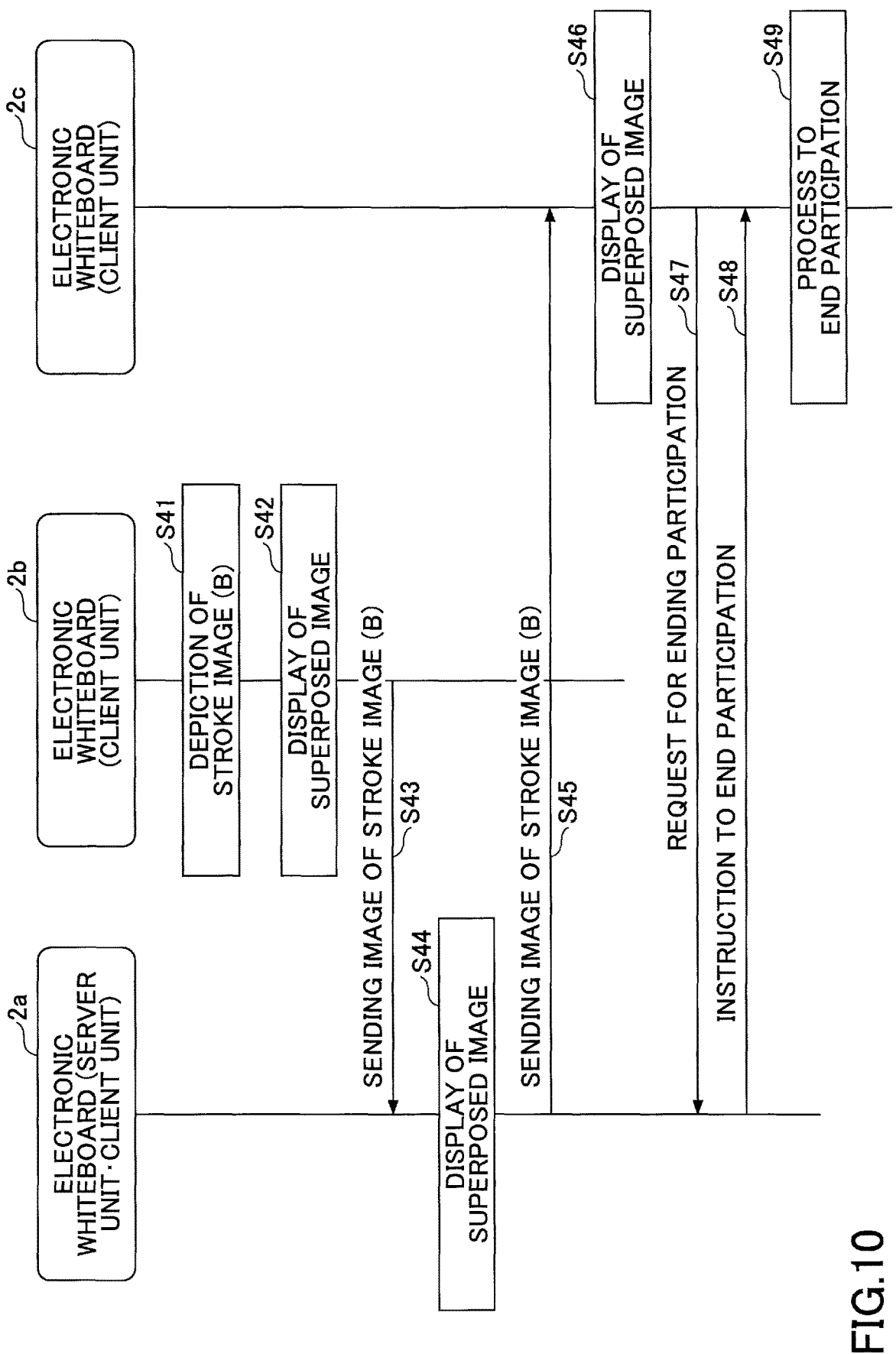
FIG. 10 is an example of the sequence diagram illustrating processes in the electronic whiteboards.

Referring to FIGS. 9 and 10, subsequently described is processing or operation in this embodiment. FIGS. 9 and 10 are sequence diagrams illustrating processes in the electronic whiteboards 2. In this embodiment illustrated in FIGS. 9 and 10, the electronic whiteboard 2a plays a role as the hosting apparatus (the server unit and the client unit) hosting a remote sharing process, the electronic whiteboards 2b and 2c play a role as the participating apparatus (the client unit) participating in the remote sharing process. Here, displays 3a, 3b, and 3c are coupled to the electronic whiteboards 2a, 2b, and 2c and to the notebook PCs 6a, 6b, and 6c. The electronic pens 4a, 4b, and 4c are respectively used in the electronic whiteboards 2a, 2b, and 2c.

(Process of Participation)

Referring to FIG. 9, described is a process that the electronic whiteboards 2b and 2c participate in the remote sharing process.

When the user turns on a power switch of the electronic whiteboard 2a, the client unit 20 of the electronic whiteboard 2a starts up. Then, when the user operates to activate the server unit 90 using the input device such as the touch panel, the remote start processing unit 61 of the client unit 20 outputs an instruction that the remote connection request receiving unit 71 of the server unit 90 starts the processing of the server unit 90. Therefore, in the electronic whiteboard 2a, not only the client unit 20 but also the server unit 90 can start various processes (step S21).

Next, the UI image generating unit 33 of the client unit 20 of the electronic whiteboard 2a generates connection information, with which the electronic whiteboard 2a establish a connection with the other electronic whiteboard 2, and displays the connection information, which is acquired by the screen image superposing unit 28 from the UI image generating unit 33 through the display superposing unit 36, on the display 3a (step S22).

This connection information includes the IP address of the hosting apparatus and the passcode generated for the remote sharing process of this time. In this case, the passcode stored in the passcode administering unit 810 is read by the remote connection processing unit 81 illustrated in FIG. 7, and is sent in an order of the remote connection result sending unit 72 and the remote start processing unit 61. Further, the passcode is sent from the communication controlling unit 60 including the remote start processing unit 61 to the image processing unit 30 illustrated in FIG. 5 and finally input into the UI image generating unit 33. With this, the connection information includes the passcode. The connection information is transferred by the user of the electronic whiteboard 2a to the users of the electronic whiteboards 2b and 2c by means of the telephone or the electronic mail. When the participating apparatus includes the connection destination administering table 440, even if the connection information does not include the IP address of the hosting apparatus, the participating apparatus can request for the participation request.

Next, the electronic whiteboard 2b and 2c receives an input of the connection information n when the user operates the input device such as the touch panel. Then, the remote participation processing unit 62 of the client unit 20 of the electronic whiteboard 2 of the electronic whiteboards 2b and 2c send the passcode to the communication controlling unit 70 of the server unit 90 through the communication network 9 and conduct a participation request (steps S23 and S24). With this, the remote connection request receiving unit 71 of the communication controlling unit 70 receives participation requests (including the passcodes) from the electronic whiteboards 2b and 2c and outputs the passcodes to the remote connection processing unit 81.

Next, the remote connection processing unit 81 conducts authentication for the passcodes received from the electronic whiteboards 2b and 2c using the passcode administered by the passcode administering unit 810 (step S25).

The remote connection result sending unit 72 reports the authentication result to the client units of the electronic whiteboards 2b and 2c (steps S26 and S27).

In a case where the electronic whiteboard 2b or 2c is determined to be an authentic electronic whiteboard 2 by the authentication in step S25, communications of the remote sharing process between the electronic whiteboard 2a, which is the hosting apparatus, and the electronic whiteboard 2b or 2c being the participating apparatus are established. Then, the remote participation processing unit 62 of the client units 20 of the electronic whiteboards 2b and 2c enables to start the remote sharing processes with the other electronic whiteboards 2 (Steps S28 and S29).

(Display of Output Image)

Referring to FIG. 9, subsequently described is a process of causing the output image (C) to be displayed in the remote sharing process.

At first, the electronic whiteboard 2b displays an output image (C) on a display 3b (step S30). Specifically, the image acquiring unit 31 of the electronic whiteboard 2b receives data of the output image (C) displayed by the notebook PC 6b through the screen image acquiring unit 21 and sends the received data to the display 3b through the display superposing unit 36 and the screen image superposing unit 28 to the display 3b to cause the display 3b to display the output image (C).

Next, the image processing unit 30 including the image acquiring unit 31 of the electronic whiteboard 2b sends the data of the output image (C) to the remote image receiving unit 63, the communication controlling unit 60 including the remote image receiving unit 63 sends the data of the output image (C) to the communication controlling unit 70 of the electronic whiteboard 2a, which is the hosting apparatus, through the communication network 9 to the communication controlling unit 70 of the electronic whiteboard being the hosting apparatus (step S31). With this, the remote image sending unit 73 of the electronic whiteboard 2a receives the data of the output image (C) and outputs the data to the remote image processing unit 82. As a result, the remote image processing unit 82 stores the data of the output image (C) in the image data memory unit 830.

Next, the electronic whiteboard 2a, which is the hosting apparatus, displays the output image (C) on the display 3a (step S32). Specifically, the remote image processing unit 82 of the electronic whiteboard 2a outputs the data of the output image (C) received from the remote image sending unit 73 to the remote image receiving unit 74. The remote image receiving unit 74 outputs the data of the output image (C) to the remote image sending unit 64 of the client unit 20. The remote image sending unit 64 outputs the data of the output image (C) to the display superposing unit 36. The display superposing unit 36 outputs the data of the output image (C) to the screen image superposing unit 28. The screen image superposing unit 28 outputs the data of the output image (C) to the display 3a. With this, the display 3a displays the output image (C).

Next, the communication controlling unit 70 including the remote image receiving unit 74 in the server unit 90 of the electronic whiteboard 2a, which is the hosting apparatus, sends the data of the output image (C) to the communication controlling unit 60 of the electronic whiteboard 2c other than the electronic whiteboard 2b being the sending source of the data of the output image (C) through the communication network 9 (step S33).

With this, the remote image sending unit 64 of the electronic whiteboard 2c being the participating apparatus receives the data of the output image (C).

Next, the electronic whiteboard 2c displays the output image (C) on the display 3c (step S34). Specifically, the remote image sending unit 64 of the electronic whiteboard 2c outputs the data of the output image (C) received in step S33 to the display superposing unit 36 of the electronic whiteboard 2c. The display superposing unit 36 outputs the data of the output image (C) to the screen image superposing unit 28. The screen image superposing unit 28 outputs the data of the output image (C) to the display 3c. With this, the display 3c displays the output image (C).

In a case where data of the UI image (A) and the stroke image (B) are input in the screen image superposing unit 28 in addition to the data of the output image (C), the display superposing unit 36 generates a superposed image (A, B, and C). The screen image superposing unit 28 outputs data of the superposed image (A, B, and C) to the display 3c. Further, in a case where the data of screen image (E) for teleconference are sent from the teleconference terminal 7 to the screen image superposing unit 28, the screen image superposing unit superposes the data of the screen image (E) for teleconference on the superposed image (A, B, and C) and outputs the further superposed image on the display 3c.

(Display of Superposed Image)

Referring to FIG. 10, subsequently described is a process of causing the superposed image to be displayed in the remote sharing process.

At first, the user draws the stroke image (B) on the electronic whiteboard 2b using the electronic pen 4b (Step S41).

Next, the display superposing unit 36 of the electronic whiteboard 2b superposes the stroke image (B) on the UI image (A) and the output image (C) as illustrated in FIG. 8. The screen image superposing unit 28 causes the display 3b to display the superposed image (A, B, and C)(step S42). Specifically, the stroke processing unit 32 of the electronic whiteboard 2b receives data of the stroke image (B) as the operation data from the coordinate detecting unit 22 and the touch detecting unit 24 through the event sorting unit 25 and sends the received data to the display superposing unit 36. With this, the display superposing unit 36 can superpose the stroke image (B) on the UI image (A) and the output image (C), and the screen image superposing unit 28 can cause the display 3b of the electronic whiteboard 2(A, B, and C).

Next, the image processing unit 30 including stroke processing unit 32 of the electronic whiteboard 2b sends the data of the stroke image sends the data of the stroke image (B) to the remote operation receiving unit 65. Then, the remote operation receiving unit 65 of the electronic whiteboard 2b sends the data of the stroke image (B) to the communication controlling unit 70 of the electronic whiteboard 2a, which is the hosting apparatus, through the communication network 9 (step S43).

With this, the remote image sending unit 75 of the electronic whiteboard 2a receives the data of the output image (C) and outputs the data to the remote image processing unit 83. As a result, the remote operation processing unit 83 outputs the data of the stroke image (B) to the operation combination processing unit 84. As described above, the data of the stroke image (B) drawn on the electronic whiteboard 2b are sequentially sent to the remote operation processing unit 83 of the electronic whiteboard 2a as the hosting apparatus every time the stroke images are drawn. These data of the stroke image (B) are data sent every stroke data ID presented in Table 2 or the like. Therefore, in a case where the user draws the alphabetical letter "T" using the electronic pen 4, two writing brushes are conducted. Therefore, the data of the stroke image (B) respectively represented by two stroke data IDs are sequentially sent.

Next, the electronic whiteboard 2a, which is the hosting apparatus, displays the superposed image (A, B, and C) including the stroke image (B) indicated by the data of the stroke image (B), which is sent from the electronic whiteboard 2b to the display 3a (step S44). Specifically, the operation combination processing unit 84 of the electronic whiteboard 2a combines data of multiple stroke images (B) sequentially sent through the remote operation processing unit 83, stores the combined data in the operation data memory unit 840, and returns the combined data to the remote operation processing unit 83. With this, the remote operation processing unit 83 outputs data of the combined stroke image (B) received from the operation combination processing unit 84 to the remote operation receiving unit 76. The remote operation receiving unit 76 outputs the data of the combined stroke image (B) to the remote operation sending unit 66 of the electronic whiteboard 2a, which is the hosting apparatus. The remote operation sending unit 66 outputs the data of the combined stroke image (B) to the display superposing unit 36 of the image processing unit 30. The display superposing unit 36 superposes the combined stroke image (B) on the UI image (A) and the output image (C). Finally, the screen image superposing unit 28 causes the superposed image (A, B, and C) superposed by the display superposing unit 36 to be displayed on the display 3a.

Next, the communication controlling unit 70 including the remote operation receiving unit 76 in the server unit 90 of the electronic whiteboard 2a, which is the hosting apparatus, sends the data of the combined stroke image (B) to the communication controlling unit 60 of the electronic whiteboard 2c other than the electronic whiteboard 2b being the sending source of the data of the stroke image (B) through the communication network 9 (step S45). With this, the remote operation sending unit 66 of the electronic whiteboard 2c being the participating apparatus receives the data of the combined stroke image (B).

Next, the electronic whiteboard 2c displays the superposed image (A, B, and C) on the display 3c (step S46). Specifically, the remote operation sending unit 66 of the electronic whiteboard 2c outputs the data of the combined stroke image (B) received in step S45 to the image processing unit 30 of the electronic whiteboard 2c. The display superposing unit 36 of the image processing unit 30 superposes the data of the UI image (A) and the output image (C) and the data of the combined stroke image (B) and outputs the data of the superposed image (A, B, and C) on the screen image superposing unit 28. The screen image superposing unit 28 outputs the data of the superposed image (A, B, and C) to the display 3c. The display 3c displays the superposed image (A, B, and C).

Although the output image (C) is displayed on the display 3 in this process, a background image (D) may be displayed in place of the output image (C). Meanwhile, an exclusive relation between the output image (C) and the background image (D) may not be adopted, and both the output image (C) and the background image (D) may be simultaneously displayed on the display 3.

(End of Participation)

Referring to FIG. 10, subsequently described is the process that the participation apparatus ends participation to the remote sharing process. The embodiment illustrated in FIG. 10 assumes a case where the electronic whiteboard 2c ends the participation.

After the electronic whiteboard 2c receives an end request for ending participation by a user's operation of the input device such as the touch panel, the remote participation processing unit 62 performs an end request for ending the participation to the communication controlling unit 70 in the server unit 90 of the electronic whiteboard 2a as the hosting apparatus (step S47). The remote connection request receiving unit 71 of the communication controlling unit 70 receives the end request for ending the participation from the electronic whiteboard 2c and outputs the end request for ending the participation together with the IP address of the electronic whiteboard 2c to the remote connection processing unit 81. The remote connection processing unit 81 of the electronic whiteboard 2a deletes the IP address of the electronic whiteboard 2c and the name of the location, in which the electronic whiteboard 2c is installed, from the participation location administering table 820 based on the IP address sent from the remote connection request receiving unit 71 and outputs the IP address of the electronic whiteboard 2c and a report of this deletion to the remote connection result sending unit 72.

Next, the communication controlling unit 70 of the remote connection result sending unit 72 instructs the communication controlling unit 60 in the client unit 20 of the electronic whiteboard 2c through the communication network 9 (step S48). The remote participation processing unit 62 of the communication controlling unit 60 of the electronic whiteboard 2c shuts off communications of the remote sharing process to perform the end process of the participation. As a result, the participation of the electronic whiteboard 2c ends (step S49).

First Embodiment

Within the first embodiment, in a network structure of a tree structure, the electronic whiteboard 2 determines whether the version of a program of the electronic whiteboard 2 is the same as the version of a program of another electronic whiteboard 2 immediately above the electronic whiteboard 2. If the versions of the programs are not the same, a program file is acquired to conduct a version upgrade process of the program. As described above, the other electronic whiteboards 2, immediately above which the electronic whiteboard 2 is present, repeat version upgrade processes. Thus, all electronic whiteboards 2 included in the network structure can conduct version upgrades.

In the case where the version of the program of the immediately above electronic whiteboard 2 matches the version of the program of the other electronic whiteboard 2, the other electronic whiteboard 2 acquires the setup information from the immediately above electronic whiteboard 2. After the other electronic whiteboards 2, immediately above which the immediately above electronic whiteboard 2 is present, repeat this process, all electronic whiteboards included in the network structure can mutually synchronize the setup information.

Figure 11:
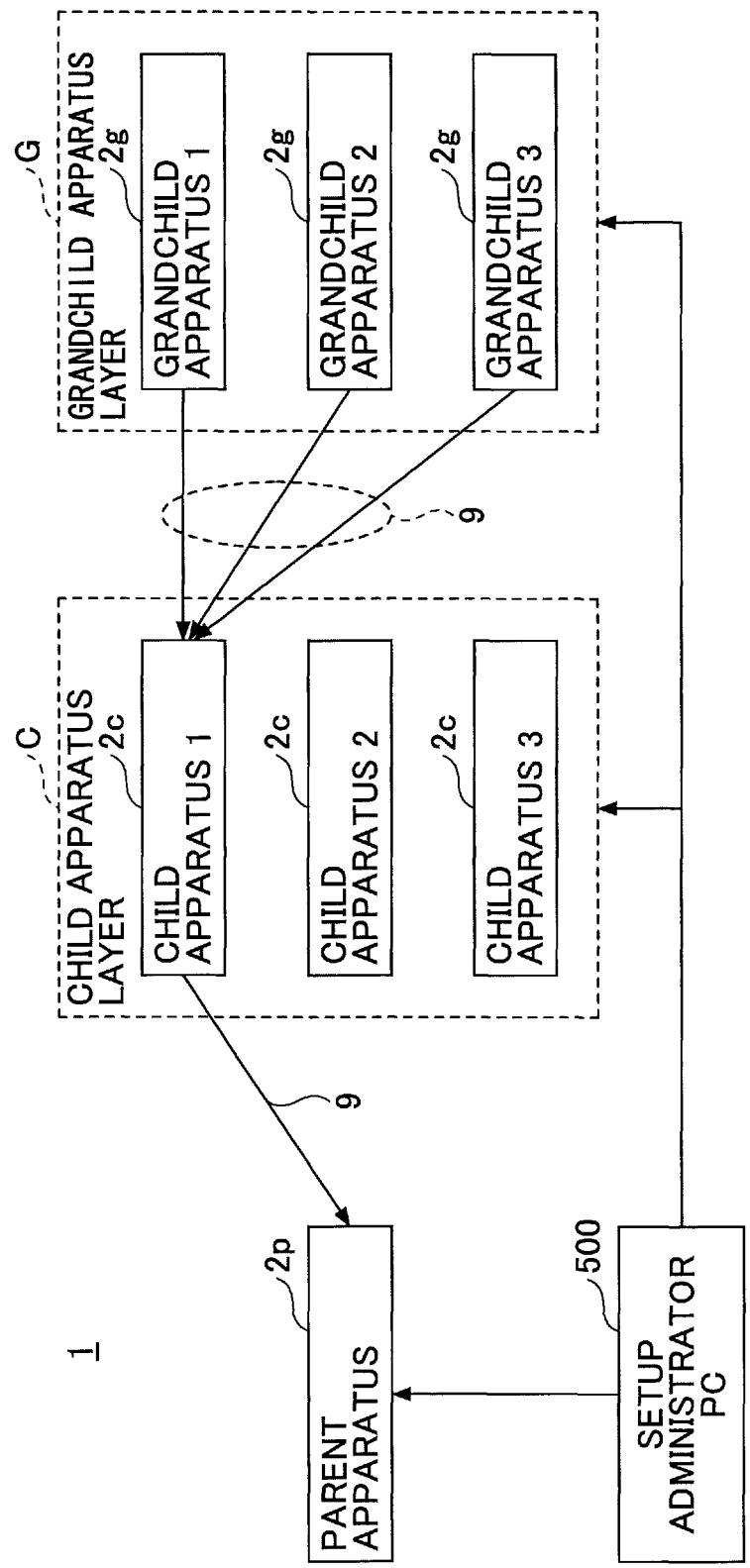
FIG. 11 illustrates an example of a network structure of the image processing system.

FIG. 11 illustrates an example of the network structure of the image processing system 1. The electronic whiteboards 2 are mutually coupled through the communication network 9. The network structure illustrated in FIG. 11 is provided to explain a hierarchical structure related to a version upgrade process of the program and a synchronization process of the setup information. One electronic whiteboard 2 can communicate the image data or the like with the electronic whiteboard 2 other than the immediately above electronic whiteboard 2. However, the version upgrade process of the program and the synchronization process of the setup information are performed in the network structure of the tree structure as illustrated in FIG. 11.

Two electronic whiteboards 2 mutually having a relation of "immediately above" and "immediately below" may be coupled by a USB cable or the like instead of the communication network 9. Two electronic whiteboards 2 mutually having a relation of "immediately above" and "immediately below" may be coupled using wired or wireless.

A setup administrator PC 500 illustrated in FIG. 11 is operated by a setup administrator who sets the setup information to the electronic whiteboard 2 and administers the electronic whiteboard 2. The setup administrator is a person in a company, in which the electronic whiteboard 2 is installed, or the like. However, a service engineer of the electronic whiteboard 2 may be a setup administrator.

The setup administrator operates a setup administrator PC 500 to set a program of a new version and the setup information described below to the parent apparatus 2p. When a program of a new version and setup information are set to the parent apparatus 2p, the parent apparatus 2p and all electronic whiteboards 2 in a child apparatus layer C and a grandchild apparatus layer G mutually synchronize to make the version of the program same, and the same setup information is set to all the electronic whiteboards 2 in the child apparatus layer C and the grandchild apparatus layer G. The program may be subjected to version upgrade or version downgrade. Hereinafter, the description is given on a premise that the program of the new version is set.

Browser software is operated in the setup administrator PC 500 so that the browser software communicates with the parent apparatus 2p to acquire screen information described using Hypertext Markup Language (HTML) or JavaScript ("JavaScript" is a registered trademark) from the parent apparatus 2p. The setup administrator PC 500 displays "setup information setup screen" described below on the display. The setup administrator inputs the setup information into the setup administrator PC 500 using the setup information setup screen displayed on the display and the input setup information can be set to the parent apparatus 2p.

Further, the parent apparatus 2p may access the server delivering the program to acquire the program of the new version. Similarly, regarding the setup information, the setup administrator sets the setup information to the server. The parent apparatus 2p may acquire the setup information from the server.

Further, the setup administrator operates the setup administrator PC 500 to set communication information described later to electronic whiteboards 2 respectively in the child apparatus layer C and the grandchild apparatus layer G. The communication information is provided so that the electronic whiteboard 2 communicates with the immediately above electronic whiteboard 2. The setup administrator PC 500 displays "setup information setup screen" described below on the display. The setup administrator uses the communication information setup screen to set the communication information enabling the electronic whiteboard 2 to communicate with the immediately above electronic whiteboard 2.

Figure 12:
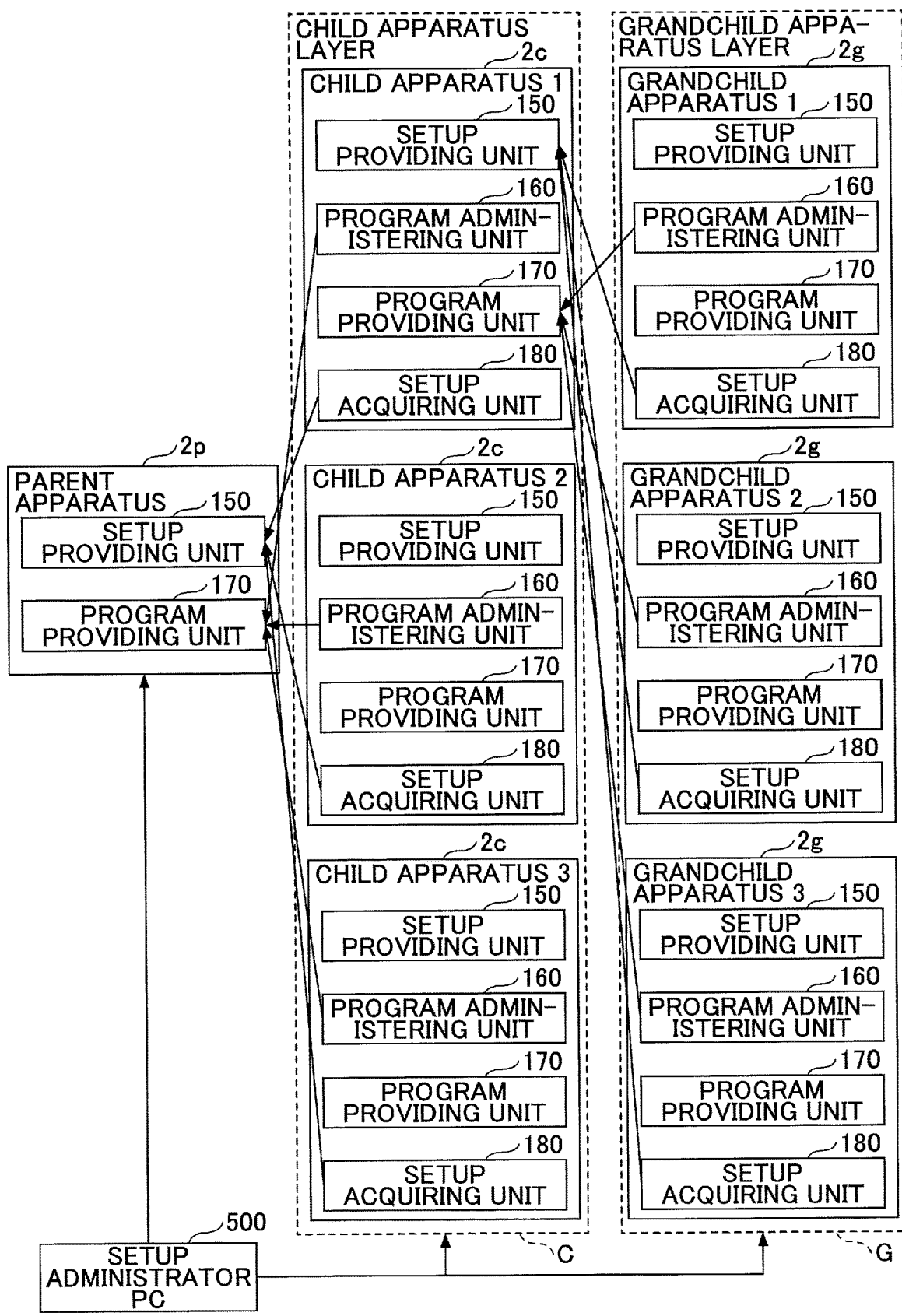
FIG. 12 illustrates an example of schematic functions implemented in a parent apparatus, child apparatuses, and grandchild apparatuses.

FIG. 12 illustrates an example of schematic functions being operated in the parent apparatus 2p, child apparatuses 2c, and grandchild apparatuses 2g. The program providing unit 170 is operated in the parent apparatus 2p. The program administering unit 160 and the program providing unit 170 are operated in a child apparatus-1. In a case where the electronic whiteboard 2 in the child apparatus layer C acquires a program of a new version from the parent apparatus 2p, the program administering unit 160 is operated in the electronic whiteboard 2 in the child apparatus layer C. In a case where the program of the new version is requested from the electronic whiteboard 2 in the grandchild apparatus layer G, the program providing unit 17 is operated in the electronic whiteboard 2 of the child apparatus layer C. The above relation is applicable to a relation between the grandchild apparatus layer G and a great-grandchild apparatus layer (not illustrated).

The program providing unit 170 of the electronic whiteboard 2 serves the program of the new version to the immediately below electronic whiteboard 2 upon request from the immediately below electronic whiteboard 2. The program administering unit 160 of the electronic whiteboard 2 determines whether the version of the program of the electronic whiteboard 2 is the same as the version of the program of the immediately above electronic whiteboard 2. In a case where, these versions differ, the program is acquired from the immediately above electronic whiteboard 2 and a version upgrade is conducted.

Further, in the parent apparatus 2p, the setup providing unit 150 behaves. In the child apparatus-1, the setup providing unit 150 and the setup acquiring unit 180 behave. Further, in a case where the electronic whiteboard 2 in the child apparatus layer C acquires the setup information from the parent apparatus 2p, the setup acquiring unit 180 of the electronic whiteboard 2 in the child apparatus layer C is operated. In a case where the electronic whiteboard 2 of the child apparatus layer C is requested to send the setup information from the electronic whiteboard 2 in the grandchild apparatus layer G, the setup providing unit 150 of the electronic whiteboard 2 of the child apparatus layer C is operated. The above relation is applicable to a relation between the grandchild apparatus layer G and a great-grandchild apparatus layer (not illustrated).

Figure 13:
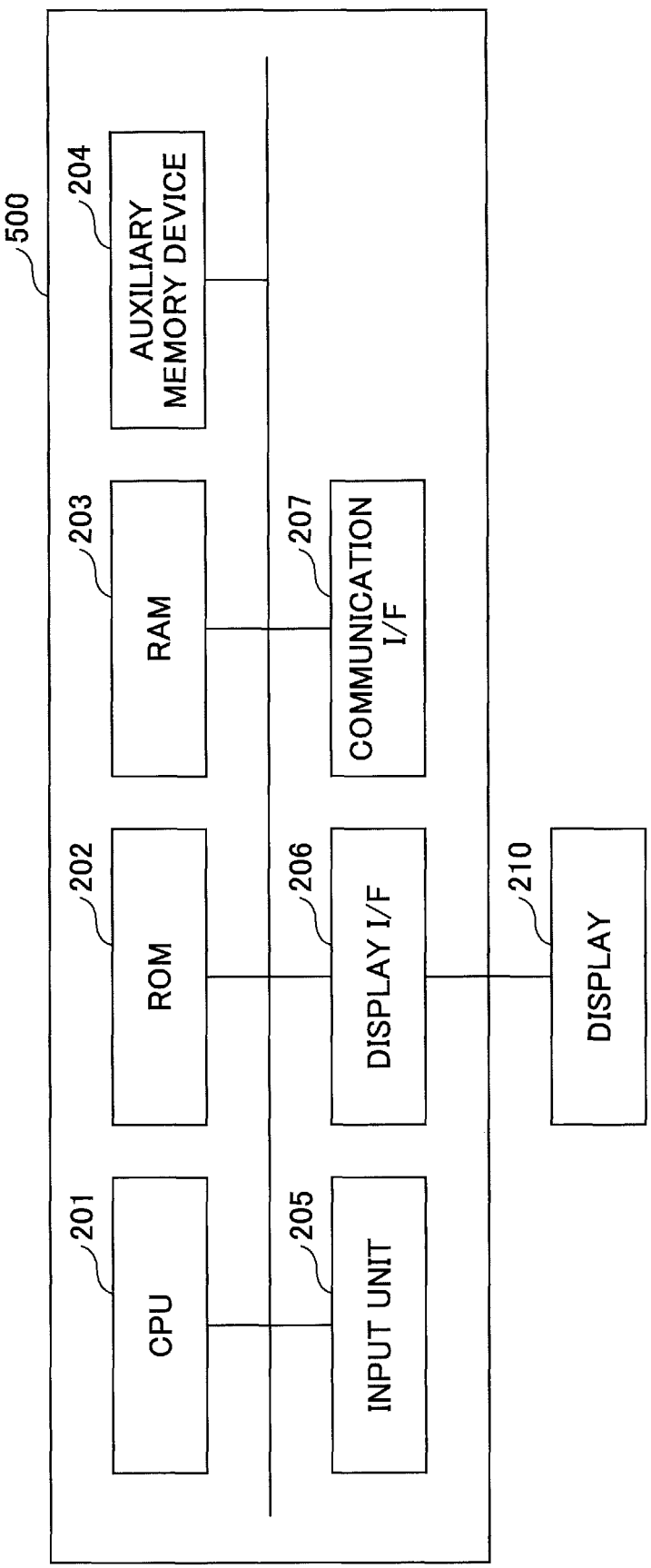
FIG. 13 is an example of the hardware structure of a setup administrator PC.

FIG. 13 is an example of the hardware structure of the setup administrator PC 500. The setup administrator PC 500 includes a CPU 201, a ROM 202, a RAM 203, and an auxiliary memory device 204. Further, the setup administrator PC 500 includes an input unit 205, a display interface (I/F) 206, and a communication I/F. Various portions of the setup administrator PC 500 are mutually coupled through a bus 208. Therefore, the setup administrator PC 500 has a function as an information processing apparatus.

The CPU 201 executes various programs and OSs stored in the auxiliary memory device 204. ROM 202 is a non-volatile memory. The ROM 202 stores a program, data, or the like necessary for processing by the CPU 201.

The RAM 203 is a main memory device such as a Dynamic Random Access Memory (DRAM) and a Static Random Access Memory (SRAM). At a time when the various programs stored in the auxiliary memory device 204 are executed by the CPU 201, the various programs are written in the RAM 203 and the RAM 203 becomes a working area of the CPU 201.

The auxiliary memory device 204 stores various programs executed by the CPU 201 and various information used at a time when the various programs are executed by the CPU 201. The auxiliary memory device 204 is a non-volatile memory such as a Hard Disk Drive (HDD) and a SSD.

The input unit 205 is an interface for the operator of inputting various instructions to the setup administrator PC 500. For example, the input unit 205 is a keyboard, a mouse, a touch panel, a voice-input device, or the like. The display I/F 206 displays various information held in the setup administrator PC 500 in a form of a cursor, a menu, a window, a character, an image, or the like on the display 210 upon a request from the CPU 201. The display I/F is, for example, a graphic tip or a display I/F.

The communication I/F 207 is a network I/F communicating with the electronic whiteboard 2 through the network.
<Function of Program Administering Unit and Function of Program Providing Unit>

Figure 14:
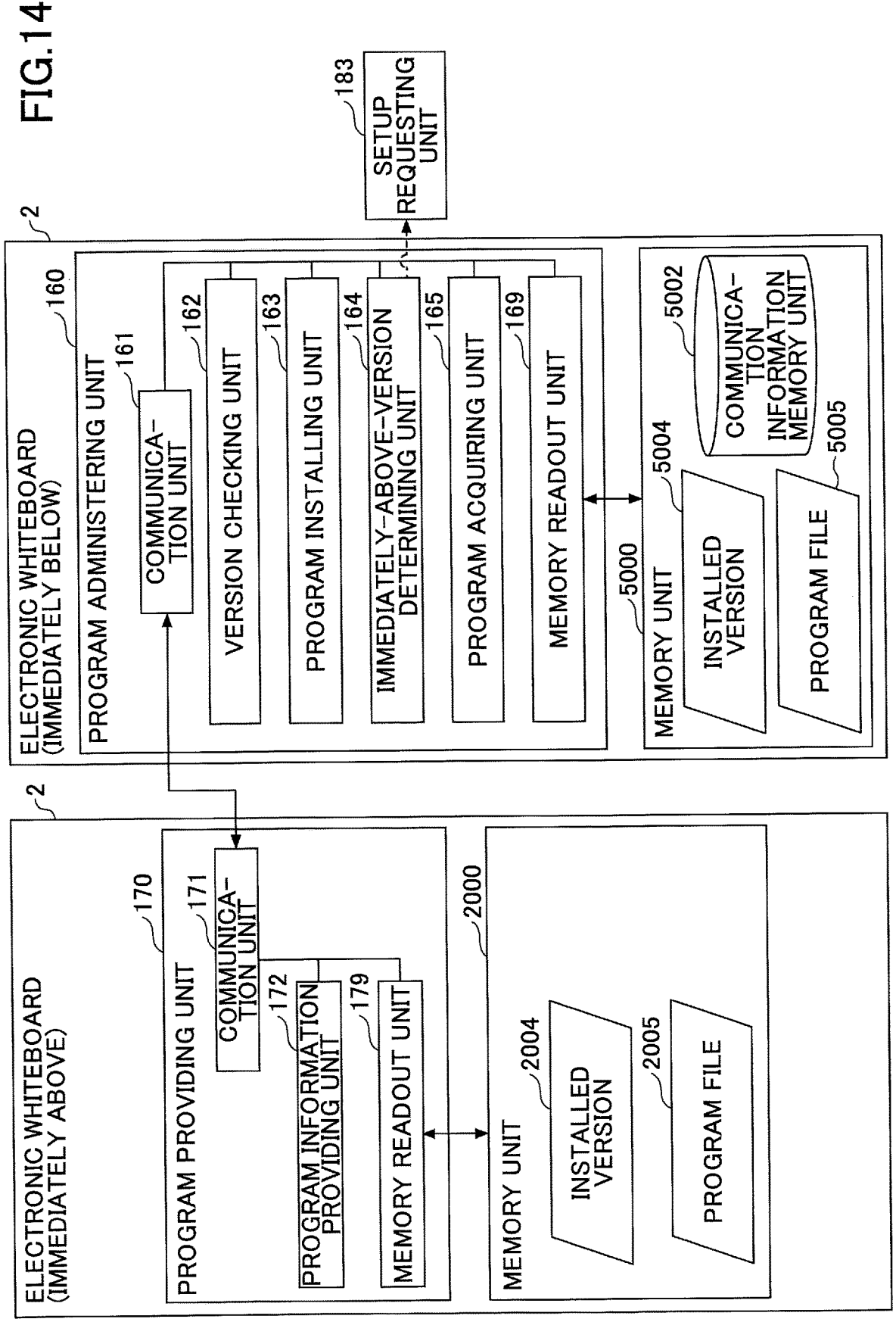
FIG. 14 is an example of a detailed functional block diagram of a program providing unit and a program administering unit.

FIG. 14 FIG. 14 is an example of a detailed functional block diagram of the program providing unit 170 and the program administering unit 160. Between two electronic whiteboards, being the immediately above electronic whiteboard and the immediately below electronic whiteboard, the program administering unit 160 of the immediately above electronic whiteboard 2 and the program providing unit 170 of the immediately below electronic whiteboard 2 are not illustrated for convenience of explanation.
<<Program Providing Unit>>

The program providing unit 170 includes a communication unit 171, a program information providing unit 172, and a memory readout unit 179. These functional units are functions or means implemented by controlling any one of structural elements illustrated in FIG. 4 using the CPU 101 when the CPU 101 executes a program (i.e., program already installed) stored in the SSD 104 illustrated in FIG. 4.

Further, the program providing unit 170 can access the memory unit 2000 configured by at least one of the SSD 104, the ROM 102, and the RAM 103. The memory unit 2000 stores an installed version 2004 and a program file 2005. The installed version 2004 is information indicating the version of the program currently installed in the electronic whiteboard 2. The program file 2005 is a file in which the program is stored. The program file 2005 ordinarily has a mode in which multiple components (for example, called a "module") are stored in one folder or multiple components are stored in a hierarchical way. The program file 2005 may be compressed or in an executable format. The version of the program is described in one of the multiple components of the program file 2005 in a mode of the text data. The electronic whiteboard 2 can read the version held by the program file 2005.

The following case is assumed as a case where the program file 2005 is stored in the memory unit 2000. Said differently, this case is a case where the setup administrator causes the memory unit 2000 to store the program file 2005, a case where the program file 2005 is downloaded in the memory unit from the server delivering the program, and a case where the program file 2005 is sent from the immediately above electronic whiteboard 2.

The version of the program held by the program file 2005 may differ from the installed version 2004. In a case where the program is installed on the electronic whiteboard 2 using the program file 2005, the version of the program included in the program file 2005 and the installed version 2004 are the same. On the other hand, immediately after the setup administrator, the server delivering the program, or the
[Function of Program Providing Unit 170).

The communication unit 171 is implemented by the CPU 101, the network controller 105, or the like illustrated in FIG. 4 and sends or receives various information with the immediately below electronic whiteboard 2. In the following explanation, in a case where the program information providing unit 172 communicates with the immediately below electronic whiteboard 2 through the communication unit 171, the description of "through the communication unit 171" may be omitted.

When the program information providing unit 172 receives an inquiry of the version of the installed program from the immediately below electronic whiteboard 2, the program information providing unit 172 reads the installed version 2004 from the memory unit 2000 and sends the read installed version to the electronic whiteboard 2. Further, when the program file 2005 is requested from the immediately below electronic whiteboard 2 to the program information providing unit 172, the program file 2005 is read out of the memory readout unit 179 through the memory unit 2000 and is sent to the immediately below electronic whiteboard 2.

The memory readout unit 179 reads various information stored in the memory unit 2000 or causes the various information to be stored in the memory unit 2000. In the following explanation, even if the memory readout unit 179 reads various information from the memory unit 2000 and causes the various information to be stored in the memory unit 2000, the description of "through the memory readout unit 179" may be omitted.
<<Program Administering Unit>>

The program administering unit 160 includes a communication unit 161, a version checking unit 162, a program installing unit 163, an immediately above version determining unit 164, a program acquiring unit 165, and a memory readout unit 169. These functional units are functions or means implemented by controlling any one of structural elements illustrated in FIG. 4 using the CPU 101 when the CPU 101 executes the program stored in the SSD 104 illustrated in FIG. 4.

Further, the program administering unit 160 can access the memory unit 5000 configured by at least one of the SSD 104, the ROM 102, and the RAM 103 illustrated in FIG. 4. The memory unit 5000 stores an installed version 5004 and a program file 5005 and further a communication information memory unit 5002 is structured. The installed version 5004 and the program file 5005 are the same as the installed version 2004 and the program file 2005 in the immediately above electronic whiteboard 2. The program file 5005 of the memory unit 5000 is a program file 2005 sent from the immediately above electronic whiteboard 2. Information stored in the communication information memory unit 5002 is described later with reference to Table 14 or the like.
(Function of Program Administering Unit 160)

The communication unit 161 is implemented by the CPU 101, the network controller 105, or the like illustrated in FIG. 4 and sends or receives various information with the immediately above electronic whiteboard 2. In the following description, in a case where the electronic whiteboard 2 communicates with the immediately above electronic whiteboard 2 using the communication unit 161, the description of "through the communication unit 161" may be omitted.

The version checking unit 162 compares the version of the program included in the program file 5005 stored in the memory unit 5000 with the installed version 5004. In a case where the version of the program included in the program file 5005 stored in the memory unit 5000 differs from the installed version 5004, the version checking unit 162 determines that the program of the program file 5005 needs to be installed. Only in a case where the version of the program included in the program file 5005 is newer than the installed version 5004, the version checking unit 162 may determine that the program of the program file 5005 needs to be installed.

The program installing unit 163 installs the program of the program file 5005 on the electronic whiteboard 2 in a case where the version checking unit 162 determines that the program of the program file 5005 needs to be installed.

The immediately above version determining unit 164 acquires the version (the installed version 2004) of the program installed on the immediately above electronic whiteboard 2 from the immediately above electronic whiteboard 2. The immediately above version determining unit 164 determines whether the acquired installed version 2004 is the same as the version (the installed version 5004) of the program installed in the electronic whiteboard 2. By this determination, it is possible to determine whether the immediately above electronic whiteboard 2 and the setup information can synchronize. In a case where the immediately above version determining unit 164 determines that the acquired installed version 2004 is the same as the installed version 5004, the immediately above version determining unit 164 permits the setup requesting unit 183 (described later) the synchronization between the immediately above electronic whiteboard 2 and the setup information.

The program acquiring unit 165 acquires the program file 2005 from the immediately above electronic whiteboard 2 and causes the memory unit 5000 to store as the program file 5005. In the case where the program file 5005 is stored in the memory unit 5000, the above acquired program file 2005 is overwritten as the new program file 5005 over the already stored the program file 5005.

The memory readout unit 169 reads various information stored in the memory unit 5000 or causes the various information to be stored in the memory unit 5000. In the following explanation, even if the memory readout unit 169 reads various information from the memory unit 5000 and causes the various information to be stored in the memory unit 5000, the description of "through the memory readout unit 169" may be omitted.

<<Function of Setup Providing Unit>>

Figure 15:
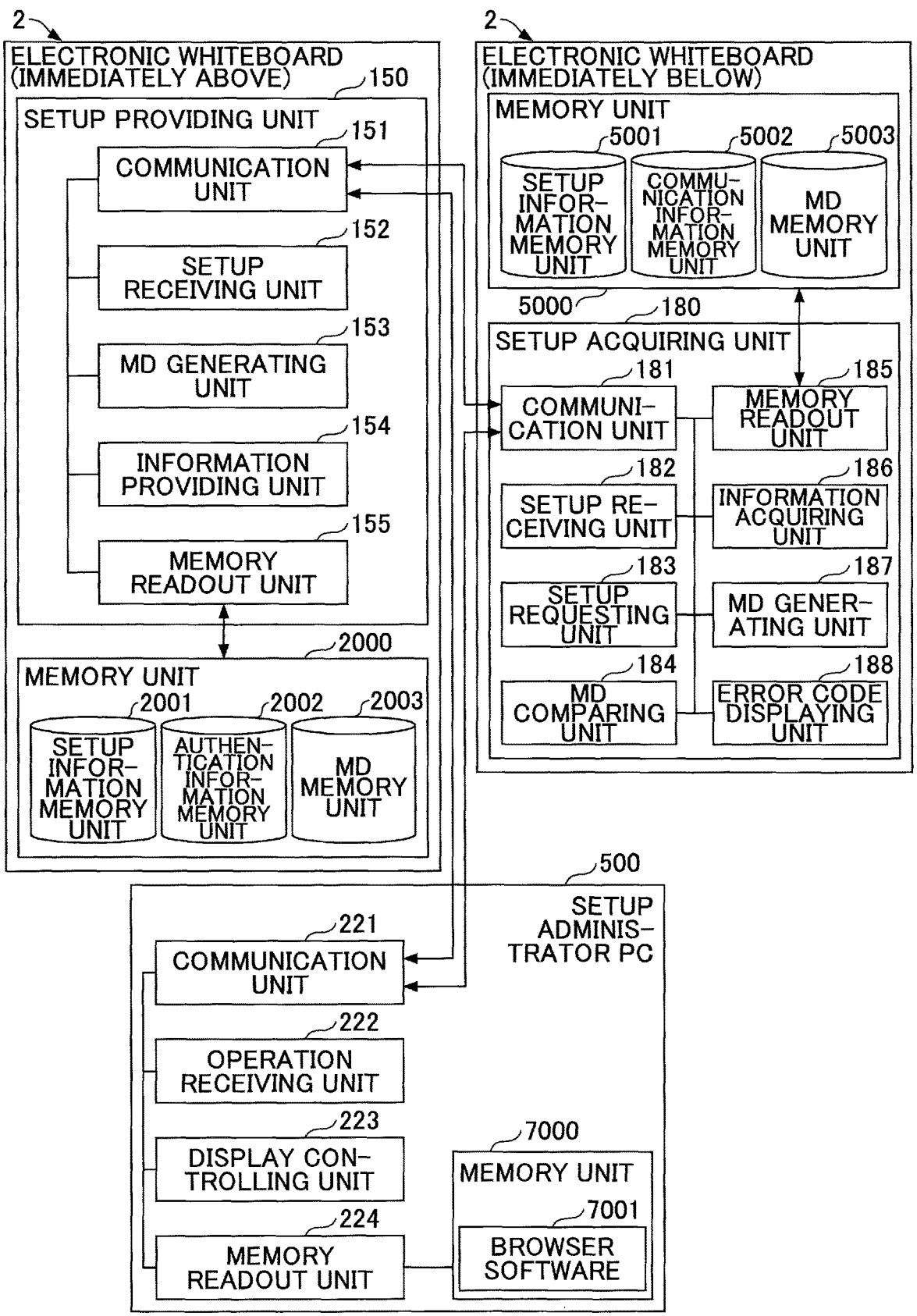
FIG. 15 is an example of a detailed functional block diagram of a setup acquiring unit and a setup providing unit.

FIG. 15 is an example of a detailed functional block diagram of the setup acquiring unit 180 and the setup providing unit 150. Among the two electronic whiteboards 2 in a relation between immediately above and immediately below, the immediately below electronic whiteboard whether 2 has the setup providing unit 150. However, the setup providing unit 150 is omitted from the illustration for convenience of explanation. Further, the immediately above electronic whiteboard 2 has the setup acquiring unit 180. However, the setup acquiring unit 180 is omitted from the illustration for convenience of explanation.

The setup providing unit 150 includes a communication unit 151, a setup receiving unit 152, a MD generating unit 153, an information providing unit 154, and a memory readout unit 155. These functional units are functions or means implemented by controlling any one of structural elements illustrated in FIG. 4 using the CPU 101 when the CPU 101 executes the program stored in the SSD 104 illustrated in FIG. 4.

Further, the setup providing unit 150 can access the memory unit 2000 configured by at least one of the SSD 104, the ROM 102, and the RAM 103 illustrated in FIG. 4. The memory unit 2000 includes a setup information memory unit 2001, an authentication information memory unit 2002, and a memory unit 2003. Described first is information stored in the memory unit 2000. The memory unit 2000 illustrated in FIG. 15 may be the same as the memory unit 2000 illustrated in FIG. 14. However, the memory units may be different. The setup information memory unit 2001 may be the same as the setup file memory unit 430 illustrated in FIG. 6.

TABLE 11

| PASSCODE | ******* |
|---|---|

Table 11 presents an example of authentication information stored in the authentication information memory unit 2002. In the example of Table 11, a passcode is included as the authentication information. The electronic whiteboard 2 authenticates the immediately below electronic whiteboard 2 by determining whether the passcode sent by the immediately below electronic whiteboard 2 matches the passcode stored in the authentication information memory unit 2002. The authentication method may be an authentication method for authenticating using an electronic certificate without using the passcode.

TABLE 12

| SETUP INFORMATION TYPE | SETUP INFORMATION SETUP DATE AND HOUR | FILE NAME |
|---|---|---|
| FOR MAIN BODY OPERATION | 2015/03/01 14:15:32 | set-valid |

Table 12 presents an example of information related to setup information stored in the setup information memory unit 2001. In the example of Table 12, the information related to the setup information is a setup information type, a setup information setup date and hour, and a file name. The setup information whose setup information type illustrated in Table 12 is "for main body operation" is currently effective setup information. The setup date and hour is a date and hour when the setup information is set to the electronic whiteboard 2. The file name is a file name of a file in which the setup information is stored. The information related to the setup information is stored in the setup information memory unit 2001 as a part of the setup information.

TABLE 13

| SETUP INFORMATION TYPE | HASH VALUE |
|---|---|
| FOR MAIN BODY OPERATION | . . . |

Table 13 presents an example of a hash value (message digest) stored in the MD memory unit 2003. The MD memory unit 2003 stores the message digest "for main body operation". A hash value is ordinarily used as the message digest. However, the message digest may be other information having a property of changing when the setup information slightly changes. The electronic whiteboard 2 generates a hash value from the setup information when the setup information is set up and causes the generated hash value to be stored in the MD memory unit 2003. The hash value is used for the immediately below electronic whiteboard 2 to determine whether synchronization of the setup information is necessary.

(Function of Setup Providing Unit 160)

The communication unit 151 of the setup providing unit 150 is implemented by the CPU 101, the network controller 105, or the like illustrated in FIG. 4 and sends or receives various information with the immediately below electronic whiteboard 2 and setup administrator PC 500.

For example, the communication unit 151 sends the screen information of "setup information setup screen" to the setup administrator PC 500 and sends the setup information to the immediately below electronic whiteboard 2. A communication protocol used by the communication unit 151 may be is Hypertext Transfer Protocol (HTTP), HTTP/2, or SPDY (pronounced as SPeeDy). However, the communication protocol may be any. Hereinbelow, in a case where the setup providing unit 150 communicates with the setup acquiring unit 180 by the communication unit 151, the description of "through the communication unit 151" may be omitted.

The setup receiving unit 152 is implemented by the CPU 101 or the like illustrated in FIG. 4 so as to function as a Web server and a Web application. The setup receiving unit 152 generates screen information of "setup information setup screen" sent to the setup administrator PC 500 using HTML or JavaScript ("JavaScript" is the registered trademark).

The MD generating unit 153 is implemented by the CPU 101 or the like illustrated in FIG. 4. The MD generating unit 153 generates the message digest from the setup information and causes the generated message digest to be stored in the MD memory unit 2003 through the memory readout unit 155.

The information providing unit 154 is implemented by the CPU 101 or the like illustrated in FIG. 4. The information providing unit 154 provides the setup information to the immediately below electronic whiteboard 2 upon a request from the immediately below electronic whiteboard 2.

The memory readout unit 155 is implemented by the CPU 101, the SSD 104, the RAM 103, or the like illustrated in FIG. 4. The memory readout unit 155 causes the memory unit 2000 to store the various information and reads out the various information from the memory unit 2000. In the following description, even in a case where the setup providing unit 150 causes the memory unit 2000 to store the various information and reads out the various information from the memory unit 2000, the description of "through the memory readout unit 155" may be omitted.

<<Function of Setup Acquiring Unit 180>>

The setup acquiring unit 180 includes a communication unit 181, a setup receiving unit 182, a setup requesting unit 183, a MD comparing unit 184, and a memory readout unit 185, information acquiring unit 186, a MD generating unit 187, and an error code displaying unit 188. These functional units are functions or means implemented by controlling any one of structural elements illustrated in FIG. 4 using the CPU 101 when the CPU 101 executes the program stored in the SSD 104 illustrated in FIG. 4.

Further, the setup acquiring unit 180 can access the memory unit 5000 configured by at least one of the SSD 104, the ROM 102, and the RAM 103 illustrated in FIG. 4. The memory unit 5000 includes a setup information memory unit 5001, a communication information memory unit 5002, and a MD memory unit 5003. The setup information stored in the setup information memory unit 5001 and the message digest (the hash value) stored in the MD memory unit 5003 are respectively the same as the setup information and the message digest in the immediately above electronic whiteboard 2. The memory unit 5000 illustrated in FIG. 15 may be the same as the memory unit 5000 illustrated in FIG. 14. However, the memory units may be different.

TABLE 14

| IP ADDRESS (ELECTRONIC WHITEBOARD OF UPPER LAYER) | 192.168.1.1 |
|---|---|
| PASSWORD (ELECTRONIC WHITEBOARD OF UPPER LAYER) | ******* |

Table 14 presents an example of authentication information stored in the authentication information memory unit 5002. The communication information is information with which the electronic whiteboard 2 having the communication information memory unit 5002 communicates with the immediately above electronic whiteboard 2. Within this embodiment, the IP address and the password are stored as the communication information. As described later with reference to FIGS. 16A and 16B, the setup administrator operates the setup administrator PC 500 to set the communication information the electronic whiteboard 2 (except for the electronic whiteboard 2 being the parent apparatus 2p). The setup administrator assumes the network structure of the tree structure having multi stages (at least three stages) as illustrated in FIG. 11 and sets the IP address and the password of the immediately above electronic whiteboard 2 relative to the electronic apparatus 2. The illustrated communication information is only an example and the communication information may include a port number or the like.

(Function of Setup Acquiring Unit 180)

The communication unit 181 is implemented by the CPU 101, the network controller 105, or the like illustrated in FIG. 4 and sends or receives various information with the immediately above electronic whiteboard 2 and the setup administrator PC 500. For example, the communication unit 181 sends the screen information of "communication information setup screen" to the setup administrator PC 500 and receives the setup information from the immediately above electronic whiteboard 2. A communication protocol used by the communication unit 181 may be HTTP, HTTP/2, SPDY, or the like. However, the communication protocol may be any. Hereinbelow, in a case where the setup acquiring unit 180 communicates with the setup providing unit 150 by the communication unit 181, the description of "through the communication unit 181" may be omitted.

The setup receiving unit 182 is implemented by the CPU 101 or the like illustrated in FIG. 4 so as to function as a Web server and a Web application. The setup receiving unit 182 generates screen information of "communication information setup screen" sent to the setup administrator PC 500 using HTML or JavaScript ("JavaScript" is the registered trademark).

The setup requesting unit 183 is implemented by the CPU 101 or the like illustrated in FIG. 4. When the immediately above version determining unit 164 determines that the immediately above electronic whiteboard 2 has the same version of the program, a process of synchronizing the setup information with the immediately above electronic whiteboard 2. The timing when the synchronization is started is set as a synchronization timing described later with reference to Table 15. Further, after the setup requesting unit 183 starts the communications, the setup requesting unit 183 acquires the hash value from the immediately above electronic whiteboard 2.

The MD comparing unit 184 is implemented by the CPU 101 or the like illustrated in FIG. 4. The MD comparing unit 184 compares the hash value stored in the MD memory unit 5003 with the hash value acquired from the immediately above electronic whiteboard 2.

The information acquiring unit 186 is implemented by the CPU 101 or the like illustrated in FIG. 4. In a case where the hash values are different as a result of the comparison by the MD comparing unit 184, the setup information is acquired from the immediately above electronic whiteboard 2. The information acquiring unit 186 caused the acquired setup information to be stored in the setup information memory unit 5001 of the memory unit 5000 through the memory readout unit 185.

The MD generating unit 187 is implemented by the CPU 101 or the like illustrated in FIG. 4. The MD generating unit 187 generates the message digest from the setup information in a case where the setup information memory unit 5001 of the memory unit 5000 stores the setup information for operating the main body. The MD generating unit 187 causes the generated message digest to be stored in the MD memory unit 5003 through the memory readout unit 185.

The error code displaying unit 188 is implemented by the CPU 101 or the like illustrated in FIG. 4. The error code displaying unit 188 causes an error code or the like related to the synchronization process to be displayed on the display 3 or the setup administrator PC 500.

The memory readout unit 185 is implemented by the CPU 101, the SSD 104, the RAM 103, or the like illustrated in FIG. 4. The memory readout unit 155 causes the memory unit 5000 to store the various information and reads out the various information from the memory unit 5000. In the following description, even in a case where the setup acquiring unit 180 causes the memory unit 5000 to store the various information and reads out the various information from the memory unit 5000, the description of "through the memory readout unit 185" may be omitted.

<<Function of Setup Administrator PC>>

The setup administrator PC 500 includes a communication unit 221, an operation receiving unit 222, a display controlling unit 223, and a memory readout unit 229. These functional units are functions or means implemented by controlling any one of structural elements illustrated in FIG. 13 using the CPU 201 when the CPU 201 executes a browser software 7001 stored in the auxiliary memory device 204.

Further, the setup administrator PC 500 can access the memory unit 7000 configured by at least one of the auxiliary memory device 204, the ROM 202, and the RAM 203 illustrated in FIG. 13. The browser software 7001 is stored in the memory unit 7000. An application having a communications function similar to that of the browser software 7001 may be stored in the memory unit 7000.

(Function of Setup Administrator PC)

The communication unit 221 is implemented by the CPU 201, the communication I/F 207, or the like illustrated in FIG. 13 and sends or receives various information with the electronic whiteboard 2. For example, the communication unit 221 sends the setup information or the communication information input by the setup administrator to the electronic whiteboard 2. As described above, the setup administrator uses the setup administrator PC 500 to set the setup information to the parent apparatus 2p from among the electronic whiteboards 2. As a result, the parent apparatus 2p and all the electronic whiteboards 2 in the child apparatus layer C and the grandchild apparatus layer G mutually synchronize to set the same setup information to all the electronic whiteboards 2 in the child apparatus layer C and the grandchild apparatus layer G.

The operation receiving unit 222 is implemented by the CPU 201, the input unit illustrated in FIG. 13 and receives various operations by the setup administrator. Specifically, the operation receiving unit 222 receives an input of the setup information, the communication information, or the like.

The display controlling unit 223 is implemented by the CPU 201, the display I/F 206, or the like illustrated in FIG. 13 and causes the display 210 to display the setup information setup screen or the communication information setup screen. Specifically, the display controlling unit 223 comprehends screen information sent from the electronic whiteboard 2 and described by HTML, JavaScript (JavaScript is the registered trademark), or the like and displays these screens.

The memory readout unit 229 is implemented by the CPU 201, the ROM 202, the RAM 203, or the like illustrated in FIG. 13. The memory readout unit 229 causes the memory unit 7000 to store the various information and reads out the various information from the memory unit 7000.

<Setup Information Setup Screen>

Figure 16A:
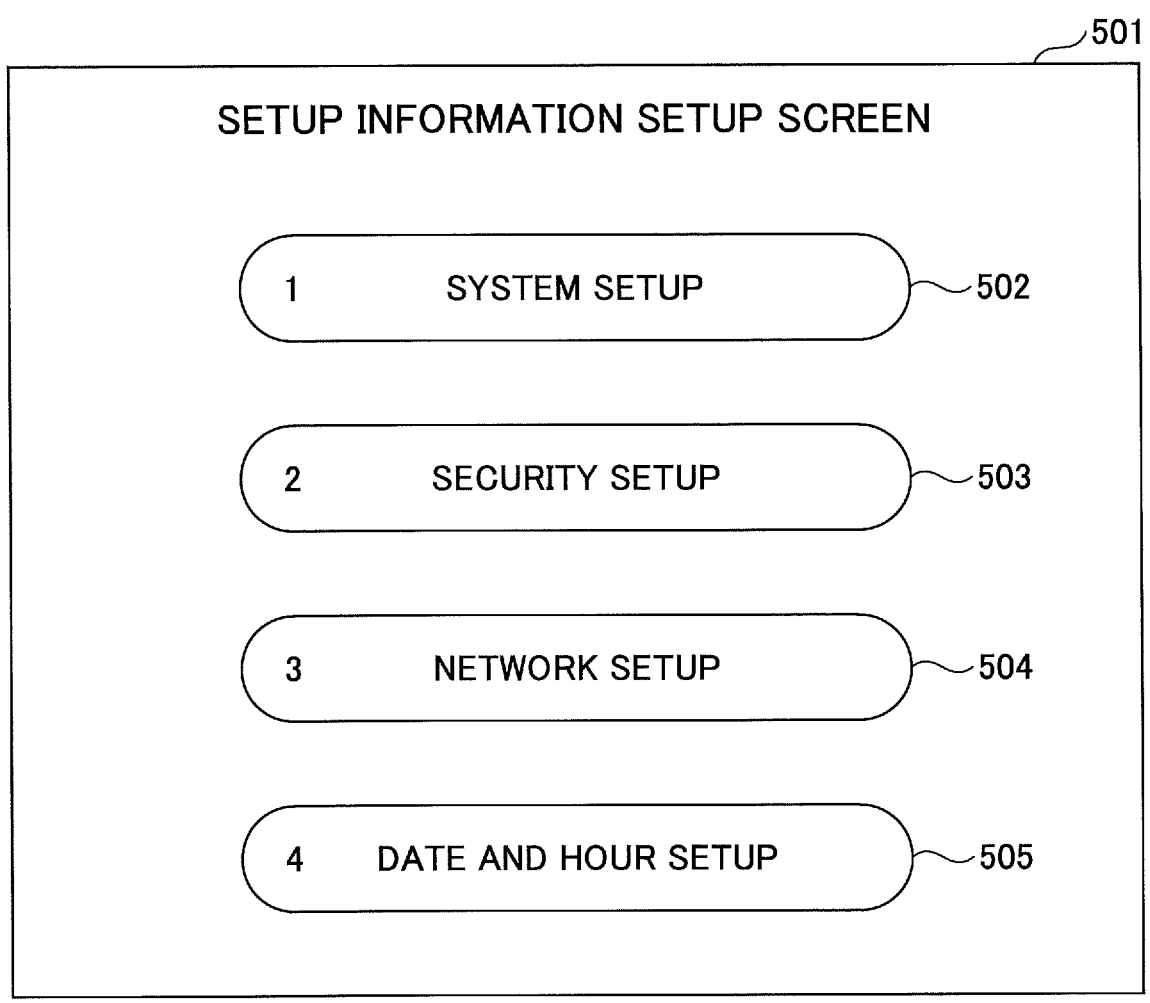
FIG. 16A illustrates an example of a setup information setup screen.

FIG. 16A presents an example of a setup information setup screen 501 displayed on a display 210 of the setup administrator PC 500. The setup information setup screen 501 displays a system setup button 502, a security setup button 503, a network setup button 504, and a date and hour setup button 505. Numbers "1 to 4" are item numbers. The setup administrator pushes each button to perform detailed setup. Described next is the setup information set by each button.

By pushing down the system setup button 502, the setup administrator can set a location name, an automatic shutout time, an automatic restart time, an automatic standby time, a setup related to the synchronization, or the like.

By pushing down the security setup button 503, the setup administrator can set a domain of a mail address which a user can input or a domain of the mail address of which a user's input is limited (when the both are set up, an input table domain becomes effective), prohibition of a direct input of the mail address, the minimum digit number of the password, a timing of generating the password, a limit of displaying the password, or the like. Specifically, the "timing of generating password" is a timing of generating the password (a startup time), a time of generating the password, or the like in a case where the electronic whiteboard 2 automatically generates the password. Said differently, the electronic whiteboard 2 can automatically generate the password, and the setup administrator can arbitrarily set the password.

The setup administrator can set setups for an IP address, a subnet mask, a default gateway, and DNS.

By pushing down the "date and hour setup" button 505, the setup administrator can set a time zone, an existence of synchronization with a time server, or the like.

Figure 16B:
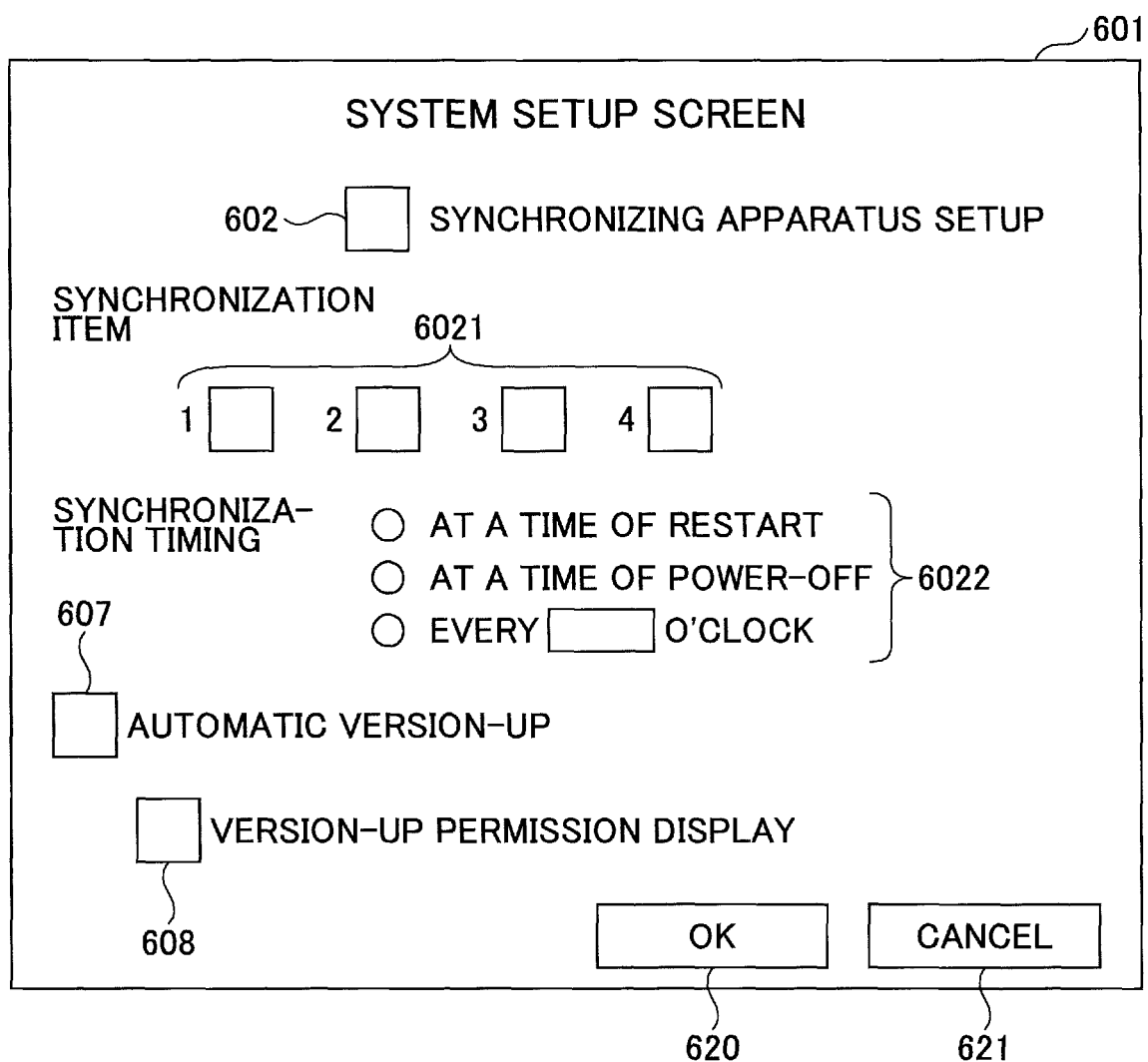
FIG. 16B illustrates an example of a system setup screen.

In a case where the "synchronization timing" set on a system setup screen 601 illustrated in FIG. 16B is "at a time of restart" of the electronic whiteboard 2, the setup administrator can set the synchronization timing by pushing down the system setup button 502 and setting "at a time of automatic restart". An arbitrary time can be set as the synchronization timing. The synchronization timing is included in the setup information and shared between the electronic whiteboards 2. Therefore, the electronic whiteboards 2 can acquire the setup information from the immediately above electronic whiteboard 2.

FIG. 16A illustrates an example of setup information. The setup administrator can set many other items. Principally, information which can be set on the setup information setup screen 501 is included in the setup information. However, the information not being preferably synchronized is omitted from the synchronization as an exception. For example, the network setup includes the IP address or the subnet mask. However, if the IP address is synchronized, all the electronic whiteboard 2 holds the same IP address. Therefore, the IP address is omitted from the target of the synchronization. Because the subnet mask may not be the same in all electronic whiteboards 2, the subnet mask is omitted from the target of the synchronization.

The setup administrator PC 500 receives a setup content set by the setup administrator and sends the received setup content to the electronic whiteboard 2 displaying the setup information setup screen 501. The setup providing unit 150 of the electronic whiteboard 2 causes the setup information memory unit 2001 to store the setup information in the setup information memory unit 2001 based on the sent setup content. As described above, the setup administrator uses the setup administrator PC 500 to set the setup information to the parent apparatus 2p from among the electronic whiteboards 2. Therefore, in this case, the electronic whiteboard 2 means the parent apparatus 2p (the immediately above electronic whiteboard 2 in FIG. 15).

In FIG. 15, the setup receiving unit 152 of the immediately above electronic whiteboard 2 (namely, the parent apparatus 2p) can receive a setup from the setup administrator on the display 3 of the electronic whiteboard 2 instead of the setup information setup screen 501 displayed on the setup administrator PC 500 as illustrated in FIG. 16A.

<<System Setup Screen>>

FIG. 16B presents an example of a setup information setup screen 601 displayed on the display of the setup administrator PC. The system setup screen 601 is displayed when the system setup button 502 illustrated in FIG. 16A is pushed down. The system setup screen 601 displays a message of "synchronizing apparatus setup" together with the check box 602. The setup administrator makes the check box 602 ON (Said differently, pushing down the check box 602 to enter a check mark into the check box 602, hereinbelow the same) in a case where the setup information is synchronized in the electronic whiteboard 2 with the immediately above electronic whiteboard 2.

After the setup administrator makes the check box 602 of the parent apparatus 2p (the immediately above electronic whiteboard 2 in FIG. 15) ON using the system setup screen 601, the parent apparatus 2p can provide the setup information to the child apparatus 2c.

When the check box 602 is ON, the setup administrator can set "synchronization item" 6021 and "synchronization timing" 6022. As the "synchronization item" 6021, the item numbers of FIG. 16A are displayed so as to be individually selectable. As "synchronization timing" 6022, columns of inputting "at a time of restart", "at a time of power-off", and the time are displayed so as to be selectable.

The setup of the check box 602 is reflected in the item of "synchronization" in Table 15 described later. The setup of "synchronization item" 6021 is reflected in the item of "synchronization item" so as to be the same. The setup of "synchronization timing" 6022 is reflected in the item of "synchronization timing" so as to be the same.

The system setup screen 601 displays a message of "automatic version-up" together with the check box 607. In a case where the setup administrator acquires the program file from the immediately above electronic whiteboard 2 to the electronic whiteboard 2 and conducts the version upgrade, the setup administrator sets the check box 607 to ON. As described above, there is a case where the program is subjected to the version upgrade in order to synchronize the setup information. However, there may be a case where the user does not wish the version upgrade of the program. In this case, the setup administrator can set the check box to be OFF.

After the check box 607 becomes ON, the setup administrator can set the check box 608 of "version-up permission display". In a case where the setup administrator sets the check box 607 to be ON, since the check box 608 is ON, the electronic whiteboard 2 causes the dialogue (described later) illustrated in FIG. 21 to be displayed on the display 3 before the version upgrade of the program. With this, it is possible to check whether the user is to conduct the version upgrade before the version upgrade.

After the setup administrator makes the check box 608 of the parent apparatus 2p (the immediately above electronic whiteboard 2 in FIG. 15) ON using the system setup screen 601, it becomes possible for the parent apparatus 2p not to provide the program file 2005 to the child apparatus 2c.

In a case where the system setup is set to the electronic whiteboard 2, the setup administrator pushes down an OK button 620. In a case where the system setup is set to the electronic whiteboard 2, the setup administrator pushes down an OK button 621. The setup administrator PC 500 receives a setup content set by the setup administrator and sends the received setup content to the electronic whiteboard 2 displaying the setup information setup screen 601. The setup providing unit 150 of the electronic whiteboard 2 causes the setup information memory unit 2001 to store the setup information in the setup information memory unit 2001 based on the sent setup content. As described above, the setup administrator uses the setup administrator PC 500 to set the setup information to the parent apparatus 2p from among the electronic whiteboards 2. Therefore, in this case, the electronic whiteboard 2 means the parent apparatus 2p (the immediately above electronic whiteboard 2 in FIG. 15).

In FIG. 15, the setup receiving unit 152 of the immediately above electronic whiteboard 2 (namely, the parent apparatus 2p) can receive a setup from the setup administrator on the display 3 of the electronic whiteboard 2 instead of the system setup screen 601 displayed on the setup administrator PC 500 as illustrated in FIG. 16B.

TABLE 15

| ITEM NUMBER | ITEM | CONTENTS |
|---|---|---|
| 1 | SYSTEM SETUP | LOCATION NAME: OO SALES OFFICE<br>AUTOMATIC SHUTOUT TIME: ONE HOUR<br>AUTOMATIC RESTART TIME: 4:00 AM<br>AUTOMATIC STANDBY TIME: 20 MINUTES |

TABLE 15-continued

| ITEM NUMBER | ITEM | CONTENTS |
|---|---|---|
| | | SYNCHRONIZATION: ON |
| | | SYNCHRONIZATION TIMING: AT A TIME OF RESTART |
| | | SYNCHRONIZATION ITEM: ITEM NUMBER 1, 2, 4 |
| | | AUTOMATIC VERSION UPGRADE: ON |
| | | DISPLAY OF PERMITTING VERSION UPGRADE: ON |
| 2 | SECURITY SETUP | INPUT ADMITTED DOMAIN: aaa.co.jp |
| | | INPUT LIMITED DOMAIN: bbb.co.jp |
| | | PROHIBITION OF INPUTTING MAIL ADDRESS: ON |
| | | MINIMUM DIGIT NUMBER OF PASSWORD: 4 |
| | | A TIMING OF GENERATING PASSWORD: THE FIRST DAY OF EVERY MONTH |
| | | LIMIT OF DISPLAYING PASSWORD: OFF |
| 3 | NETWORK SETUP | IP ADDRESS: 192.168.2.1 |
| | | SUBNET MASK: 255.255.255.0 |
| | | DEFAULT GATEWAY: 192.168.2.0 |
| | | DNS: 192.168.2.0 |
| 4 | DATE AND HOUR | TIME ZONE: UTC + 9 |
| | | SYNCHRONIZATION WITH TIME SERVER: ON |

Table 15 schematically presents an example (a specific example of the setup information along with Table 12) of the content of the setup information set by the setup administrator. In the example of Table 15, items and contents are included for each item number as the setup information.

The setup information of the "system setup" includes items of "synchronization", "synchronization timing", and "synchronization item", as setup items related to the synchronization of the setup information. As the item of the "synchronization", ON in a case where a synchronization process is conducted and OFF in a case where the synchronization process is not conducted. As the item of the "synchronization timing", timing when the electronic whiteboard 2 synchronizes is set. As the item of the "synchronization item", the number of the item to synchronize is set from among several items held by the setup information. The item of the "synchronization timing" is "at a time of restart", "at a time of power-off", a predetermined time (for example, every day 4 o'clock), or the like.

Figure 21:
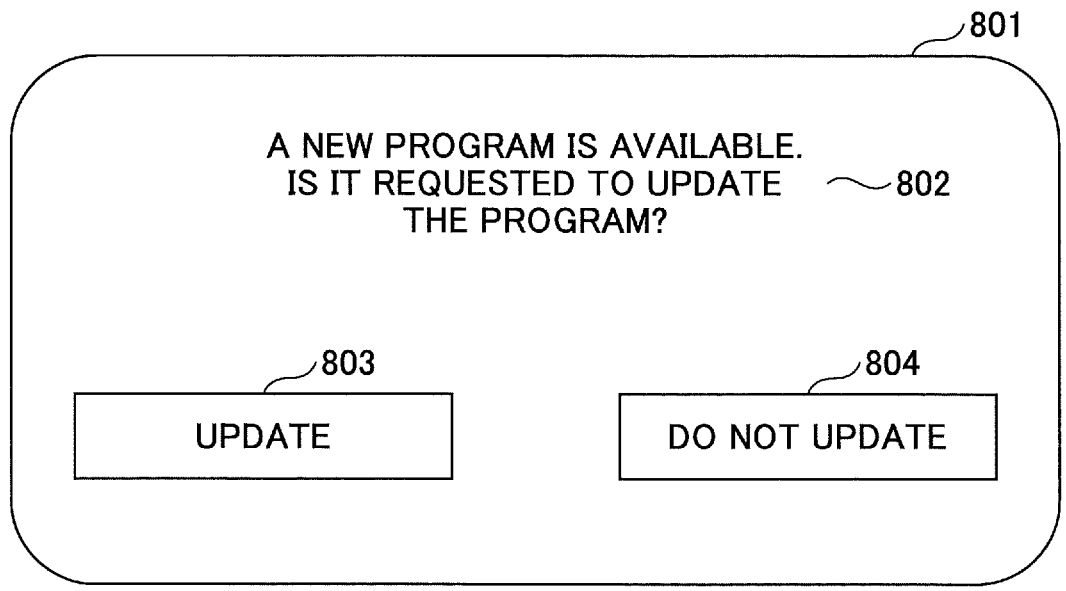
FIG. 21 illustrates an example of a dialogue displayed on a display.

Further, as the setup item related to the version upgrade of the program, items of "automatic version upgrade" and "version-up permission display" are included. The items of the "version upgrade" are ON in a case where the version upgrade is automatically conducted or OFF in a case where the version upgrade is not conducted. As the items of the "version-up permission display", ON is set in a case where the dialogue described below with reference to FIG. 21 is displayed, and OFF is set in a case where the dialogue is not displayed.

The system setup screen 601 illustrated in FIG. 16B is provided to set up the setup information related to the synchronization and the setup information related to the version upgrade of the program from among items of setup information for system setup settable by the setup administrator when the setup administrator pushes the system setup button 502 illustrated in FIG. 16A and presented in Table 15. A system setup screen for setting items of the setup information of the system setup settable by the setup administrator other than the above items can be prepared by pushing down the system setup button 502. The items other than the above items are, for example, a location name, an automatic shutout time, an automatic restart time, and an automatic standby time are set in a system setup screen in a next page of the system.

<<Communication Information Setup Screen>>

Figure 17:
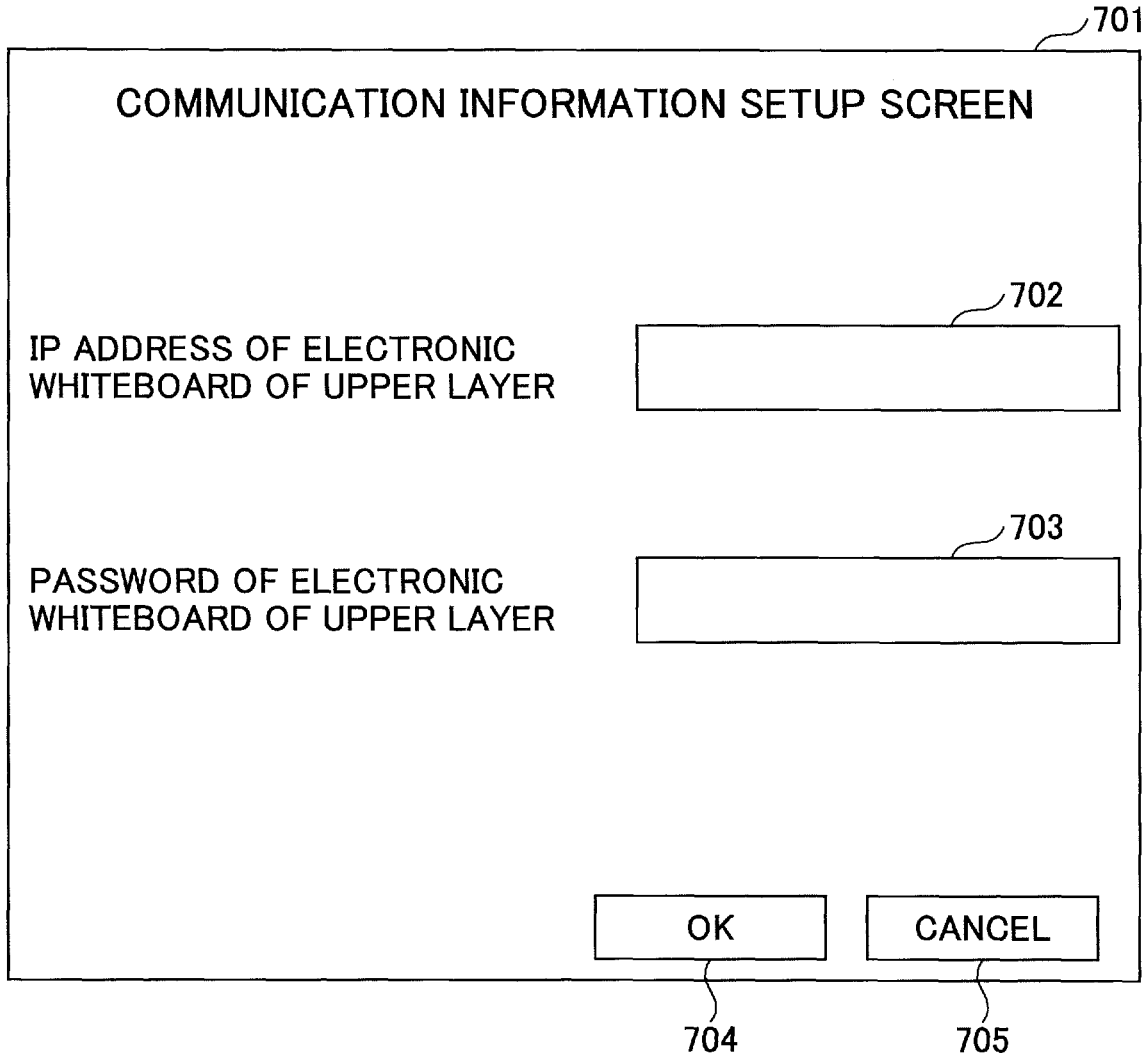
FIG. 17 illustrates an example of a communication information setup screen.

FIG. 17 presents an example of a communication information setup screen 701 displayed on the display of the setup administrator PC 500. An IP address input column 702 and a password input column 703 are displayed on the communication information setup screen 701. The setup administrator inputs the IP address of the immediately above electronic whiteboard 2 immediately above from the electronic whiteboard displaying the communication information setup screen 701 in the IP address input column 702. In a manner similar thereto, the setup administrator inputs the password in the password input column 703.

In a case where the input communication information is set to the electronic whiteboard 2, the setup administrator pushes down an OK button 704. In a case where the communication information is not set to the electronic whiteboard 2, the setup administrator pushes down a cancel button 705. In a case where the OK button 704 is pushed down, the setup administrator PC 500 receives the input communication information and sends the received communication information to the electronic whiteboard 2 displaying the system setup screen 601. The setup receiving unit 182 of the electronic whiteboard 2 receiving the communication information causes the communication information memory unit 5002 to store the communication information based on the received setup content.

The setup receiving unit 182 of the electronic whiteboard 2 can receive the setup from the setup administrator 2 on a communication information setup screen 701 displayed on the display 3 of the electronic whiteboard 2 instead of the communication information setup screen 701 displayed on the display of setup administrator PC 500.

<Install Procedure>

Figure 18:
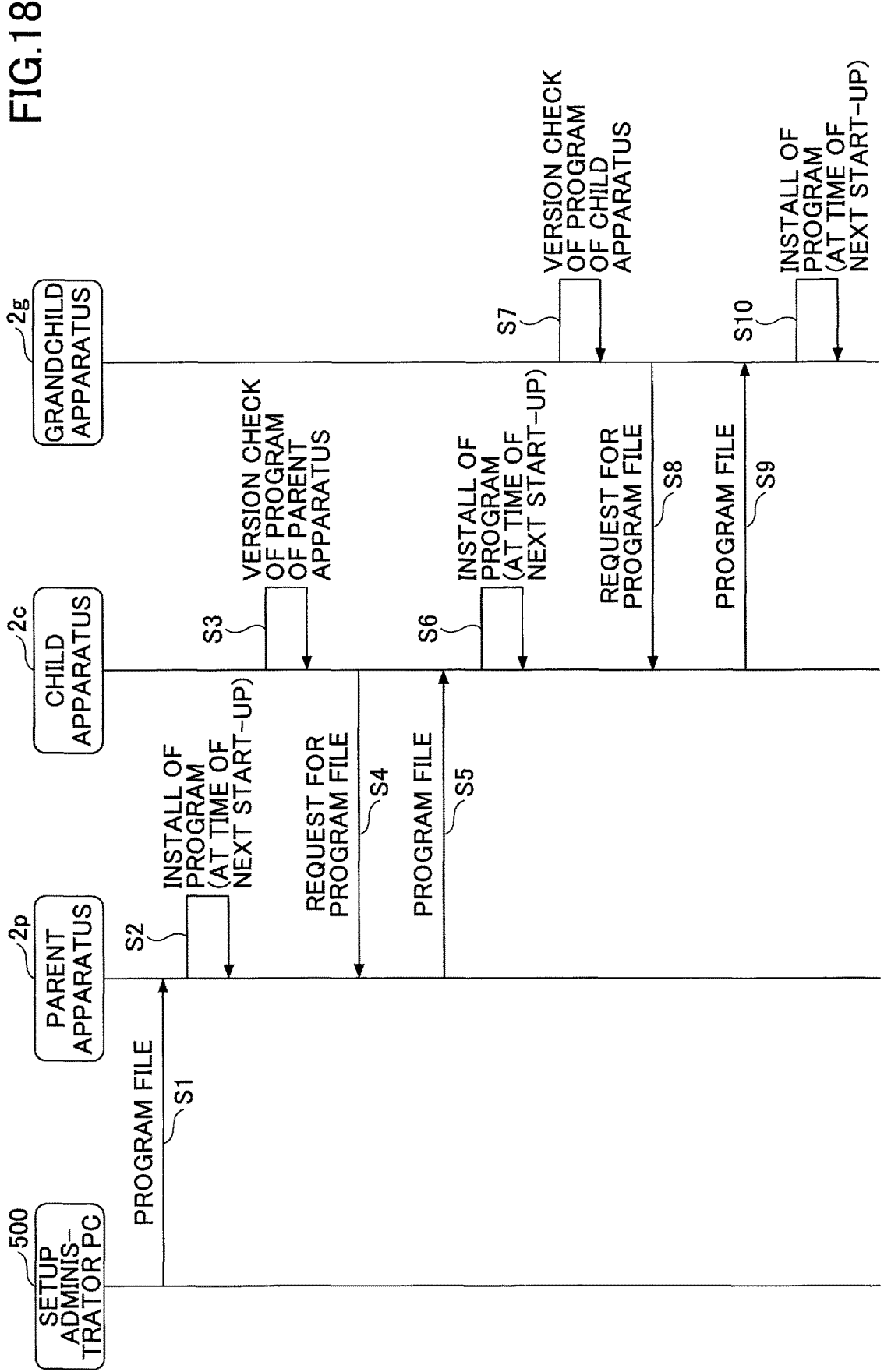
FIG. 18 is an example of a sequence diagram illustrating a procedure that an image processing system synchronizes a program of a new version.

FIG. 18 is an example of a sequence diagram illustrating a procedure that an image processing system 1 synchronizes a program of a new version. Referring to FIG. 18, an arbitrary child apparatus 2c in the child apparatus layer C and an arbitrary grandchild apparatus 2g in the grandchild apparatus layer G basically process.

In step S1, the setup administrator operates the setup administrator PC 500 and sets the program file 2005 of a new version to the parent apparatus 2p. The USB memory storing the program file 2005 may be installed in the parent apparatus 2p by the setup administrator so that the program file 2005 is copied to the memory unit 2000. Alternatively, the parent apparatus 2p may download the program file 2005 from a server delivering the program.

Next, in step S2, the parent apparatus 2p causes the program file 2005 to store in the memory unit 2000. At a next activation, the program of the program file 2005 is installed in the parent apparatus 2p itself. After the parent apparatus 2p installs the program of the program file 2005, the versions of the programs of the parent apparatus 2p and the child apparatus 2c may differ. The setup administrator can forcibly install the program of the program file 2005 in the parent apparatus 2p.

Next, in step S3, the "immediately above version determining unit" 164 of the child apparatus 2c checks the version of the program of the parent apparatus 2p is activated. Said differently, it is determined whether the version of the program installed in the parent apparatus 2p (the installed version 2004) is the same as the version of the program installed in the parent apparatus 2c (the installed version 5004. FIG. 18 assumes a case where the determination result is a case where "the program versions differ".

Next, in step S4, the program acquiring unit 165 of the child apparatus 2c requests the parent apparatus 2p to send the program file 2005. At that time, the child apparatus 2c sends the password stored in the communication information memory unit 5002 to the parent apparatus 2p so as to log in.

Next, in step S5, the program information providing unit 172 of the parent apparatus 2p sends the program file 2005 stored in the memory unit 2000 to the child apparatus 2c.

Next, in step S6, the program acquiring unit 165 of the child apparatus 2c causes the program file 2005 acquired from the parent apparatus 2p as the program file 5005 in the memory unit 5000. At the next activation, the program installing unit 163 installs the program of the program file 5005 into the child apparatus 2c. After the program is installed, the versions of the programs may differ between the child apparatus 2c and the grandchild apparatus 2g. The grandchild apparatus 2g can conduct the version upgrade in a manner similar to the above.

Therefore, the subsequent processes of steps S7 to S10 may be similar to the above steps S3 to S6.

<<Version Upgrade Process of Program>>

Figure 19:
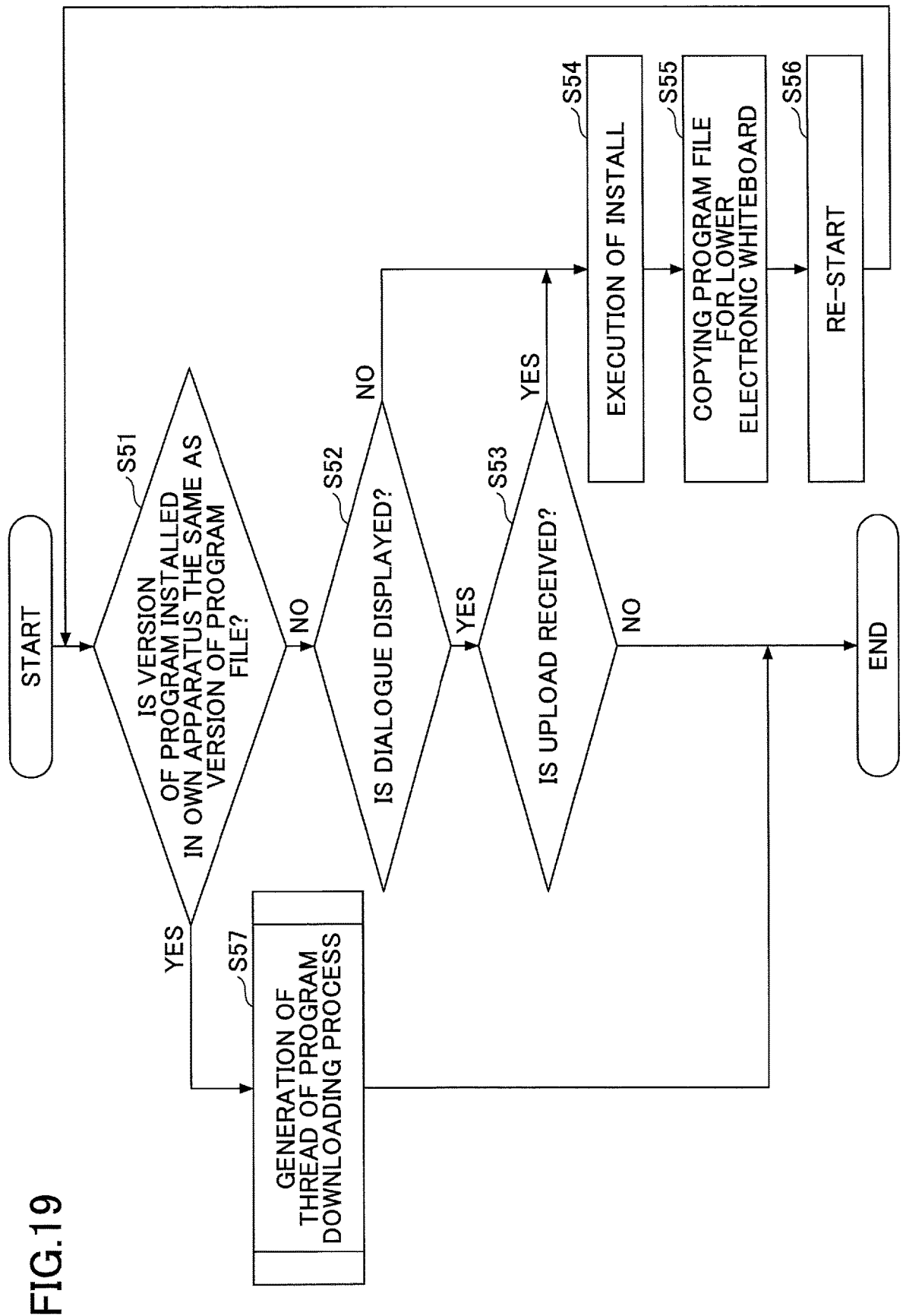
FIG. 19 is an, example of a flowchart illustrating a procedure that an electronic whiteboard other than the parent apparatus is subjected to a version upgrade.

FIG. 19 is an example of a flowchart illustrating a procedure that the electronic whiteboard 2 other than the parent apparatus is subjected to the version upgrade. The process illustrated in FIG. 19 starts by the activation of the electronic whiteboard 2. This activation may be a restart, in which an automatic restart time is set by pushing down the system setup button 502, or activation by the user.

At first, the version checking unit 162 of the electronic whiteboard 2 determines whether the version of the program installed in the electronic whiteboard 2 is the same as the version of the program in the program file 5005 stored in the memory unit 5000 (S51). The version of the program installed in the electronic whiteboard 2 itself is the "installed version" 5004 stored in the memory unit 5000.

In a case where the determination result in step S51 is NO, the version upgrade is required. Therefore, the program installing unit 163 determines whether the dialogue illustrated in FIG. 21 is displayed (S52). Said differently, it is determined whether the checkbox 608 is checked in the setup screen illustrated in FIG. 16B.

In a case where the determination result in step S52 is NO, the dialogue illustrated in FIG. 21 is not displayed and the program of the program file 5005 is installed (S54).

In a case where the determination result in step S52 is YES, the program installing unit 163 causes the dialogue illustrated in FIG. 21 to be displayed and determines whether an operation of pushing down a button 803 of "update" is received (S30). Specifically, the event sorting unit 25 determines that a coordinate detected by the coordinate detecting unit 22 is the UI operation while the dialogue illustrated in FIG. 21 is displayed. The operation processing unit 26 can receive the operation of pushing down the button 803 of "update" from the user based on the coordinate subjected to the UI operation.

When the dialogue is displayed and the user does not operate at all, the electronic whiteboard 2 becomes in a standby state after a passage of a standby time or is shut down after a passage of a shutdown time.

In a case where the determination result in step S53 is NO, the program is not installed. Therefore, the electronic whiteboard 2 causes other inactivated functions to activate (an activation process continues). Thereafter, the process transits to the process illustrated in FIG. 20.

The determination result in step S53 is YES, the program installing unit 163 of the electronic whiteboard 2 installs the program using the program file 5005 stored in the memory unit 5000 (S54).

Subsequently, the program file 5005 is copied from the memory unit 5000 to the memory unit 2000 so that the program file 5005 can be provided to the immediately below electronic whiteboard 2 (S55). Meanwhile, the program file 5005 of the memory unit 5000 can be served to the immediately below electronic whiteboard 2. In this case, step S55 may not be performed.

After the program is installed, the electronic whiteboard 2 restarts (S56). This restart is to replace the file which is not replaced in a manner similar to the ordinary computer. By the restart, the process returns to step S51. After the restart, YES is determined in step S51.

In a case where the determination result in step S51 is YES, the electronic whiteboard 2 generates a thread for the download process of the program (S57). This thread describes a procedure of downloading the program. By previously generating the thread, the electronic whiteboard 2 repeatedly executes the thread until the program is downloaded.

Figure 20:
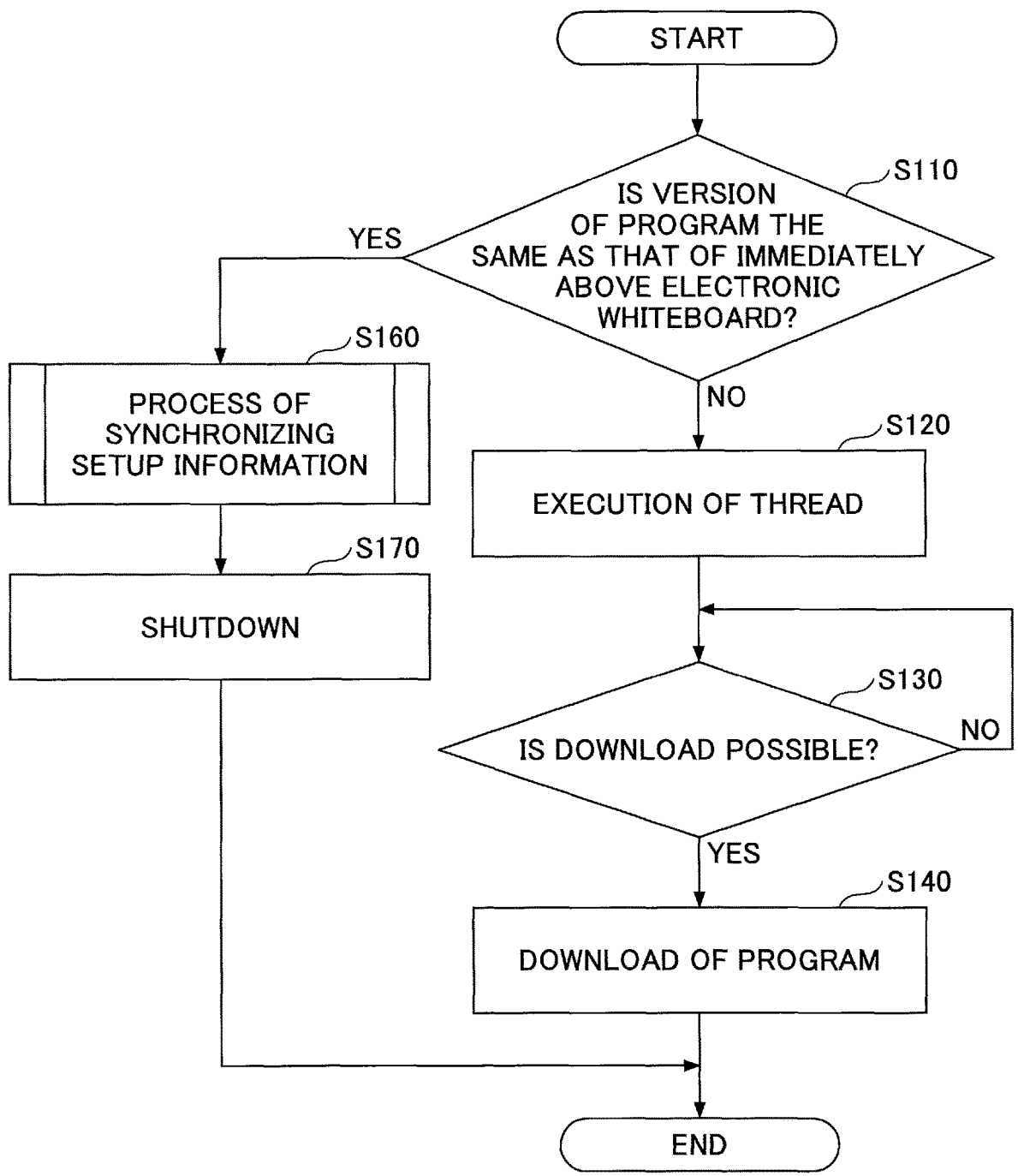
FIG. 20 is an example of a flowchart illustrating a process performed by the electronic whiteboard after the electronic whiteboard is activated.

Subsequently, a process of downloading the program and a process of synchronizing the setup information are described with reference to FIG. 20. FIG. 20 is an example of a flowchart illustrating a process performed by the electronic whiteboard 2 after the electronic whiteboard is activated. The process illustrated in FIG. 20 is executed after a function requiring this process is activated after the process illustrated in FIG. 19.

The "immediately above version determining unit" 164 of the electronic whiteboard 2 determines whether the version of the program of the electronic whiteboard 2 itself is the same as the immediately above electronic whiteboard 2 (S110). Said differently, the immediately above version determining unit 164 uses the communication information stored in the communication information memory unit 5002 to communicate with the immediately above electronic whiteboard 2 and acquire the "installed version 2004" from the immediately above electronic whiteboard 2. The immediately above version determining unit 164 determines whether the acquired "installed version" 2004 of the immediately above electronic whiteboard 2 is the same as the "installed version" 5004 of the electronic whiteboard 2 having the immediately above version determining unit 164.

In a case where the determination result is YES (a case where versions of the programs match), the setup information may be acquired from the immediately above electronic whiteboard 2. Therefore, the setup acquiring unit 180 of the electronic whiteboard 2 synchronizes the setup information (S160). The synchronization of the setup information is described later in detail with reference to FIG. 22.

In a case where the setup information is synchronized, the electronic whiteboard 2 shuts down (S170). In a case where there is a setup which becomes effective from among the setup information only after the restart, the setup becomes effective by this shutdown.

In a case where the determination result of step S110 is NO (said differently, the versions of the programs do not match), the versions of the programs are required to match before the synchronization of the setup information. Therefore, the program acquiring unit 165 executes the thread of the download process of the program generated in step S57 illustrated in FIG. 19 (S120).

At first, the program acquiring unit 165 determines whether the program file can be downloaded from the immediately above electronic whiteboard 2 (S130). The conditions determined in step S130 are, for example, as follows.

(i) The immediately above electronic whiteboard 2 holds the program file 2005.
(ii) The immediately above electronic whiteboard 2 makes a synchronization setup effective.
(iii) The immediately above electronic whiteboard 2 makes an update setup of the program effective.

The reason why the condition (i) is determined is that the program file is not acquired by the electronic whiteboard 2 if the immediately above electronic whiteboard 2 does not hold the program file 2005. The reason why the condition (ii) is determined is that the program file is not acquired by the electronic whiteboard 2 if the immediately above electronic whiteboard 2 is set so as not to provide the setup information. The reason why the condition (iii) is determined is that the program file is not acquired by the electronic whiteboard 2 if the immediately above electronic whiteboard 2 is set so as not to serve the program file 2005. The conditions (ii) and (iii) may be omitted. If only the condition (i) is satisfied, the program acquiring unit 165 can determine that the program file can be downloaded from the immediately above electronic whiteboard 2.

In a case where the determination result in step S130 is NO, the program acquiring unit 165 periodically repeats the determination in step S130. With this, without increasing the loads on the two electronic whiteboards 2 in a mutual relation of immediately above and immediately below, the electronic whiteboard 2 can download the program file from the immediately above electronic whiteboard 2 when the electronic whiteboard 2 is enabled to download the program file. A time interval of periodically repeating the determination may not be fixed. For example, the determination is repeated at a time interval of several minutes to one hour, or the like. Further, the determination may not be repeated at an accurate interval or may be repeated at an irregular interval.

In a case where the determination result in step S130 is YES, the program acquiring unit 165 downloads program file 2005 from the immediately above electronic whiteboard 2 (S140). The downloaded program file 2005 is stored as the program file 5005 in the memory unit 5000. The program file 5005 is installed on the electronic whiteboard 2 having the memory unit 5000 at the next activation.

As described above, in a case where the "installed version" 5004 of the electronic whiteboard 2 is the same as the "installed version" 2004 of the immediately above electronic whiteboard 2, the setup information can be synchronized. In a case where the "installed version" of the electronic whiteboard 2 differs from the "installed version" 2004 of the immediately above electronic whiteboard 2, the electronic whiteboard 2 downloads the program file 5005 from the immediately above electronic whiteboard 2 so as to be installed on the electronic whiteboard 2 itself. With this, the electronic whiteboard 2 can synchronize the setup information in relation to the immediately above electronic whiteboard 2 because the version of the program installed between the electronic whiteboard 2 and the immediately above electronic whiteboard 2.

<<Dialogue>>

FIG. 21 illustrates an example of the dialogue 801 displayed on the display 3 of the electronic whiteboard 2 in a case where the checkbox 608 on the system setup screen 601 is ON. The dialogue 801 displays a description 802 of "A new program is available. Is it requested to update the program?", a button 803 of "update", and a button 804 of "not update".

When the user pushes down the button 803 of "update", it is determined YES in step S53 illustrated in FIG. 19, the electronic whiteboard 2 provides the program with the version upgrade. When the user pushes down the button 804 of "not update", it is determined NO in step S53 illustrated in FIG. 19, the electronic whiteboard 2 does not provide the program with the version upgrade.

<Synchronization Procedure of Setup Information>

Figure 22:
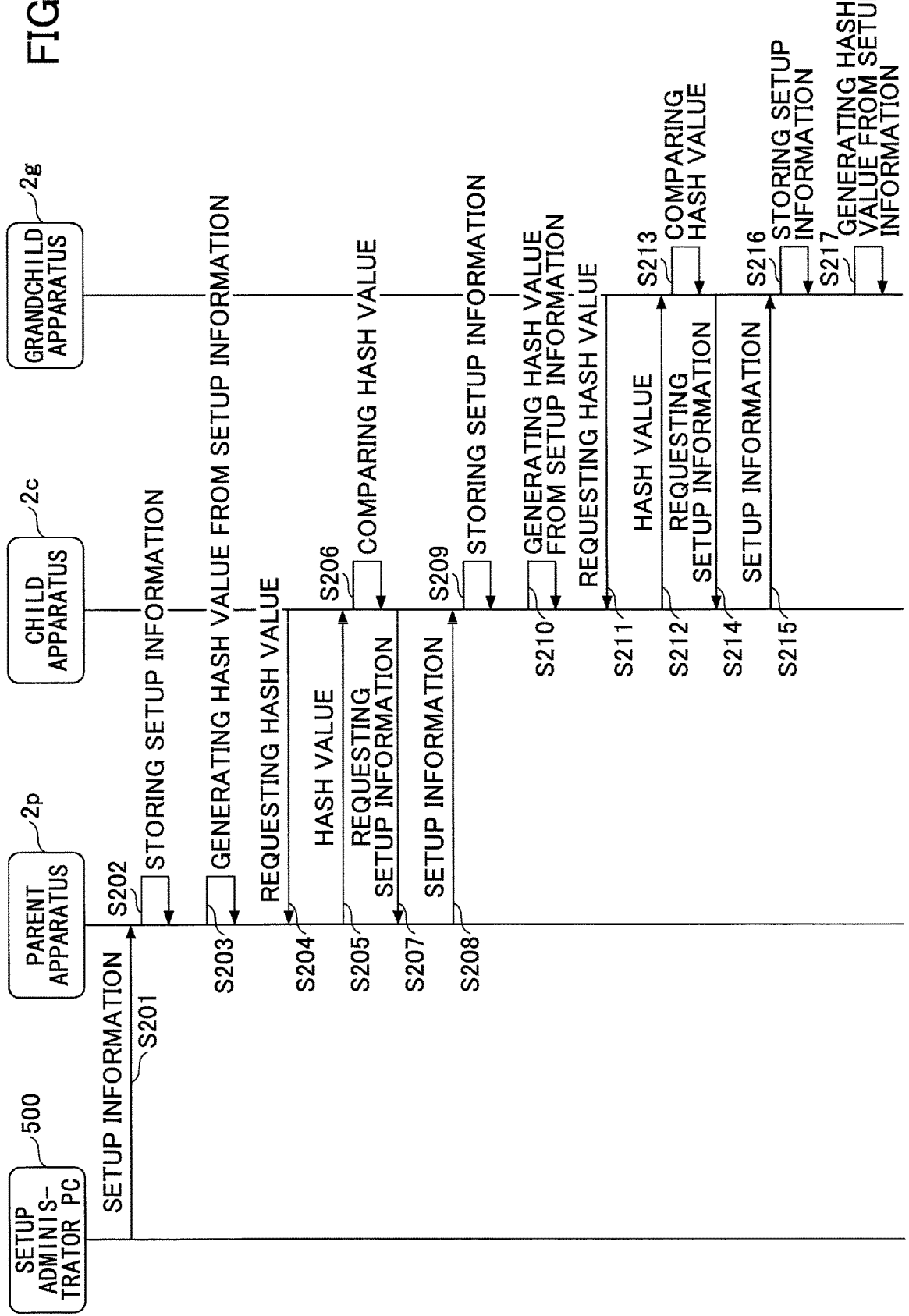
FIG. 22 is an example of a sequence diagram illustrating a procedure that the image processing system synchronizes setup information.

Next, a synchronization procedure of setup information is described. FIG. 22 is an example of a sequence diagram illustrating a procedure that the image processing system 1 synchronizes setup information. Referring to FIG. 22, an arbitrary child apparatus 2c in the child apparatus layer C and an arbitrary grandchild apparatus 2g in the grandchild apparatus layer G basically process.

At first, in step S201, the setup administrator operates the "setup information setup screen" to set the setup information to the parent apparatus 2p as described above with reference to FIGS. 16A and 16B.

Next, in step S202, the setup receiving unit 152 of the parent apparatus 2p receives the setup information set in step S201 and causes the setup information memory unit 2001 to store as the setup information for a main body operation. The setup receiving unit 152 of the parent apparatus 2p updates a setup date and hour.

Next, in step S203, the MD generating unit 153 of the parent apparatus 2p generates a message digest (a hash value) from the setup information for the main body operation and causes the generated message digest to be stored in the MD memory unit 2003. With this, the parent apparatus 2p can send the message digest (the hash value) to the child apparatus 2c.

Next, in step S204, the setup requesting unit 183 of the child apparatus 2c detects a timing when the setup information is synchronized because the electronic whiteboard 2 is restarted, the child apparatus communicates with the parent apparatus 2p having the IP address stored in the communication information memory unit 5002, sends the password to the, and logs in the parent apparatus 2p. In a case where the login is successful, the setup requesting unit 183 requests the parent apparatus 2p for the hash value.

The parent apparatus 2p and the child apparatus 2c are mutually operated in a synchronization procedure mutually matched. Hereinafter, this synchronization procedure is referred to as a protocol. The protocol has the version. The child apparatus 2c preferably conducts the process using a protocol of the same version as that of the parent apparatus 2p. According to the above description, in a case where the version of the protocol and the password match, the hash value is sent from the parent apparatus 2p to the child apparatus 2c. In the process of step S204, it is assumed that the version of the protocol and the password match.

In a case where the parent apparatus 2p is power off or has any trouble, the child apparatus 2c cannot acquire the hash value from the parent apparatus 2p. As a result, in a case where the child apparatus 2c cannot acquire the setup information from the parent apparatus 2p, the setup requesting unit 183 of the child apparatus 2c records an error. Details will be described with reference to FIG. 23.

Next, in step S205, the communication unit 151 of the parent apparatus 2p sends the message digest (the hash value) stored in the MD memory unit 2003 to the child apparatus 2c.

Next, in step S206, the setup requesting unit 183 of the child apparatus 2c receives the message digest (the hash value) sent from the parent apparatus 2p, and the MD comparing unit 184 compares the hash value of the parent apparatus 2p with the hash value stored in the MD memory unit 5003. By comparing the instead of comparing, a communication load can be made lower in a case where the hash values are compared than in a case where the entire setup information is compared. Here, it is assumed that two hash values do not match. The unmatching of the two hash values indicate that the setup information for the main body operation of the parent apparatus 2p is updated (the setup information of the parent apparatus 2p is newer than that of the child apparatus 2c). Instead of the hash value, for example, the serial numbers of the setup information may be compared. In this case, the parent apparatus 2p or the setup administrator attaches the serial number to the setup information, and the child apparatus 2c synchronizes the serial number at a time of synchronizing the setup information. In a case where the serial numbers do not match, the child apparatus 2c can determine that the setup information of the parent apparatus 2p is updated. Alternatively, the setup information itself may be compared instead of the hash value. In this case, if the setup information is mutually different, the child apparatus 2c uses the setup information of the parent apparatus 2p as is to update the setup information of the child apparatus 2c.

The parent apparatus 2p may acquire the hash value of the child apparatus 2c and compare the hash value of the child apparatus 2c with the hash value of the parent apparatus 2p. In the case, the load on the parent apparatus 2p increases. However, the comparison of the hash value doesn't cause a heavy load, the parent apparatus 2p may compare the hash value.

Next, in a case where the hash values do not match as the result of the comparison in step S207, the information acquiring unit 186 of the child apparatus 2c requests the parent apparatus 2p to send the setup information. If the hash values match, the child apparatus 2c does not require the setup information. Therefore, it is possible to prevent the loads on the parent apparatus 2p and the child apparatus 2c from increasing.

Next, in step S208, the communication unit 151 of the parent apparatus 2p sends the setup information for the main body operation read from the setup information memory unit 2001 to the child apparatus 2c.

Next, in step S209, the communication unit 181 of the child apparatus 2c receives the setup information from the parent apparatus 2p. The information acquiring unit 186 causes the setup information received from the parent apparatus to be stored as the setup information for the main body operation in the setup information memory unit 5001. Further, the information acquiring unit 186 updates a setup date and hour.

Next, the child apparatus 2c copies the setup information from memory unit 5000 to the setup information memory unit 2001 so that the child apparatus 2c can send the setup information to the grandchild apparatus 2g. The child apparatus 2c may send the setup information of the setup information memory unit 5001 to the grandchild apparatus 2g. In this case, the above copy needs not to be conducted. However, in this case, as for the electronic whiteboards 2 other than the parent apparatus 2p, the setup information memory unit 5001 is made the same as that of the setup file memory unit 430.

Next, in step S210, the MD generating unit 187 of the child apparatus 2c generates a message digest (a hash value) from the setup information acquired from the parent apparatus 2p and causes the generated message digest to be stored in the MD memory unit 5003. With this, the child apparatus 2c can send the message digest (the hash value) to the grandchild apparatus 2g. In this case, the message digest is copied from the MD memory unit 5003 to the MD memory unit 2003 so that the child apparatus 2c can send the message digest to the grandchild apparatus 2g. However, the message digest of the MD memory unit 5003 may be sent to the grandchild apparatus 2g. In this case, the above copy may not be conducted.

As described in the above processes, the setup information is synchronized between the parent apparatus 2p and the child apparatus 2c. Next, after the setup requesting unit 183 of the grandchild apparatus 2g detects the timing when the setup information is synchronized, the grandchild apparatus 2g executes the same process as that in the child process as in steps S11 to S17.

As described, from among two electronic whiteboards 2 in the mutual relation of immediately above and immediately below, it is sufficient that the immediately below electronic whiteboard 2 conducts a process of updating the setup information of the electronic whiteboard 2 itself. Therefore, the load can be reduced than a case where the immediately above electronic whiteboard 2 sets the setup information to the multiple immediately below electronic whiteboards 2.

The timing when the grandchild apparatus 2g acquires the setup information delays by one cycle from that in the child apparatus 2c. This is because when the grandchild apparatus 2g is activated the child apparatus 2c is synchronizing the setup information, the hash values match, and therefore the grandchild apparatus 2g determines that the synchronization is unnecessary. Therefore, if the timing of the synchronization is once a day (restart of the electronic whiteboard 2 is once a day), the timing when the grandchild 2g acquires the setup information delays one day in comparison with the child apparatus 2c. However, because the synchronization is with the delayed timing, the electronic whiteboards 2 are not required to conduct the synchronization of the setup information for the electronic whiteboard 2 itself and the transmission of the setup information to the immediately below electronic whiteboard 2 at the same timing. Therefore, a heavier load is apt to be suppressed. If such a delay is unpreferable, the setup administrator may set the number of the automatic restarts to be multiple times a day, or the user and the setup administrator may manually restart to appropriately shorten the delay.

<<Operation Procedure of Child Apparatus>>

FIG. 23 is an example of a flowchart illustrating a procedure that the electronic whiteboard 2 updates the setup information. In the description of the process illustrated in FIG. 23, the process in step S204 illustrated in FIG. 22 is described.

As described above, the setup requesting unit 183 of the child apparatus 2c requests the parent apparatus 2p for the hash value (step S310). In response to this request, the communication unit 151 of the parent apparatus 2p sends the hash value or an error code in response to the content of the error to the child apparatus 2c. Therefore, the child apparatus 2c can acquire the hash value or the error code.

The setup requesting unit 183 of the child apparatus 2c determines whether the hash value is acquired (step S320).

In a case where the hash value has been acquired (YES in step S320), the information acquiring unit 186 of the child apparatus 2c acquires the setup information as described above (step S330).

In a case where the hash value has not been acquired (NO in step S320), the setup requesting unit 183 of the child apparatus 2c records the error code in the memory unit 5000 (step S340). The error code includes the following types.

400: the version of the protocol does not match
401: the password does not coincide The setup requesting unit 183 of the child apparatus 2c records the error code of 402 indicative of no response in a case where the parent apparatus 2p does not respond (because of power off or the like). With this, the error code displaying unit 188 can display the error code on the display 3 of the electronic whiteboard 2 or the setup administrator PC 500.

<Display of Error Code>

Figure 24A:
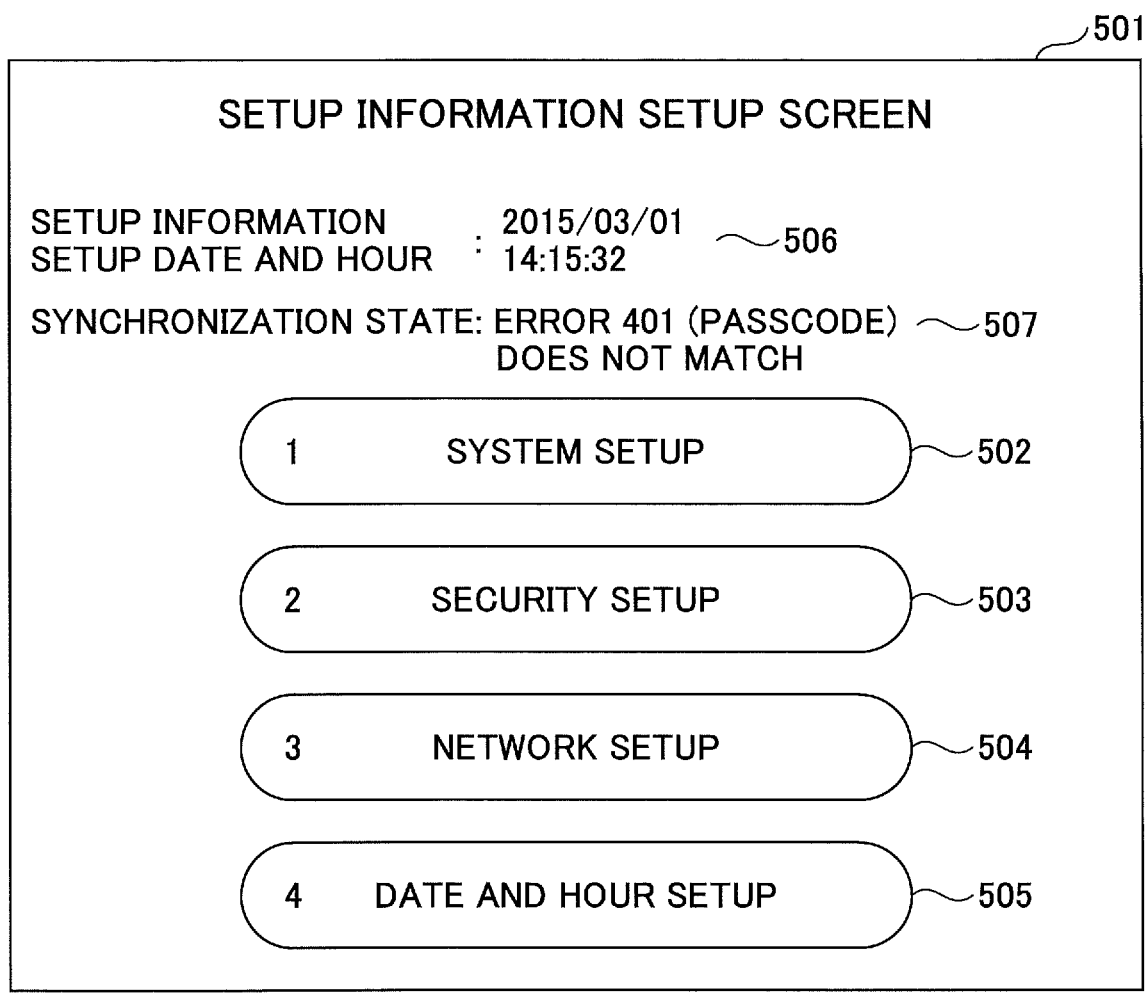
FIG. 24A illustrates an example of the setup information setup screen, on which an error code is displayed.

FIG. 24A illustrates an example of the "setup information setup screen" 501 displayed on the display of the setup administrator PC 500 in a case where the error code is recorded in step S340 illustrated in FIG. 23. The description with reference to FIG. 24A mainly describes a difference from FIG. 16A. The error code displaying unit 188 causes a setup date and hour 506 and a synchronization state 507 stored in a setup information memory unit 5001 to be displayed on the setup information setup screen 501. Because a synchronization state is displayed as an error, the setup administrator can understand that the synchronization is conducted. Further, because the error code (the content of the error) is displayed as the synchronization state, the reason why the synchronization is conducted can be understood.

FIG. 24B illustrates an example of the error code displayed on the display of the electronic whiteboard 2. On the display 3 of the electronic whiteboard 2, a tool icon column 511 such as "handwriting", "eraser", and so on, a page tool column 512 for switching the pages, and so on are displayed. The error code displaying unit 188 of the electronic whiteboard 2 displays a setup date and hour 506 and a synchronization state 507 stored in the setup information memory unit 5001 on, for example, the upper right of the display 3.

The timing of displaying the error code is several seconds after activating the electronic whiteboard 2. Therefore, the user is scarcely prevented from using the electronic whiteboard 2. Because the user reports the display of the error code to the setup administrator, the setup administrator understands that the synchronization has not been conducted and looks in the reason why the synchronization has not been conducted.

As described above, according to the image processing system 1 of the embodiment, each electronic whiteboard 2 repeats the synchronization of the setup information of all electronic whiteboards to make the setup information of all electronic whiteboards synchronize.

The setup administrator may set setup information in the electronic whiteboard 2 at the summit of the tree structure (said differently, the parent apparatus 2p) and the setup information in a relatively lower electronic whiteboard 2 relatively lower than the parent apparatus 2p. In this case, the setup information is synchronized by a lower electronic whiteboard 2 positioned lower than the electronic whiteboard 2, to which the setup administrator sets the setup information. At least two parent apparatuses 2p may be present in a hierarchy of the parent apparatus 2p. In this case, the setup administrator sets the setup information to each of the two parent apparatuses 2p.

Other Applied Examples

The best modes for practicing the present invention have been described using the embodiments in the above. However, the present invention is not limited to these embodiments, but various variations and modifications may be made without departing from the scope of the present invention.

Within the embodiments, the synchronization process has been described using the setup information of the electronic whiteboard 2. The present invention may be applied to the synchronization process of the setup information updated by an apparatus other than the electronic whiteboard 2. For example, the present invention is applicable to a projector, an image forming apparatus (a copier, a printer, a scanner, a Multi Function Peripheral (MFP), a teleconference terminal, or the like.

Within the embodiment, the example of the synchronized setup information is described. However, the setup information is not limited to the above information. For example, a print setup in a case where printing is conducted by a printer coupled to the electronic whiteboard 2 (presence of print authentication, password, presence of encryption, or the like), a setup of a land area and a language, a setup related to management of registration (memory) data (a setup related to limitation to reading or writing the information held by the electronic whiteboard 2, a setup of color profile, and the user information, the user information (a user name, a mail address, a destination address when the electronic whiteboard 2 sends a mail) may be included in the setup information. Further, in a case where an apparatus other than the electronic whiteboard 2 synchronizes the information, information peculiar to the apparatus may be synchronized.

In the structural example illustrated in FIGS. 14 and 15, the processes of the electronic whiteboard 2 are divided into processing units in response to a main function in order to facilitate understanding of the processes by the electronic whiteboard 2. However, the present invention is not limited to a way of dividing into the processing units or names of the processing units. The processes of the electronic whiteboard 2 can be further divided into more processing units. Furthermore, the processes of the electronic whiteboard 2 can be divided so as to include further more processes.

At least one of the memory units included in the memory units 2000 and 5000 illustrated in FIGS. 14 and 15 may be present in the network.

The communication information memory unit 5002 is an example of the communication information memory unit. The communication unit 161 and the immediately above version determining unit 164 are examples of the first determining unit. The communication unit 181 and the information acquiring unit 186 are examples of the setup information acquiring unit. The program acquiring unit 165 is an example of the software acquiring unit. The memory unit 5000 is an example of a file memory unit. The program installing unit 163 is an example of the installing unit. The version checking unit 162 is an example of a second determining unit. The dialogue 801 is an example of a screen of receiving an instruction of installation. The setup requesting unit 183 is an example of a message digest acquiring unit. The MD generating unit 187 is an example of the generating unit, and the MD comparing unit 184 is an example of the third determining unit. The setup administrator PC 500 is an example of the external apparatus. The image processing system 1 is an example of the information processing system. The immediately above electronic whiteboard 2 is an example of another information processing apparatus. The immediately below electronic whiteboard 2 is an example of "further another information processing apparatus". A method for processing the information performed by the image processing system 1 is an example of the method for processing information. The error code displaying unit 188 is an example of the display processing unit. The display 3 is an example of a display device. The setup information memory unit 5001 and the setup information memory unit 2001 are examples of the setup information memory unit. The program information providing unit 172 is an example of the software providing unit. The information providing unit 154 is an example of a providing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. For convenience of explanation, the apparatus of the embodiment of the present invention is explained using functional block diagrams. These apparatuses may be implemented by hardware, software, or a combination of these. Although the embodiments have been described in detail, it should be understood that various changes, substitutions, and alterations could be made thereto without departing from the spirit and scope of the invention.

It is possible to provide an information processing apparatus which can consider the version of the software at the time of synchronizing the setups.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 101 in a computer system or other system. The machine code may be converted from the source code, etc. If embodied in hardware, each block may represent a circuit or a number of interconnected circuits to implement the specified logical function(s).

According to the embodiment of the present invention, the following aspects are provided.

(1) An information processing apparatus providing a function by software installed on the information processing apparatus and behaving based on setup information related to an operation, the information processing apparatus comprising:

a communication information memory unit configured to store communication information for communicating with another information processing apparatus;

a first determining unit configured to communicate with the another information processing apparatus using the communication information and determine whether a version of the software installed on the information processing apparatus matches a version of the software installed on the another information processing apparatus;

a setup information acquiring unit configured to communicate with the another information processing apparatus using the communication information and acquire the setup information from the another information processing apparatus in a case where the first determining unit determines that the version of the software installed on the information processing apparatus matches the version of the software installed on the another information processing apparatus;

a software acquiring unit configured to acquire a file of the software from the another information processing apparatus in a case where the first determining unit determines that the version of the software installed on the information processing apparatus does not match the version of the software installed on the another information processing apparatus;

a file storing unit configured to store the file acquired by the software acquiring unit;

a second determining unit configured to determine whether a version of the file stored in the file storing unit matches the version of the software already installed on the information processing apparatus; and an installing unit configured to install the software using the file stored in the file storing unit in a case where the second determining unit determines that the version of the software installed on the information processing apparatus matches the version of the software installed on the another information processing apparatus, wherein the first determining unit determines whether the version of the software installed on the information processing apparatus matches the version of the software installed on the another information processing apparatus in a case the second determining unit determines that the version of the file stored in the file storing unit matches the version of the software already installed on the information processing apparatus.

(2) The information processing apparatus according to (1),
wherein the software acquiring unit acquires the file from the another information processing apparatus when a predetermined condition is satisfied, and
wherein it is repeated to determine whether the predetermined condition is satisfied with a time interval until the software acquiring unit is enabled to acquire the file from the another information processing apparatus.

(3) The information processing apparatus according to (1),
wherein the installing unit displays a screen for receiving whether the software is installed on the information processing apparatus on a display device before the software is installed on the information processing apparatus, and
wherein, in a case where the screen receives an input indicating that the software is installed on the information processing apparatus, the installing unit installs the software using the file stored in the file storing unit on the information processing apparatus.

(4) The information processing apparatus according to (1),
wherein the information processing apparatus is coupled to a further another information processing apparatus that is different from the another information processing apparatus,
wherein the information processing apparatus further comprising:
a software providing unit configured to provide the file stored in the file storing unit to the further another information processing apparatus in a case where the further another information processing apparatus determines that a version of the software installed in the further another information processing apparatus matches with the version of the software installed in the information processing apparatus.

(5) An information processing apparatus providing a function by software installed on the information processing apparatus and behaving based on setup information related to an operation,
the information processing apparatus comprises:
a communication information memory unit configured to store communication information for communicating with another information processing apparatus;
a first determining unit configured to communicate with the another information processing apparatus using the communication information and determine whether a version of the software installed on the information processing apparatus matches a version of the software installed on the another information processing apparatus;
a setup information acquiring unit configured to communicate with the another information processing apparatus using the communication information and acquire the setup information from the another information processing apparatus in a case where the first determining unit determines that the version of the software installed on the information processing apparatus matches the version of the software installed on the another information processing apparatus;
a setup information memory unit storing the setup information acquired by the setup information acquiring unit;

a third determining unit configured to acquire information related to the setup information from the another information processing apparatus and determine whether the setup information is updated;
a message digest acquiring unit configured to acquire a message digest generated by the another information processing apparatus from the setup information; and
a generating unit configured to generate the message digest from the setup information stored in the setup information memory unit,
wherein the third determining unit compares the message digest acquired by the message digest acquiring unit with the message digest generated by the generating unit, and
wherein, in a case where the third determining unit determines that these two message digests do not match, the setup information acquiring unit acquires the setup information from the another information processing apparatus.

(6) The information processing apparatus according to (5),
wherein, in a case where the setup information is acquired from the another information processing apparatus, the setup information acquiring unit records a date and hour of acquiring the setup information,
wherein, in a case where the setup information is not acquired from the another information processing apparatus, the setup information acquiring unit records a reason why the setup information is not acquired, and
wherein the information processing apparatus further comprising:
a display processing unit configured to cause an external apparatus coupled to the information processing apparatus or a display device of the information processing apparatus to display the date and hour or the reason.

(7) An information processing system, in which an information processing apparatus providing a function by software installed on the information processing apparatus and behaving based on setup information related to an operation communicates with another information processing apparatus,
wherein the information processing apparatus incl a communication information memory unit configured to store communication information for communicating with the another information processing apparatus;
a first determining unit configured to communicate with the another information processing apparatus using the communication information and determine whether a version of the software installed on the information processing apparatus matches a version of the software installed on the another information processing apparatus;
a setup information acquiring unit configured to communicate with the another information processing apparatus using the communication information and acquire the setup information from the another information processing apparatus in a case where the first determining unit determines that the version of the software installed on the information processing apparatus matches the version of the software installed on the another information processing apparatus;
a software acquiring unit configured to acquire a file of the software from the another information processing apparatus in a case where the first determining unit determines that the version of the software installed on the information processing apparatus does not match the version of the software installed on the another information processing apparatus;
a file storing unit configured to store the file acquired by the software acquiring unit;
a second determining unit configured to determine whether a version of the file stored in the file storing unit matches the version of the software already installed on the information processing apparatus; and an installing unit configured to install the software using the file stored in the file storing unit in a case where the second determining unit determines that the version of the software installed on the information processing apparatus does not match the version of the software installed on the another information processing apparatus, wherein the first determining unit determines whether the version of the software installed on the information processing apparatus matches the version of the software installed on the another information processing apparatus in a case where the second determining unit determines that the version of the file stored in the file storing unit matches the version of the software already installed on the information processing apparatus.

(8) A method for processing information implemented by an information processing apparatus providing a function by software installed on the information processing apparatus and behaving based on setup information related to an operation, the method comprising:

communicating, by a first determining unit, with an another information processing apparatus using communication information for communicating with the another information processing apparatus;

determining, by the first determining unit, whether a version of the software installed on the information processing apparatus matches a version of the software installed on the another information processing apparatus;

in a case where the first determining unit determines that the version of the software installed on the information processing apparatus matches the version of the software installed on the another information processing apparatus,
  communicating, by a setup information acquiring unit, with the another information processing apparatus using the communication information; and
  acquiring, by the setup information acquiring unit, the setup information from the another information processing apparatus;

in a case where the first determining unit determines that the version of the software installed on the information processing apparatus does not match the version of the software installed on the another information processing apparatus,
  acquiring, by a software acquiring unit, a file of the software from another information processing apparatus;
  determining, by a second determining unit, whether a version of the file stored in the file storing unit matches the version of the software already installed on the information processing apparatus;
  in a case where the second determining unit determines that the version of the software installed on the information processing apparatus does not match the version of the software installed on the another information processing apparatus, installing, by an installing unit, the software using the file stored in the file storing unit; and,
  in a case where the second determining unit determines that the version of the file stored in the file storing unit matches the version of the software already installed on the information processing apparatus, the first determining unit determines whether the version of the software installed on the information processing apparatus matches the version of the software installed on the another information processing apparatus.

(9) The information processing apparatus according to (1), wherein, in a case where the first determining unit determines that the version of the software installed on the information processing apparatus does not match the version of the software installed on the another information processing apparatus,
  the software acquiring unit acquires the file of the software from the another information processing apparatus,
  the file storing unit stores the file acquired by the software acquiring unit, and
  the installing unit installs the software on the information processing apparatus using the file stored in the file storing unit, wherein, in a case where the first determining unit determines that the version of the software installed on the information processing apparatus matches the version of the software installed on the another information processing apparatus, the setup information acquiring unit communicates with the another information processing apparatus using the communication information and acquires the setup information from the another information processing apparatus.

(10) The information processing apparatus according to (5), the information processing apparatus further comprising:

a software acquiring unit configured to acquire a file of the software from the another information processing apparatus in a case where the first determining unit determines that the version of the software installed on the information processing apparatus does not match the version of the software installed on the another information processing apparatus;

a file storing unit configured to store the file acquired by the software acquiring unit; and an installing unit configured to install the software using the file stored in the file storing unit, wherein, in a case where the first determining unit determines that the version of the software installed on the information processing apparatus does not match the version of the software installed on the another information processing apparatus,
  the software acquiring unit acquires the file of the software from the another information processing apparatus,
  the file acquired by the software acquiring unit is stored in the file storing unit, and
  the installing unit installs the software on the information processing apparatus using the file stored in the file storing unit, wherein, in a case where the first determining unit determines that the version of the software installed on the information processing apparatus matches the version of the software installed on the another information processing apparatus, the setup information acquiring unit communicates with the another information processing apparatus using the communication information and acquires the setup information from the another information processing apparatus.

(11) An information processing system comprising an information processing apparatus communicating with another information processing apparatus, the information processing apparatus providing a function by software installed in the information processing apparatus and behaving based on setup information related to an operation, wherein the information processing apparatus includes:
a communication information memory unit configured to store communication information for communicating with the another information processing apparatus;
a first determining unit configured to communicate with the another information processing apparatus using the communication information and determine whether a version of the software installed on the information processing apparatus matches a version of the software installed on the another information processing apparatus;
in a case where the first determining unit determines that the version of the software installed on the information processing apparatus matches the version of the software installed on the another information processing apparatus,
a setup information acquiring unit configured to communicate with the another information processing apparatus using the communication information and acquire the setup information from the another information processing apparatus;
a third determining unit configured to determine whether the setup information is updated;
a message digest acquiring unit configured to acquire a message digest generated by the another information processing apparatus from the setup information; and
a generating unit configured to generate the message digest from the setup information stored in the setup information memory unit,
wherein the third determining unit compares the message digest acquired by the message digest acquiring unit with the message digest generated by the generating unit, and
wherein, in a case where the third determining unit determines that these two message digests do not match, the setup information acquiring unit acquires the setup information from the another information processing apparatus.

(12) An information processing system comprising an information processing apparatus communicating with another information processing apparatus, the information processing apparatus providing a function by software installed in the information processing apparatus and behaving based on setup information related to an operation,
wherein the information processing apparatus includes:
a communication information memory unit configured to store communication information for communicating with the another information processing apparatus;
a first determining unit configured to communicate with the another information processing apparatus using the communication information and determine whether a version of the software installed on the information processing apparatus matches a version of the software installed on the another information processing apparatus;
in a case where the first determining unit determines that the version of the software installed on the information processing apparatus matches the version of the software installed on the another information processing apparatus,
a setup information acquiring unit configured to communicate with the another information processing apparatus using the communication information and acquire the setup information from the another information processing apparatus;
a third determining unit configured to determine whether the setup information is updated;
a message digest acquiring unit configured to acquire a message digest generated by the another information processing apparatus from the setup information; and
a generating unit configured to generate the message digest from the setup information stored in the setup information memory unit,
wherein the third determining unit compares the message digest acquired by the message digest acquiring unit with the message digest generated by the generating unit, and
wherein, in a case where the third determining unit determines that these two message digests do not match, the setup information acquiring unit acquires the setup information from the another information processing apparatus.

What is claimed is:
1. An information processing apparatus provided in a hierarchical structure of at least three hierarchies, the hierarchical structure including a plurality of information processing apparatuses in which a first information processing apparatus from among the plurality of information processing apparatuses is provided in an immediately above hierarchical level above the information processing apparatus, the information processing apparatus providing a function by software installed in the electronic whiteboard, and behaving based on setup information related to an operation, the electronic whiteboard comprising:
a processor; and
a memory storing program instructions that cause the processor to
store communication information to be communicated to the immediately above first information processing apparatus in the memory;
communicate with the immediately above first information processing apparatus using the stored communication information to determine whether a version of the software installed on the information processing apparatus matches a version of the software installed on the immediately above first information processing apparatus;
communicate with the immediately above first information processing apparatus using the communication information and acquire the setup information from the immediately above first information processing apparatus upon determining that the version of the software installed on the information processing apparatus matches the version of the software installed on the immediately above first information processing apparatus;
acquire a file of the software that matches the version of the software installed on the immediately above first information processing apparatus upon determining that the version of the software installed on the information processing apparatus does not match the version of the software installed on the immediately above first information processing apparatus;
store the file acquired by the software acquiring unit in the memory; and
install the software using the file that is stored in the memory, wherein
the information processing apparatus is coupled to an immediately above second information processing apparatus that is different from the immediately above first information processing apparatus, and
the program instructions further cause the processor to provide the file stored in the memory to the immediately above second information processing apparatus in a case where the immediately above second information processing apparatus determines that a version of the software installed in the immediately above second information processing apparatus matches the version of the software installed in the information processing apparatus.

2. The information processing apparatus according to claim 1, wherein the program instructions further cause the processor to
determine whether a version of the acquired file stored in the memory matches the version of the software already installed on the information processing apparatus, and
install the software onto the information processing apparatus using the acquired file upon determining that the version of the acquired file does not match the version of the software already installed on the information processing apparatus.

3. The information processing apparatus according to claim 2, wherein the program instructions further cause the processor to
determine whether the version of the software installed on the information processing apparatus matches the version of the software installed on the immediately above first information processing apparatus in a case where the second determining unit determines that the version of the file stored in the memory matches the version of the software already installed on the information processing apparatus.

4. The information processing apparatus according to claim 1, wherein the program instructions further cause the processor to
acquire the file from the immediately above first information processing apparatus when a predetermined condition is satisfied, and
continues to determine whether the predetermined condition is satisfied at predetermined time intervals until the software acquiring unit has acquired the file from the immediately above first information processing apparatus.

5. The information processing apparatus according to claim 1, wherein the program instructions further cause the processor to
display a screen on a display device, the screen being configured to receive an input indicating whether the software is to be installed on the information processing apparatus before installing the software on the information processing apparatus, and
in a case where the screen receives the input indicating that the software is to be installed on the information processing apparatus, the installing unit installs the software using the file stored in the memory on the information processing apparatus.

6. The information processing apparatus according to claim 1, wherein the setup information includes at least one setting item relating to synchronization of the setup information.

7. The information processing apparatus according to claim 1, wherein the information processing apparatus and the plurality of information processing apparatuses are electronic whiteboards.

8. An information processing system comprising an information processing apparatus communicating with an immediately above first information processing apparatus provided in an immediately above hierarchical level above the information processing apparatus in a hierarchical structure of at least three hierarchies, the hierarchical structure including a plurality of information processing apparatuses that includes the immediately above first electronic whiteboard, the information processing apparatus providing a function by software installed in the information processing apparatus, and behaving based on setup information related to an operation, and the information processing apparatus comprising:
a processor; and
a memory storing program instructions that cause the processor to
store communication information to be communicated to the immediately above first information processing apparatus;
communicate with the immediately above first information processing apparatus using the stored communication information to determine whether a version of the software installed on the matches a version of the software installed on the immediately above first information processing apparatus;
communicate with the immediately above first information processing apparatus using the communication information and acquire the setup information from the immediately above first information processing apparatus upon determining that the version of the software installed on the information processing apparatus matches the version of the software installed on the immediately above first information processing apparatus;
acquire a file of the software that matches the version of the software installed on the immediately above first information processing apparatus upon determining that the version of the software installed on the information processing apparatus does not match the version of the software installed on the immediately above first information processing apparatus;
store the file acquired by the software acquiring unit in the memory; and
install the software using the file that is stored in the memory, wherein
the information processing apparatus is coupled to an immediately above second information processing apparatus that is different from the immediately above first information processing apparatus, and
the program instructions further cause the processor to provide the file stored in the memory to the immediately above second information processing apparatus in a case where the immediately above second information processing apparatus determines that a version of the software installed in the immediately above second information processing apparatus matches the version of the software installed in the information processing apparatus.

9. The information processing system according to claim 8, wherein the setup information includes at least one setting item relating to synchronization of the setup information.

10. The information processing system according to claim 8, wherein the information processing apparatus and the plurality of information processing apparatuses are electronic whiteboards.

11. An method for processing information performed by an information processing apparatus provided in a hierarchical structure of at least three hierarchies, the hierarchical structure including a plurality of information processing apparatuses in which a first information processing apparatus from among the plurality of information processing apparatuses is provided in an immediately above hierarchical level above the information processing apparatus, the information processing apparatus providing a function by software installed in the information processing apparatus, and behaving based on setup information related to an operation, the method comprising:

storing communication information to be communicated to the immediately above first information processing apparatus in a memory of the information processing apparatus;

communicating with an immediately above first information processing apparatus using the stored communication information to determine whether a version of the software installed on the information processing apparatus matches a version of the software installed on the immediately above first information processing apparatus;

communicating with the immediately above first information processing apparatus using the communication information and acquiring the setup information from the immediately above first information processing apparatus upon determining that the version of the software installed on the information processing apparatus matches the version of the software immediately above on the immediately above first information processing apparatus;

acquiring a file of the software that matches the version of the software installed on the immediately above first information processing apparatus upon determining that the version of the software installed on the information processing apparatus does not match the version of the software installed on the immediately above first information processing apparatus;

storing the file acquired by the software acquiring unit in the memory; and installing the software using the file that is stored in the memory, wherein the information processing apparatus is coupled to an immediately above second information processing apparatus that is different from the immediately above first information processing apparatus, and the method further comprises:

providing the file stored in the memory to the immediately above second information processing apparatus in a case where the immediately above second information processing apparatus determines that a version of the software installed in the immediately above second information processing apparatus matches the version of the software installed in the information processing apparatus.

12. The method according to claim 11, wherein the setup information includes at least one setting item relating to synchronization of the setup information.

13. The method according to claim 11, wherein the information processing apparatus and the plurality of information processing apparatuses are electronic whiteboards.

* * * * *